(12) United States Patent
Yang et al.

(10) Patent No.: US 10,825,140 B1
(45) Date of Patent: Nov. 3, 2020

(54) APPARATUS AND METHOD FOR PERFORMING ARTIFICIAL INTELLIGENCE ENCODING AND ARTIFICIAL INTELLIGENCE DECODING ON IMAGE

(71) Applicant: SAMSUNG ELECTRONICS CO., LTD., Suwon-si (KR)

(72) Inventors: Heechul Yang, Suwon-si (KR); Jongseok Lee, Suwon-si (KR); Youngo Park, Suwon-si (KR); Kwangpyo Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/826,851

(22) Filed: Mar. 23, 2020

(30) Foreign Application Priority Data

Jun. 5, 2019 (KR) .................. 10-2019-0066884

(51) Int. Cl.
*G06T 3/40* (2006.01)
*G06N 3/04* (2006.01)
*G06F 7/544* (2006.01)

(52) U.S. Cl.
CPC .......... *G06T 3/4046* (2013.01); *G06F 7/5443* (2013.01); *G06N 3/0454* (2013.01); *G06T 2207/20024* (2013.01); *G06T 2207/20084* (2013.01)

(58) Field of Classification Search
CPC .. G06K 9/4604; G06K 9/4628; G06T 3/4046; G06T 2207/10024; G06T 2207/20024; G06T 2207/20084; G06F 7/5443; G06F 3/0488; G06F 3/04883; G06N 3/0454

USPC ......................................................... 382/299
See application file for complete search history.

(56) References Cited

U.S. PATENT DOCUMENTS

| | | | |
|---|---|---|---|
| 8,213,737 B2 * | 7/2012 | Steinberg | G06K 9/00248 382/275 |
| 8,391,628 B2 | 3/2013 | Huang et al. | |
| 8,780,996 B2 | 7/2014 | Bankoski et al. | |
| 10,168,879 B1 * | 1/2019 | Duan | G06T 7/12 |
| 10,475,169 B2 * | 11/2019 | Sunkavalli | G06T 9/002 |
| 2002/0146072 A1 | 10/2002 | Sun et al. | |
| 2008/0316327 A1 * | 12/2008 | Steinberg | G06T 3/4038 348/222.1 |

(Continued)

OTHER PUBLICATIONS

Yue Li et al., "Learning a Convolutional Neural Network for Image Compact-Resolution", IEEE Transactions on Image Processing, vol. 28, No. 3, Mar. 2019, pp. 1092-1107 pp. 1092-1105; and figure 4.

(Continued)

*Primary Examiner* — Ali Bayat
(74) *Attorney, Agent, or Firm* — Sughrue Mion, PLLC

(57) ABSTRACT

Provided are methods and apparatus related to Artificial Intelligence (AI) downscaling and upscaling and techniques related to reducing artifact problems. Some embodiments include down-scaling an original image through a Deep Neural Network (DNN); generating, from the original image and based on frequency transform coefficients, artifact information representing a region in the first image including an artifact in the first image. Post-processing may be performed based on the artifact information to change pixels in the first image, thus reducing the effect of artifacts.

17 Claims, 39 Drawing Sheets

(56) References Cited

U.S. PATENT DOCUMENTS

| | | |
|---|---|---|
| 2012/0177301 A1 | 7/2012 | Shin et al. |
| 2014/0369613 A1 | 12/2014 | Avadhanam et al. |
| 2015/0055855 A1* | 2/2015 | Rodriguez ........... G06K 9/6259 |
| | | 382/159 |
| 2018/0181593 A1* | 6/2018 | Ranzinger ........... G06F 16/5838 |
| 2019/0164261 A1* | 5/2019 | Sunkavalli ................ G06T 7/90 |
| 2019/0166379 A1 | 5/2019 | Navarrete Michelini et al. |
| 2020/0034948 A1* | 1/2020 | Park .................... A61N 5/1067 |
| 2020/0074600 A1* | 3/2020 | Sunkavalli .............. G06T 5/007 |

OTHER PUBLICATIONS

International Search Report and Written Opinion for PCT/KR2020/007048 dated Sep. 7, 2020.

* cited by examiner

FIG. 5

| IMAGE-RELATED INFORMATION | DNN SETTING INFORMATION |
|---|---|
| SD, 10Mbps, AV1 | A DNN SETTING INFORMATION |
| HD, 15Mbps, H.264 | B DNN SETTING INFORMATION |
| Full HD, 20Mbps, HEVC | C DNN SETTING INFORMATION |
| Full HD, 15Mbps, HEVC | D DNN SETTING INFORMATION |

FIG. 18A

|    |    |    |    |    |    |    |    |    |    |
|----|----|----|----|----|----|----|----|----|----|
| a1 | b1 | c1 | d1 | e1 | f1 | g1 | h1 | i1 | j1 |
| a2 | b2 | c2 | d2 | e2 | f2 | g2 | h2 | i2 | j2 |
| a3 | b3 | c3 | d3 | e3 | f3 | g3 | h3 | i3 | j3 |
| a4 | b4 | c4 | d4 | e4 | f4 | g4 | h4 | i4 | j4 |
| a5 | b5 | c5 | d5 | e5 | f5 | g5 | h5 | i5 | j5 |
| a6 | b6 | c6 | d6 | e6 | f6 | g6 | h6 | i6 | j6 |
| a7 | b7 | c7 | d7 | e7 | f7 | g7 | h7 | i7 | j7 |
| a8 | b8 | c8 | d8 | e8 | f8 | g8 | h8 | i8 | j8 |

| a1 | b1 | c1 | d1 | e1 | f1 | g1 | h1 | i1 | j1 |
|----|----|----|----|----|----|----|----|----|----|
| a2 | b2 | c2 | d2 | e2 | f2 | g2 | h2 | i2 | j2 |
| a3 | b3 | c3 | d3 | e3 | f3 | g3 | h3 | i3 | j3 |
| a4 | b4 | c4 | d4 | e4 | f4 | g4 | h4 | i4 | j4 |
| a5 | b5 | c5 | d5 | e5 | f5 | g5 | h5 | i5 | j5 |
| a6 | b6 | c6 | d6 | e6 | f6 | g6 | h6 | i6 | j6 |
| a7 | b7 | c7 | d7 | e7 | f7 | g7 | h7 | i7 | j7 |
| a8 | b8 | c8 | d8 | e8 | f8 | g8 | h8 | i8 | j8 |

1850

[N]

[N-1]

[N-2]

⋮

[1]

APPARATUS AND METHOD FOR PERFORMING ARTIFICIAL INTELLIGENCE ENCODING AND ARTIFICIAL INTELLIGENCE DECODING ON IMAGE

CROSS-REFERENCE TO RELATED APPLICATION

This application is based on and claims priority under 35 U.S.C. § 119 to Korean Patent Application No. 10-2019-0066884, filed on Jun. 5, 2019, in the Korean Intellectual Property Office, the disclosure of which is incorporated by reference herein in its entirety.

BACKGROUND

1. Field

The disclosure relates to image processing. More particularly, the disclosure relates to a method and apparatus for encoding and decoding images, based on Artificial Intelligence (AI).

2. Description of Related Art

Images are stored in a recording medium or transmitted through a communication channel in the form of bitstreams after being encoded by a codec based on a preset data compression standard, for example, a Moving Picture Expert Group (MPEG) standard.

With the development and supply of hardware capable of reproducing and storing high-resolution/high-definition images, a need for a codec capable of effectively encoding and decoding high-resolution/high-definition images is increasing.

SUMMARY

A method and apparatus for Artificial Intelligence (AI) encoding and AI decoding images, according to an embodiment of the disclosure, are aimed to encode and decode images based on AI so as to achieve a low bitrate.

Also, a method and apparatus for Artificial Intelligence (AI) encoding and AI decoding images, according to an embodiment of the disclosure, are aimed to enhance quality of images by removing artifacts in the images.

Additional aspects will be set forth in part in the description which follows and, in part, will be apparent from the description, or may be learned by practice of the presented embodiments of the disclosure.

Disclosed herein is an Artificial Intelligence (AI) encoding apparatus including: a memory storing one or more instructions; and a processor configured to execute the one or more instructions stored in the memory to: downscale, using a Deep Neural Network (DNN) for down-scaling, an original image to obtain a first image, wherein the original image includes a plurality of blocks, estimate, based on a plurality of frequency transform coefficients of the original image, an artifact map of the first image, wherein a presence of an artifact is indicated in the artifact map by a first pixel value and an absence of the artifact is indicated in the artifact map by a second pixel value, generate artifact information representing a first region including the artifact in the first image based on the plurality of frequency transform coefficients, post-process, based on the artifact map, the first image to obtain a post-processed first image, and encode the post-processed first image to obtain image data.

In some embodiments of the AI encoding apparatus, the artifact map is of a preset size.

In some embodiments of the AI encoding apparatus, the processor is further configured to execute the one or more instructions to: perform frequency transformation on a first block of the plurality of blocks to generate a second plurality of frequency transform coefficients corresponding to the first block, wherein the plurality of frequency transform coefficients includes the second plurality of frequency transform coefficients, determine whether a criterion is satisfied based on a distribution of the second plurality of frequency transform coefficients, and generate, when the criterion is satisfied, the artifact map, wherein the first pixel value in the artifact map represents a degree value for each frequency transform coefficient of the second plurality of frequency transform coefficients, each one of a plurality of degree values corresponding to one of the plurality of frequency transform coefficients.

In some embodiments of the AI encoding apparatus, when the criterion is not satisfied, the artifact map includes the plurality of degree values, and each degree value of the plurality of degree values is equal to the second pixel value.

In some embodiments of the AI encoding apparatus, the processor is further configured to execute the one or more instructions to perform morphology processing, smoothing processing, or seamless processing on the first image based on the artifact map.

In some embodiments of the AI encoding apparatus, the original image is a most recent image of a plurality of original images in a video sequence, and the processor is further configured to execute the one or more instructions to post-process the first image based on comparing the artifact map to at least one second artifact map of a previous original image of the plurality of original images of the video sequence.

In some embodiments of the AI encoding apparatus, the processor is further configured to execute the one or more instructions to post-process the first image by: determining whether K or more previous artifact maps of N previous artifact maps disagree at a first position index of the second plurality of frequency transform coefficients with the artifact map at the first position index, and changing first pixel values of the first block when the K or more previous artifact maps disagree at the first position index with the artifact map, wherein a first previous artifact map disagrees with the artifact map when the artifact map first pixel value of the first position index is different than a first pixel value of each of K or more previous artifact maps at the first position index.

In some embodiments of the AI encoding apparatus, the processor is further configured to execute the one or more instructions to: perform frequency transformation on a first block of the plurality of blocks to generate a second plurality of frequency transform coefficients corresponding to the first block, wherein the plurality of frequency transform coefficients includes the second plurality of frequency transform coefficients, calculate a Sum of Absolute Difference (SAD) between a first frequency transform coefficient at a second position index of the second plurality of frequency transform coefficients and a second frequency transform coefficient at the second position index of a third plurality of frequency transform coefficients associated with a second block of at least one previous original image, the second block co-located with the first block, determine whether the calculated SAD is within a preset range, and post-process the first image by changing the first pixel values of the first block, when the calculated SAD is not within the preset range.

In some embodiments of the AI encoding apparatus, the processor is further configured to execute the one or more instructions to post-process the first image based on the artifact map and based on at least one of a motion vector of the original image or an optical flow of the original image.

In some embodiments of the AI encoding apparatus, the processor is further configured to execute the one or more instructions to post-process the first image by applying a filter to the first region based on the artifact information.

In some embodiments of the AI encoding apparatus, the processor is further configured to execute the one or more instructions to: apply a filter to a second region of the original image corresponding to the first region in the first image to generate a down-scaled region including second pixel values, based on the artifact information; and change third pixel values in the first region including the artifact in the first image to the second pixel values of the down-scaled region.

In some embodiments of the AI encoding apparatus, the filter includes at least one of a Gaussian filter or a low-pass filter, and the processor is further configured to execute the one or more instructions to: perform frequency transformation on a first block of the plurality of blocks to generate a second plurality of frequency transform coefficients corresponding to the first block, wherein the plurality of frequency transform coefficients includes the second plurality of frequency transform coefficients, and determine a cut-off frequency of the low-pass filter based on a maximum value of transform coefficients located in a high-frequency region among the second plurality of frequency transform coefficients.

In some embodiments of the AI encoding apparatus, the filter includes at least one of a Bi-cubic filter, a Bi-linear filter, or a Lanczos filter.

In some embodiments of the AI encoding apparatus, the criterion is satisfied when one or more of a first condition, a second condition, a third condition or a fourth condition is satisfied, the first block includes a DC frequency transform coefficient, a low frequency region and a high frequency region, the first condition is satisfied when a first sum of first energy values of the second plurality of frequency transform coefficients over the high-frequency region exceeds a second sum of second energy values of the second plurality of frequency transform coefficients over the low-frequency region, wherein a scaling of the second sum is a first predetermined scaling, the second condition is satisfied when a third sum including a first maximum energy value at a third position index of a second frequency transform coefficient of the second plurality of frequency transform coefficients over the high-frequency region and energy values of frequency transform coefficients located at fourth position indices around the third position index exceeds a fourth sum including a second maximum energy value at a fourth position index of a third frequency transform coefficient of the second plurality of frequency transform coefficients over the low-frequency region and energy values of frequency transform coefficients located around the fourth position index, wherein a scaling of the fourth sum is a second predetermined scaling, the third condition is satisfied when the third sum of the high-frequency region exceeds a scaled version of the first sum, wherein the scaling of the first sum is a third predetermined scaling, or the fourth condition is satisfied when a number of times that frequency transform coefficients have energy exceeding a preset value is less than a threshold number.

Also provided herein is an Artificial Intelligence (AI) decoding method including: obtaining image data generated as a result of an encoding of a first image; obtaining AI data including artifact information derived from an original image representing a region in the first image including an artifact; performing a decoding of the image data to generate a second image corresponding to the first image; AI up-scaling the second image using a Deep Neural Network (DNN) for up-scaling to obtain a third image; and outputting the artifact information and the third image to an image quality engine; and post-processing, by the image quality engine, the third image by changing, based on the artifact information, pixel values of the third image, wherein the artifact information is determined at an encoder based on frequency transform coefficients of the original image.

Also provided herein is an Artificial Intelligence (AI) encoding method including: downscaling, using a Deep Neural Network (DNN) for down-scaling, an original image to obtain a first image, wherein the original image includes a plurality of blocks, estimating, based on a plurality of frequency transform coefficients of the original image, an artifact map of the first image, wherein a presence of an artifact is indicated in the artifact map by a first pixel value and an absence of the artifact is indicated in the artifact map by a second pixel value, generating artifact information representing a first region including the artifact in the first image based on the plurality of frequency transform coefficients, post-processing, based on the artifact map, the first image to obtain a post-processed first image, and encoding the post-processed first image to obtain image data.

Also provided herein is an Artificial Intelligence (AI) decoding apparatus including: a memory storing one or more instructions; and a processor configured to execute the one or more instructions stored in the memory to obtain image data generated as a result of an encoding of a first image, and AI data including artifact information derived from an original image representing a region in the first image including an artifact, perform a decoding of the image data to generate a second image corresponding to the first image, AI up-scale the second image using a Deep Neural Network (DNN) for up-scaling to obtain a third image, output the artifact information and the third image to an image quality engine, and post-process, by the image quality engine, the third image by changing, based on the artifact information, pixel values of the third image, wherein the artifact information is determined at an encoder based on frequency transform coefficients of the original image.

In some embodiments of the AI encoding apparatus, the fourth position indices are around the third position index when the fourth position indices fit within a square region of the first block, and the square region is of a predetermined width.

According to an embodiment of the disclosure, an Artificial Intelligence (AI) encoding apparatus includes: a memory storing one or more instructions; and a processor configured to execute the one or more instructions stored in the memory to obtain a first image AI down-scaled from an original image through a Deep Neural Network (DNN) for down-scaling, generate artifact information representing a region including an artifact in the first image based on values of frequency transform coefficients of the original image, perform post-processing for changing pixel values of pixels in the first image based on the artifact information, and generate image data corresponding to a result of first encoding of the post-processed first image and AI data including the artifact information.

The artifact information may include an artifact map of a preset size.

The processor may be further configured to execute the one or more instructions to perform frequency transformation on each block of the original image to generate frequency transform coefficients for each block, determine whether a preset criterion is satisfied based on a distribution of the frequency transform coefficients for each block of the original image, and generate the artifact map including a preset pixel value for each block based on a result of the determining.

Pixels of a block satisfying the preset criterion among pixels included in the artifact map may have a first pixel value, and pixels of a block not satisfying the preset criterion may have a second pixel value.

The processor may be further configured to execute the one or more instructions to perform morphology processing, smoothing processing, or seamless processing on the artifact map.

The processor may be further configured to execute the one or more instructions to compare an artifact map of the original image to at least one artifact map of a previous image, and perform post-processing of changing the pixel values of the pixels in the first image based on a result of the comparing.

The processor may be further configured to execute the one or more instructions to determine whether the number of blocks of a first pixel value among N second blocks in artifact maps of N (N is an integer) previous images (for example, frames), corresponding to a first block of the first pixel value in the artifact map of the original image, is greater than or equal to K (K is an integer), and perform post-processing of changing the pixel values of the pixels in the first block based on a result of the determining.

The processor may be further configured to execute the one or more instructions to calculate a Sum of Absolute Difference (SAD) between a transform coefficient of the first block of the original image and a transform coefficient of a second block of at least one previous original image, the second block co-located with the first block, determine whether the calculated SAD is within a preset range, and perform post-processing of changing the pixel values of the pixels in the first image based on a result of the determining, wherein the first block is determined based on the artifact information.

The processor may be further configured to execute the one or more instructions to perform post-processing of changing the pixel values of the pixels in the first image based on at least one of a motion vector of the original image or an optical flow of the original image.

The post-processing may include applying a preset filter to the region including the artifact in the first image based on the artifact information.

The post-processing may include: applying a filter to a region of the original image corresponding to the region including the artifact in the first image to generate a down-scaled region, based on the artifact information; and changing pixel values of pixels in the region including the artifact in the first image to pixel value of pixels in the down-scaled region.

The filter may include at least one of a Gaussian filter or a low-pass filter, and a cut-off frequency of the low-pass filter is determined based on a maximum value of transform coefficients located in a high-frequency region among frequency transform coefficients of the region of the original image corresponding to the region including the artifact in the first image.

The filter may include at least one of a Bi-cubic filter, a Bi-linear filter, or a Lanczos filter.

The preset criterion may be based on at least one comparison result of a first comparison result obtained by comparing a sum of values of transform coefficients of a low-frequency region for each block of the original image to a sum of values of transform coefficients of a high-frequency region of the original image, a second comparison result obtained by comparing a first sum of a maximum value of the transform coefficients of the high-frequency region for each block and values of transform coefficients located around a first transform coefficient of the maximum value to a sum of a maximum value of the transform coefficients of the low-frequency region and values of transform coefficients located around a second transform coefficient of the maximum value, a third comparison result obtained by comparing a sum of the transform coefficients of the high-frequency region to the first sum of the high-frequency region, or a fourth comparison result obtained by comparing a preset value to the number of transform coefficients of values that are greater than a preset value.

According to an embodiment of the disclosure, an Artificial Intelligence (AI) decoding method includes: obtaining image data generated as a result of first encoding of a first image, and AI data including artifact information representing a region including an artifact; performing first decoding on the image data to generate a second image corresponding to the first image; obtaining a third image AI up-scaled from the second image through a Deep Neural Network (DNN) for up-scaling; and outputting the artifact information and the third image to an image quality engine, wherein the artifact information is determined based on values of frequency transform coefficients related to an original image, and the image quality engine performs post-processing of changing pixel values of pixels in the third image based on the artifact information.

According to an embodiment of the disclosure, an Artificial Intelligence (AI) encoding method includes: obtaining a first image AI down-scaled from an original image through a Deep Neural Network (DNN) for down-scaling; generating artifact information representing a region including an artifact in the first image based on values of frequency transform coefficients related to the original image; and performing post-processing of changing pixel values of pixels in the first image based on the artifact information; and generating image data corresponding to a result of first encoding of the post-processed first image, and AI data including the artifact information.

According to an embodiment of the disclosure, an Artificial Intelligence (AI) decoding apparatus includes: a memory storing one or more instructions; and a processor configured to execute the one or more instructions stored in the memory to obtain image data generated as a result of first encoding of a first image, and artifact information representing a region including an artifact, perform first decoding on the image data to generate a second image corresponding to the first image, obtain a third image AI up-scaled from the second image through a Deep Neural Network (DNN) for up-scaling, and output the artifact information and the third image to an image quality engine, wherein the artifact information is determined based on values of frequency transform coefficients related to an original image, and the image quality engine performs post-processing of changing pixel values of pixels in the third image based on the artifact information.

BRIEF DESCRIPTION OF THE DRAWINGS

The above and other aspects, features, and advantages of certain embodiments of the disclosure will be more apparent from the following description taken in conjunction with the accompanying drawings, in which:

A brief description of each drawing is provided to more fully understand the drawing recited in the present specification;

FIG. 5 is a table showing a mapping relationship between several pieces of image-related information and several pieces of DNN setting information;

FIGS. 18A and 18B are diagrams for describing a process of removing outliers by an AI encoding apparatus according to an embodiment of the disclosure;

DETAILED DESCRIPTION

Figure 1:
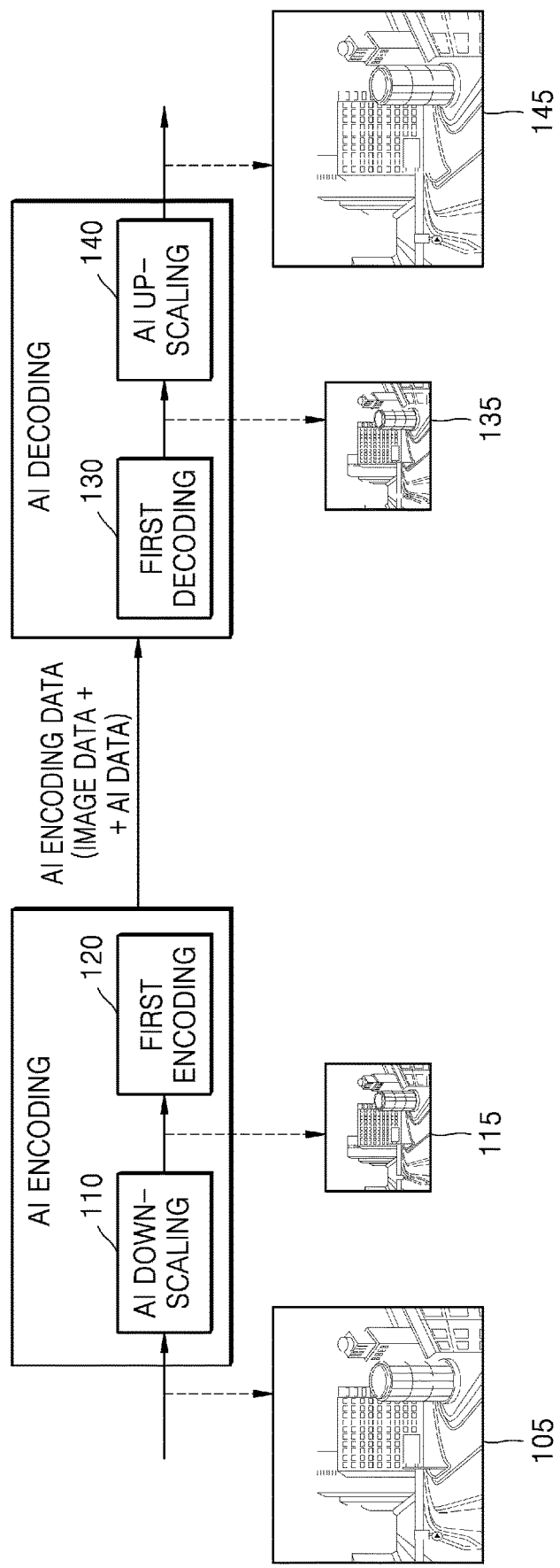
FIG. 1 is a diagram for describing an artificial intelligence (AI) encoding process and an AI decoding process, according to an embodiment.

Throughout the disclosure, the expression "at least one of a, b or c" indicates only a, only b, only c, both a and b, both a and c, both b and c, all of a, b, and c, or variations thereof.

As the disclosure allows for various changes and numerous examples, particular embodiments will be illustrated in the drawings and described in detail in the written description. However, this is not intended to limit the disclosure to particular modes of practice, and it will be understood that all changes, equivalents, and substitutes that do not depart from the spirit and technical scope of the disclosure are encompassed in the disclosure.

In the description of embodiments, certain detailed explanations of related art are omitted when it is deemed that they may unnecessarily obscure the essence of the disclosure. Also, numbers (for example, a first, a second, and the like) used in the description of the specification are merely identifier codes for distinguishing one element from another.

Also, in the present specification, it will be understood that when elements are "connected" or "coupled" to each other, the elements may be directly connected or coupled to each other, but may alternatively be connected or coupled to each other with an intervening element therebetween, unless specified otherwise.

In the present specification, regarding an element represented as a "unit" or a "module", two or more elements may be combined into one element or one element may be divided into two or more elements according to subdivided functions. In addition, each element described hereinafter may additionally perform some or all of functions performed by another element, in addition to main functions of itself, and some of the main functions of each element may be performed entirely by another component.

Also, in the present specification, an 'image' or a 'picture' may denote a still image, a moving image including a plurality of consecutive still images (or frames), or a video.

Also, in the present specification, a deep neural network (DNN) is a representative example of an artificial neural network model simulating brain nerves, and is not limited to an artificial neural network model using a specific algorithm.

Also, in the present specification, a 'parameter' is a value used in an operation process of each layer forming a neural network, and for example, may include a weight used when an input value is applied to a certain operation expression. Here, the parameter may be expressed in a matrix form. The parameter is a value set as a result of training, and may be updated through separate training data when necessary.

Also, in the present specification, a 'first DNN' indicates a DNN used for artificial intelligence (AI) down-scaling an image, and a 'second DNN' indicates a DNN used for AI up-scaling an image.

Also, in the present specification, 'DNN setting information' includes information related to an element constituting a DNN. 'DNN setting information' includes the parameter described above as information related to the element constituting the DNN. The first DNN or the second DNN may be set by using the DNN setting information.

Also, in the present specification, an 'original image' denotes an image to be an object of AI encoding, and a 'first image' denotes an image obtained as a result of performing AI down-scaling on the original image during an AI encoding process. Also, a 'second image' denotes an image obtained via first decoding during an AI decoding process, and a 'third image' denotes an image obtained by AI up-scaling the second image during the AI decoding process.

Also, in the present specification, 'AI down-scale' denotes a process of decreasing resolution of an image based on AI, and 'first encoding' denotes an encoding process according to an image compression method based on frequency transformation. Also, 'first decoding' denotes a decoding process according to an image reconstruction method based on frequency transformation, and 'AI up-scale' denotes a process of increasing resolution of an image based on AI.

FIG. 1 is a diagram for describing an AI encoding process and an AI decoding process, according to an embodiment.

As described above, when resolution of an image remarkably increases, the throughput of information for encoding and decoding the image is increased, and accordingly, a method for improving efficiency of encoding and decoding of an image is required.

As shown in FIG. 1, according to an embodiment of the disclosure, a first image 115 is obtained by performing AI down-scaling 110 on an original image 105 having high resolution. Then, first encoding 120 and first decoding 130 are performed on the first image 115 having relatively low resolution, and thus a bitrate may be largely reduced compared to when the first encoding and the first decoding are performed on the original image 105.

In particular, in FIG. 1, the first image 115 is obtained by performing the AI down-scaling 110 on the original image 105 and the first encoding 120 is performed on the first image 115 during the AI encoding process, according to an embodiment. During the AI decoding process, AI encoding data including AI data and image data, which are obtained as a result of AI encoding is received, a second image 135 is obtained via the first decoding 130, and a third image 145 is obtained by performing AI up-scaling 140 on the second image 135.

Referring to the AI encoding process in detail, when the original image 105 is received, the AI down-scaling 110 is performed on the original image 105 to obtain the first image 115 of certain resolution or certain quality. Here, the AI down-scaling 110 is performed based on AI, and AI for the AI down-scaling 110 needs to be trained jointly with AI for the AI up-scaling 140 of the second image 135. This is because, when the AI for the AI down-scaling 110 and the AI for the AI up-scaling 140 are separately trained, a difference between the original image 105 which is an object of AI encoding and the third image 145 reconstructed through AI decoding is increased.

In an embodiment of the disclosure, the AI data may be used to maintain such a joint relationship during the AI encoding process and the AI decoding process. Accordingly, the AI data obtained through the AI encoding process may include information indicating an up-scaling target, and during the AI decoding process, the AI up-scaling 140 is performed on the second image 135 according to the up-scaling target verified based on the AI data.

The AI for the AI down-scaling 110 and the AI for the AI up-scaling 140 may be embodied as a DNN. As will be described later with reference to FIG. 9, because a first DNN and a second DNN are jointly trained by sharing loss information under a certain target, an AI encoding apparatus may provide target information used during joint training of the first DNN and the second DNN to an AI decoding apparatus, and the AI decoding apparatus may perform the AI up-scaling 140 on the second image 135 to target resolution based on the provided target information.

Regarding the first encoding 120 and the first decoding 130 of FIG. 1, information amount of the first image 115 obtained by performing AI down-scaling 110 on the original image 105 may be reduced through the first encoding 120. The first encoding 120 may include a process of generating prediction data by predicting the first image 115, a process of generating residual data corresponding to a difference between the first image 115 and the prediction data, a process of transforming the residual data of a spatial domain component to a frequency domain component, a process of quantizing the residual data transformed to the frequency domain component, and a process of entropy-encoding the quantized residual data. Such first encoding 120 may be performed via one of image compression methods using frequency transformation, such as MPEG-2, H.264 Advanced Video Coding (AVC), MPEG-4, High Efficiency Video Coding (HEVC), VC-1, VP8, VP9, and AOMedia Video 1 (AV1).

The second image 135 corresponding to the first image 115 may be reconstructed by performing the first decoding 130 on the image data. The first decoding 130 may include a process of generating the quantized residual data by entropy-decoding the image data, a process of inverse-quantizing the quantized residual data, a process of transforming the residual data of the frequency domain component to the spatial domain component, a process of generating the prediction data, and a process of reconstructing the second image 135 by using the prediction data and the residual data. Such first decoding 130 may be performed via an image reconstruction method corresponding to one of image compression methods using frequency transformation, such as MPEG-2, H.264 AVC, MPEG-4, HEVC, VC-1, VP8, VP9, and AV1, which is used in the first encoding 120.

The AI encoding data obtained through the AI encoding process may include the image data obtained as a result of performing the first encoding 120 on the first image 115, and the AI data related to the AI down-scaling 110 of the original image 105. The image data may be used during the first decoding 130 and the AI data may be used during the AI up-scaling 140.

The image data may be transmitted in a form of a bitstream. The image data may include data obtained based on pixel values in the first image 115, for example, residual data that is a difference between the first image 115 and prediction data of the first image 115. Also, the image data includes information used during the first encoding 120 performed on the first image 115. For example, the image data may include prediction mode information, motion information, and information related to quantization parameter used during the first encoding 120. The image data may be generated according to a rule, for example, according to a syntax, of an image compression method used during the first encoding 120, among MPEG-2, H.264 AVC, MPEG-4, HEVC, VC-1, VP8, VP9, and AV1.

The AI data is used in the AI up-scaling 140 based on the second DNN. As described above, because the first DNN and the second DNN are jointly trained, the AI data includes information enabling the AI up-scaling 140 to be performed accurately on the second image 135 through the second DNN. During the AI decoding process, the AI up-scaling 140 may be performed on the second image 135 to have targeted resolution and/or quality, based on the AI data.

The AI data may be transmitted together with the image data in a form of a bitstream. Alternatively, according to an embodiment, the AI data may be transmitted separately from the image data, in a form of a frame or a packet. The AI data and the image data obtained as a result of the AI encoding may be transmitted through the same network or through different networks.

Figure 2:
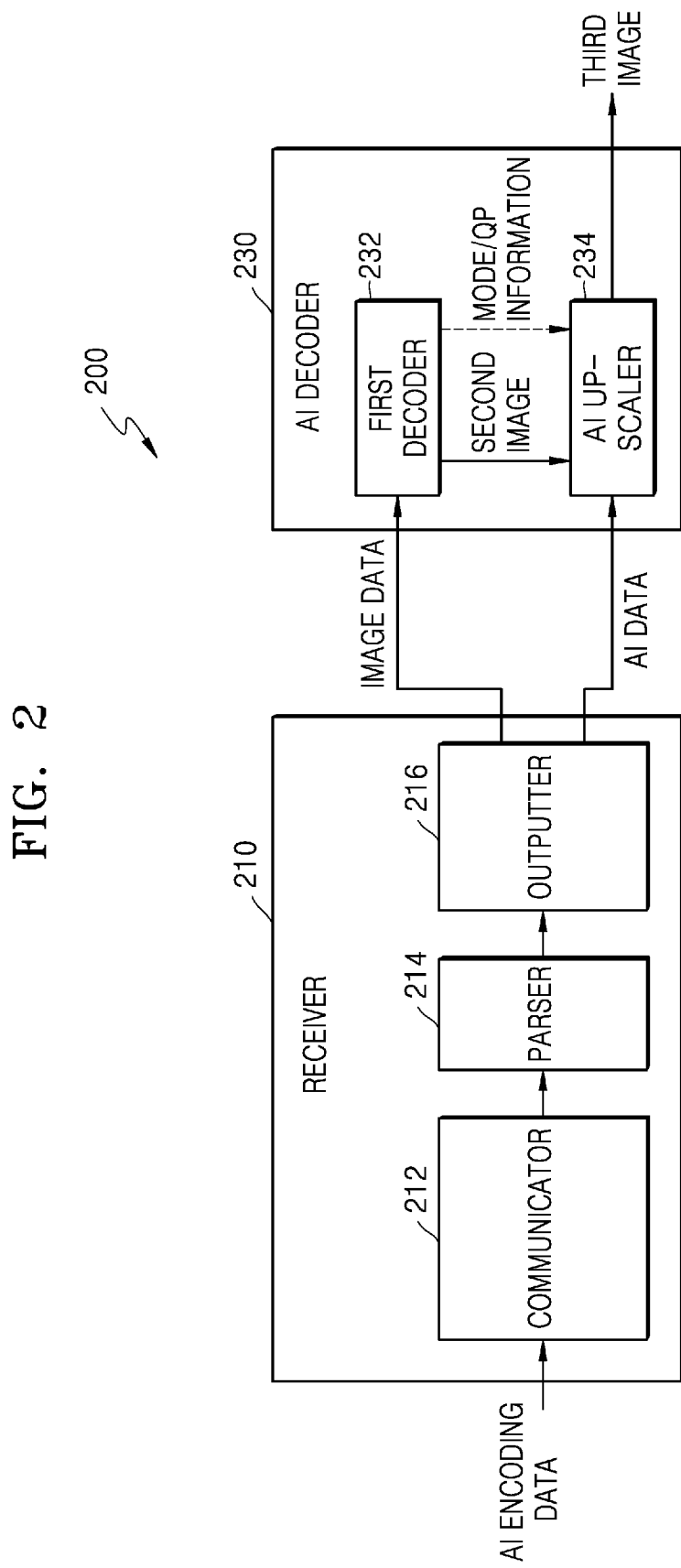
FIG. 2 is a block diagram of a configuration of an AI decoding apparatus according to an embodiment.

FIG. 2 is a block diagram of a configuration of an AI decoding apparatus 100 according to an embodiment.

Referring to FIG. 2, the AI decoding apparatus 200 according to an embodiment may include a receiver 210 and an AI decoder 230. The receiver 210 may include a communicator 212, a parser 214, and an outputter 216. The AI decoder 230 may include a first decoder 232 and an AI up-scaler 234.

The receiver 210 receives and parses AI encoding data obtained as a result of AI encoding, and distinguishably outputs image data and AI data to the AI decoder 230.

In particular, the communicator 212 receives the AI encoding data obtained as the result of AI encoding through a network. The AI encoding data obtained as the result of performing AI encoding includes the image data and the AI data. The image data and the AI data may be received through a same type of network or different types of networks.

The parser 214 receives the AI encoding data received through the communicator 212 and parses the AI encoding data to distinguish the image data and the AI data. For example, the parser 214 may distinguish the image data and the AI data by reading a header of data obtained from the communicator 212. According to an embodiment, the parser 214 distinguishably transmits the image data and the AI data to the outputter 216 via the header of the data received through the communicator 212, and the outputter 216 transmits the distinguished image data and AI data respectively to the first decoder 232 and the AI up-scaler 234. At this time, it may be verified that the image data included in the AI encoding data is image data generated via a certain codec (for example, MPEG-2, H.264 AVC, MPEG-4, HEVC, VC-1, VP8, VP9, or AV1). In this case, corresponding information may be transmitted to the first decoder 232 through the outputter 216 such that the image data is processed via the verified codec.

According to an embodiment, the AI encoding data parsed by the parser 214 may be obtained from a data storage medium including a magnetic medium such as a hard disk, a floppy disk, or a magnetic tape, an optical recording medium such as CD-ROM or DVD, or a magneto-optical medium such as a floptical disk.

The first decoder 232 reconstructs the second image 135 corresponding to the first image 115, based on the image data. The second image 135 obtained by the first decoder 232 is provided to the AI up-scaler 234. According to an embodiment, first decoding related information, such as prediction mode information, motion information, quantization parameter information, or the like included in the image data may be further provided to the AI up-scaler 234.

Upon receiving the AI data, the AI up-scaler 234 performs AI up-scaling on the second image 135, based on the AI data. According to an embodiment, the AI up-scaling may be performed by further using the first decoding related information, such as the prediction mode information, the quantization parameter information, or the like included in the image data.

The receiver 210 and the AI decoder 230 according to an embodiment are described as individual devices, but may be implemented through one processor. In this case, the receiver 210 and the AI decoder 230 may be implemented through an dedicated processor or through a combination of software and general-purpose processor such as application processor (AP), central processing unit (CPU) or graphic processing unit (GPU). The dedicated processor may be implemented by including a memory for implementing an embodiment of the disclosure or by including a memory processor for using an external memory.

Also, the receiver 210 and the AI decoder 230 may be configured by a plurality of processors. In this case, the receiver 210 and the AI decoder 230 may be implemented through a combination of dedicated processors or through a combination of software and general-purpose processors such as AP, CPU or GPU. Similarly, the AI up-scaler 234 and the first decoder 232 may be implemented by different processors.

The AI data provided to the AI up-scaler 234 includes information enabling the second image 135 to be processed via AI up-scaling. Here, an up-scaling target should correspond to down-scaling of a first DNN. Accordingly, the AI data includes information for verifying a down-scaling target of the first DNN.

Examples of the information included in the AI data include difference information between resolution of the original image 105 and resolution of the first image 115, and information related to the first image 115.

The difference information may be expressed as information about a resolution transformation degree of the first image 115 compared to the original image 105 (for example, resolution transformation rate information). Also, because the resolution of the first image 115 is verified through the resolution of the reconstructed second image 135 and the resolution transformation degree is verified accordingly, the difference information may be expressed only as resolution information of the original image 105. Here, the resolution information may be expressed as vertical/horizontal sizes or as a ratio (16:9, 4:3, or the like) and a size of one axis. Also, when there is pre-set resolution information, the resolution information may be expressed in a form of an index or flag.

The information related to the first image 115 may include information about at least one of a bitrate of the image data obtained as the result of performing first encoding on the first image 115 or a codec type used during the first encoding of the first image 115.

The AI up-scaler 234 may determine the up-scaling target of the second image 135, based on at least one of the difference information or the information related to the first image 115, which are included in the AI data. The up-scaling target may indicate, for example, to what degree resolution is to be up-scaled for the second image 135. When the up-scaling target is determined, the AI up-scaler 234 performs AI up-scaling on the second image 135 through a second DNN to obtain the third image 145 corresponding to the up-scaling target.

Before describing a method, performed by the AI up-scaler 234, of performing AI up-scaling on the second image 135 according to the up-scaling target, an AI up-scaling process through the second DNN will be described with reference to FIGS. 3 and 4.

Figure 3:
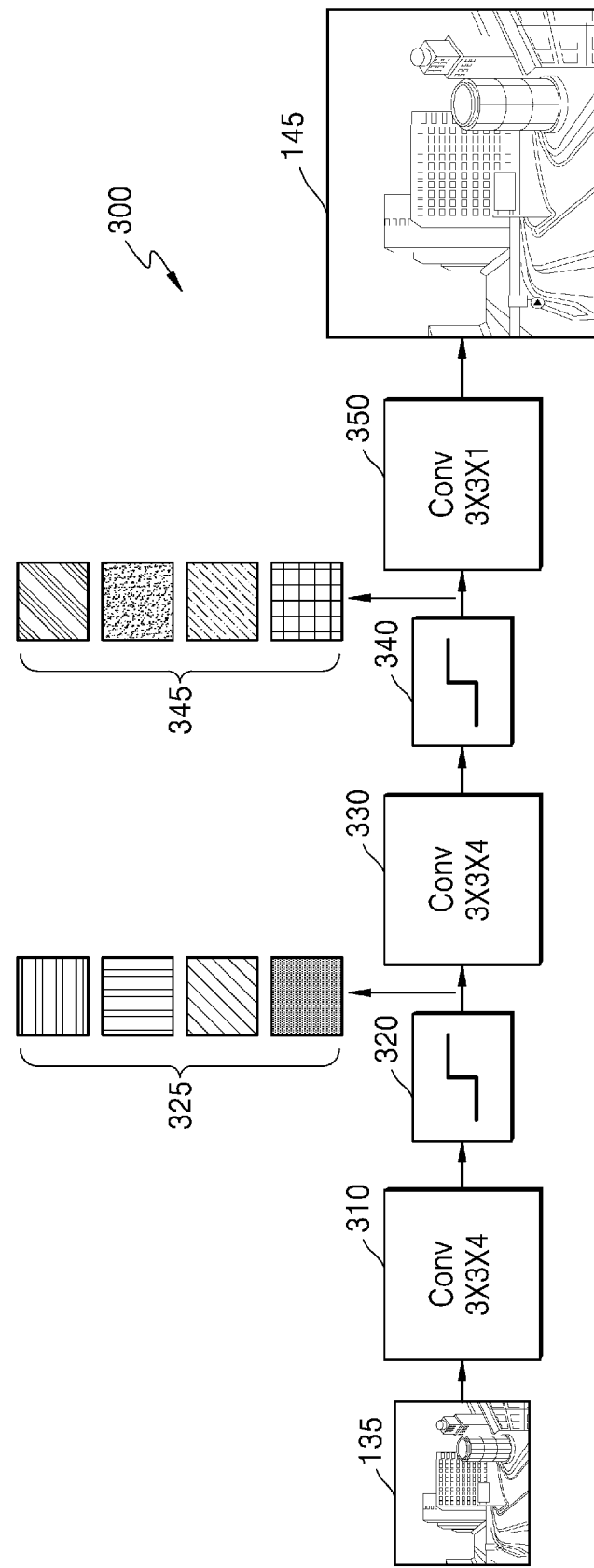
FIG. 3 is a diagram showing a second deep neural network (DNN) for performing AI up-scaling on a second image.
Figure 4:
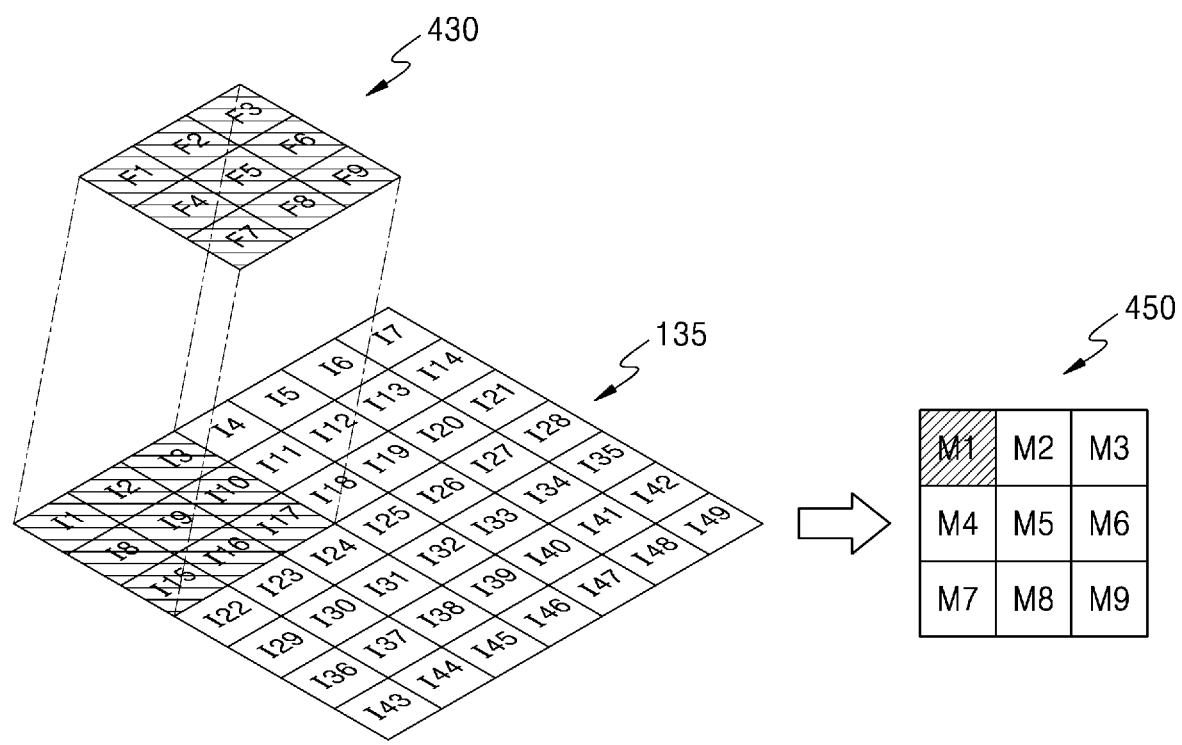
FIG. 4 is a diagram for describing a convolution operation by a convolution layer.

FIG. 3 is a diagram showing a second DNN 300 for performing AI up-scaling on the second image 135, and FIG. 4 is a diagram for describing a convolution operation in a first convolution layer 310 of FIG. 3.

As shown in FIG. 3, the second image 135 is input to the first convolution layer 310. 3×3×4 indicated in the first convolution layer 310 shown in FIG. 3 indicates that a convolution process is performed on one input image by using four filter kernels having a size of 3×3. Four feature maps are generated by the four filter kernels as a result of the convolution process. Each feature map indicates inherent characteristics of the second image 135. For example, each feature map may represent a vertical direction characteristic, a horizontal direction characteristic, or an edge characteristic, etc of the second image 135.

A convolution operation in the first convolution layer 310 will be described in detail with reference to FIG. 4.

One feature map 450 may be generated through multiplication and addition between parameters of a filter kernel 430 having a size of 3×3 used in the first convolution layer 310 and corresponding pixel values in the second image 135. Because four filter kernels are used in the first convolution layer 310, four feature maps may be generated through the convolution operation using the four filter kernels.

I1 through I49 indicated in the second image 135 in FIG. 4 indicate pixels in the second image 135, and F1 through F9 indicated in the filter kernel 430 indicate parameters of the filter kernel 430. Also, M1 through M9 indicated in the feature map 450 indicate samples of the feature map 450.

In FIG. 4, the second image 135 includes 49 pixels, but the number of pixels is only an example and when the second image 135 has a resolution of 4 K, the second image 135 may include, for example, 3840×2160 pixels.

During a convolution operation process, pixel values of I1, I2, I3, I8, I9, I10, I15, I16, and I17 of the second image 135 and F1 through F9 of the filter kernels 430 are respectively multiplied, and a value of combination (for example, addition) of result values of the multiplication may be assigned as a value of M1 of the feature map 450. When a stride of the convolution operation is 2, pixel values of I3, I4, I5, I10, I11, I12, I17, I18, and I19 of the second image 135 and F1 through F9 of the filter kernels 430 are respectively multiplied, and the value of the combination of the result values of the multiplication may be assigned as a value of M2 of the feature map 450.

While the filter kernel 430 moves along the stride to the last pixel of the second image 135, the convolution operation is performed between the pixel values in the second image 135 and the parameters of the filter kernel 430, and thus the feature map 450 having a certain size may be generated.

According to the present disclosure, values of parameters of a second DNN, for example, values of parameters of a filter kernel used in convolution layers of the second DNN (for example, F1 through F9 of the filter kernel 430), may be optimized through joint training of a first DNN and a second DNN. As described above, the AI up-scaler 234 may determine an up-scaling target corresponding to a down-scaling target of the first DNN based on AI data, and determine parameters corresponding to the determined up-scaling target as the parameters of the filter kernel used in the convolution layers of the second DNN.

Convolution layers included in the first DNN and the second DNN may perform processes according to the convolution operation process described with reference to FIG. 4, but the convolution operation process described with reference to FIG. 4 is only an example and is not limited thereto.

Referring back to FIG. 3, the feature maps output from the first convolution layer 310 may be input to a first activation layer 320.

The first activation layer 320 may assign a non-linear feature to each feature map. The first activation layer 320 may include a sigmoid function, a Tan h function, a rectified linear unit (ReLU) function, or the like, but is not limited thereto.

The first activation layer 320 assigning the non-linear feature indicates that at least one sample value of the feature map, which is an output of the first convolution layer 310, is changed. Here, the change is performed by applying the non-linear feature.

The first activation layer 320 determines whether to transmit sample values of the feature maps output from the first convolution layer 310 to the second convolution layer 330. For example, some of the sample values of the feature maps are activated by the first activation layer 320 and transmitted to the second convolution layer 330, and some of the sample values are deactivated by the first activation layer 320 and not transmitted to the second convolution layer 330. The intrinsic characteristics of the second image 135 represented by the feature maps are emphasized by the first activation layer 320.

Feature maps 325 output from the first activation layer 320 are input to the second convolution layer 330. One of the feature maps 325 shown in FIG. 3 is a result of processing the feature map 450 described with reference to FIG. 4 in the first activation layer 320.

3×3×4 indicated in the second convolution layer 330 indicates that a convolution process is performed on the feature maps 325 by using four filter kernels having a size of 3×3. An output of the second convolution layer 330 is input to a second activation layer 340. The second activation layer 340 may assign a non-linear feature to input data.

Feature maps 345 output from the second activation layer 340 are input to a third convolution layer 350. 3×3×1 indicated in the third convolution layer 350 shown in FIG. 3 indicates that a convolution process is performed to generate one output image by using one filter kernel having a size of 3×3. The third convolution layer 350 is a layer for outputting a final image and generates one output by using one filter kernel. According to an embodiment of the disclosure, the third convolution layer 350 may output the third image 145 as a result of a convolution operation.

There may be a plurality of pieces of DNN setting information indicating the numbers of filter kernels of the first, second, and third convolution layers 310, 330, and 350 of the second DNN 300, a parameter of filter kernels of the first, second, and third convolution layers 310, 330, and 350 of the second DNN 300, and the like, as will be described later, and the plurality of pieces of DNN setting information should be connected to a plurality of pieces of DNN setting information of a first DNN. The connection between the plurality of pieces of DNN setting information of the second DNN and the plurality of pieces of DNN setting information of the first DNN may be realized via joint training of the first DNN and the second DNN.

In FIG. 3, the second DNN 300 includes three convolution layers (the first, second, and third convolution layers 310, 330, and 350) and two activation layers (the first and second activation layers 320 and 340), but this is only an example, and the numbers of convolution layers and activation layers may vary according to an embodiment. Also, according to an embodiment, the second DNN 300 may be implemented as a recurrent neural network (RNN). In this case, a convolutional neural network (CNN) structure of the second DNN 300 according to an embodiment of the disclosure is changed to an RNN structure.

According to an embodiment, the AI up-scaler 234 may include at least one arithmetic logic unit (ALU) for the convolution operation and the operation of the activation layer described above. The ALU may be implemented as a processor. For the convolution operation, the ALU may include a multiplier that performs multiplication between sample values of the second image 135 or the feature map output from previous layer and sample values of the filter kernel, and an adder that adds result values of the multiplication. Also, for the operation of the activation layer, the ALU may include a multiplier that multiplies an input sample value by a weight used in a pre-determined sigmoid function, a Tan h function, or an ReLU function, and a comparator that compares a multiplication result and a certain value to determine whether to transmit the input sample value to a next layer.

Hereinafter, a method, performed by the AI up-scaler 234, of performing the AI up-scaling on the second image 135 according to the up-scaling target will be described.

According to an embodiment, the AI up-scaler 234 may store a plurality of pieces of DNN setting information settable in a second DNN.

Here, the DNN setting information may include information about at least one of the number of convolution layers included in the second DNN, the number of filter kernels for each convolution layer, or a parameter of each filter kernel. The plurality of pieces of DNN setting information may respectively correspond to various up-scaling targets, and the second DNN may operate based on DNN setting information corresponding to a certain up-scaling target. The second DNN may have different structures based on the DNN setting information. For example, the second DNN may include three convolution layers based on any piece of DNN setting information, and may include four convolution layers based on another piece of DNN setting information.

According to an embodiment, the DNN setting information may only include a parameter of a filter kernel used in the second DNN. In this case, the structure of the second DNN does not change, but only the parameter of the internal filter kernel may change based on the DNN setting information.

The AI up-scaler 234 may obtain the DNN setting information for performing AI up-scaling on the second image 135, among the plurality of pieces of DNN setting information. Each of the plurality of pieces of DNN setting information used at this time is information for obtaining the third image 145 of pre-determined resolution and/or pre-determined quality, and is trained jointly with a first DNN.

For example, one piece of DNN setting information among the plurality of pieces of DNN setting information may include information for obtaining the third image 145 of resolution twice higher than resolution of the second image 135, for example, the third image 145 of 4 K (4096×2160) twice higher than 2 K (2048×1080) of the second image 135, and another piece of DNN setting information may include information for obtaining the third image 145 of resolution four times higher than the resolution of the second image 135, for example, the third image 145 of 8 K (8192×4320) four times higher than 2 K (2048×1080) of the second image 135.

Figure 6:
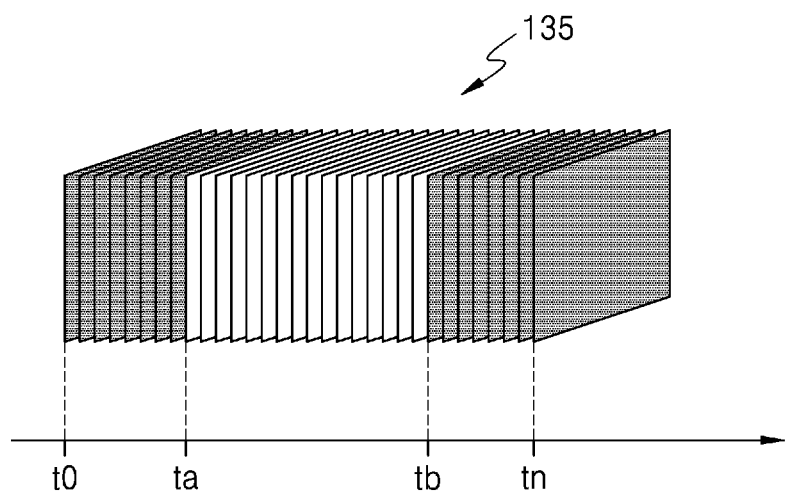
FIG. 6 is a diagram showing a second image including a plurality of frames.

Each of the plurality of pieces of DNN setting information is obtained jointly with DNN setting information of the first DNN of an AI encoding apparatus 600 of FIG. 6, and the AI up-scaler 234 obtains one piece of DNN setting information among the plurality of pieces of DNN setting information according to an enlargement ratio corresponding to a reduction ratio of the DNN setting information of the first DNN. In this regard, the AI up-scaler 234 may verify information of the first DNN. In order for the AI up-scaler 234 to verify the information of the first DNN, the AI decoding apparatus 200 according to an embodiment receives AI data including the information of the first DNN from the AI encoding apparatus 600.

In other words, the AI up-scaler 234 may verify information targeted by DNN setting information of the first DNN used to obtain the first image 115 and obtain the DNN setting information of the second DNN trained jointly with the DNN setting information of the first DNN, by using information received from the AI encoding apparatus 600.

When DNN setting information for performing the AI up-scaling on the second image 135 is obtained from among the plurality of pieces of DNN setting information, input data may be processed based on the second DNN operating according to the obtained DNN setting information.

For example, when any one piece of DNN setting information is obtained, the number of filter kernels included in each of the first, second, and third convolution layers 310, 330, and 350 of the second DNN 300 of FIG. 3, and the parameters of the filter kernels are set to values included in the obtained DNN setting information.

In particular, parameters of a filter kernel of 3×3 used in any one convolution layer of the second DNN of FIG. 4 are set to {1, 1, 1, 1, 1, 1, 1, 1, 1}, and when DNN setting information is changed afterwards, the parameters are replaced by {2, 2, 2, 2, 2, 2, 2, 2, 2} that are parameters included in the changed DNN setting information.

The AI up-scaler 234 may obtain the DNN setting information for AI up-scaling from among the plurality of pieces of DNN setting information, based on information included in the AI data, and the AI data used to obtain the DNN setting information will now be described.

According to an embodiment, the AI up-scaler 234 may obtain the DNN setting information for AI up-scaling from among the plurality of pieces of DNN setting information, based on difference information included in the AI data. For example, when it is verified that the resolution (for example, 4 K (4096×2160)) of the original image 105 is twice higher than the resolution (for example, 2 K (2048×1080)) of the first image 115, based on the difference information, the AI up-scaler 234 may obtain the DNN setting information for increasing the resolution of the second image 135 two times.

According to another embodiment, the AI up-scaler 234 may obtain the DNN setting information for AI up-scaling the second image 135 from among the plurality of pieces of DNN setting information, based on information related to the first image 115 included in the AI data. The AI up-scaler 234 may pre-determine a mapping relationship between image-related information and DNN setting information, and obtain the DNN setting information mapped to the information related to the first image 115.

FIG. 5 is a table showing a mapping relationship between several pieces of image-related information and several pieces of DNN setting information.

Through an embodiment according to FIG. 5, it will be determined that AI encoding and AI decoding processes according to an embodiment of the disclosure do not only consider a change of resolution. As shown in FIG. 5, DNN setting information may be selected considering resolution, such as standard definition (SD), high definition (HD), or full HD, a bitrate, such as 10 Mbps, 15 Mbps, or 20 Mbps, and codec information, such as AV1, H.264, or HEVC, individually or collectively. For such consideration of the resolution, the bitrate and the codec information, training in consideration of each element should be jointly performed with encoding and decoding processes during an AI training process (see FIG. 9).

Accordingly, when a plurality of pieces of DNN setting information are provided based on image-related information including a codec type, resolution of an image, and the like, as shown in FIG. 5 according to training, the DNN setting information for AI up-scaling the second image 135 may be obtained based on the information related to the first image 115 received during the AI decoding process.

In other words, the AI up-scaler 234 is capable of using DNN setting information according to image-related information by matching the image-related information at the left of a table of FIG. 5 and the DNN setting information at the right of the table.

As shown in FIG. 5, when it is verified, from the information related to the first image 115, that the resolution of the first image 115 is SD, a bitrate of image data obtained as a result of performing first encoding on the first image 115 is 10 Mbps, and the first encoding is performed on the first image 115 via AV1 codec, the AI up-scaler 234 may use A DNN setting information among the plurality of pieces of DNN setting information.

Also, when it is verified, from the information related to the first image 115, that the resolution of the first image 115 is HD, the bitrate of the image data obtained as the result of performing the first encoding is 15 Mbps, and the first encoding is performed via H.264 codec, the AI up-scaler 234 may use B DNN setting information among the plurality of pieces of DNN setting information.

Also, when it is verified, from the information related to the first image 115, that the resolution of the first image 115 is full HD, the bitrate of the image data obtained as the result of performing the first encoding is 20 Mbps, and the first encoding is performed via HEVC codec, the AI up-scaler 234 may use C DNN setting information among the plurality of pieces of DNN setting information, and when it is verified that the resolution of the first image 115 is full HD, the bitrate of the image data obtained as the result of performing the first encoding is 15 Mbps, and the first encoding is performed via HEVC codec, the AI up-scaler 234 may use D DNN setting information among the plurality of pieces of DNN setting information. One of the C DNN setting information and the D DNN setting information is selected based on whether the bitrate of the image data obtained as the result of performing the first encoding on the first image 115 is 20 Mbps or 15 Mbps. The different bitrates of the image data, obtained when the first encoding is performed on the first image 115 of the same resolution via the same codec, indicates different qualities of reconstructed images. Accordingly, a first DNN and a second DNN may be jointly trained based on certain image quality, and accordingly, the AI up-scaler 234 may obtain DNN setting information according to a bitrate of image data indicating the quality of the second image 135.

According to another embodiment, the AI up-scaler 234 may obtain the DNN setting information for performing AI up-scaling on the second image 135 from among the plurality of pieces of DNN setting information considering both information (prediction mode information, motion information, quantization parameter information, and the like) provided from the first decoder 232 and the information related to the first image 115 included in the AI data. For example, the AI up-scaler 234 may receive quantization parameter information used during a first encoding process of the first image 115 from the first decoder 232, verify a bitrate of image data obtained as an encoding result of the first image 115 from AI data, and obtain DNN setting information corresponding to the quantization parameter information and the bitrate. Even when the bitrates are the same, the quality of reconstructed images may vary according to the complexity of an image. A bitrate is a value representing the entire first image 115 on which first encoding is performed, and the quality of each frame may vary even within the first image 115. Accordingly, DNN setting information more suitable for the second image 135 may be obtained when prediction mode information, motion information, and/or a quantization parameter obtainable for each frame from the first decoder 232 are/is considered together, compared to when only the AI data is used.

Also, according to an embodiment, the AI data may include an identifier of mutually agreed DNN setting information. An identifier of DNN setting information is information for distinguishing a pair of pieces of DNN setting information jointly trained between the first DNN and the second DNN, such that AI up-scaling is performed on the second image 135 to the up-scaling target corresponding to the down-scaling target of the first DNN. The AI up-scaler 234 may perform AI up-scaling on the second image 135 by using the DNN setting information corresponding to the identifier of the DNN setting information, after obtaining the identifier of the DNN setting information included in the AI data. For example, identifiers indicating each of the plurality of DNN setting information settable in the first DNN and identifiers indicating each of the plurality of DNN setting information settable in the second DNN may be previously designated. In this case, the same identifier may be designated for a pair of DNN setting information settable in each of the first DNN and the second DNN. The AI data may include an identifier of DNN setting information set in the first DNN for AI down-scaling of the original image 105. The AI up-scaler 234 that receives the AI data may perform AI up-scaling on the second image 135 by using the DNN setting information indicated by the identifier included in the AI data among the plurality of DNN setting information.

Also, according to an embodiment, the AI data may include the DNN setting information. The AI up-scaler 234 may perform AI up-scaling on the second image 135 by using the DNN setting information after obtaining the DNN setting information included in the AI data.

According to an embodiment, when pieces of information (for example, the number of convolution layers, the number of filter kernels for each convolution layer, a parameter of each filter kernel, and the like) constituting the DNN setting information are stored in a form of a lookup table, the AI up-scaler 234 may obtain the DNN setting information by combining some values selected from values in the lookup table, based on information included in the AI data, and perform AI up-scaling on the second image 135 by using the obtained DNN setting information.

According to an embodiment, when a structure of DNN corresponding to the up-scaling target is determined, the AI up-scaler 234 may obtain the DNN setting information, for example, parameters of a filter kernel, corresponding to the determined structure of DNN.

The AI up-scaler 234 obtains the DNN setting information of the second DNN through the AI data including information related to the first DNN, and performs AI up-scaling on the second image 135 through the second DNN set based on the obtained DNN setting information, and in this case, memory usage and throughput may be reduced compared to when features of the second image 135 are directly analyzed for up-scaling.

According to an embodiment, when the second image 135 includes a plurality of frames, the AI up-scaler 234 may independently obtain DNN setting information for a certain number of frames, or may obtain common DNN setting information for entire frames.

FIG. 6 is a diagram showing the second image 135 including a plurality of frames.

As shown in FIG. 6, the second image 135 may include frames t0 through tn.

According to an embodiment, the AI up-scaler 234 may obtain DNN setting information of a second DNN through AI data, and perform AI up-scaling on the frames t0 through tn based on the obtained DNN setting information. In other words, the frames t0 through tn may be processed via AI up-scaling based on common DNN setting information.

According to another embodiment, the AI up-scaler 234 may perform AI up-scaling on some of the frames t0 through tn, for example, the frames t0 through ta, by using 'A' DNN setting information obtained from AI data, and perform AI up-scaling on the frames ta+1 through tb by using 'B' DNN setting information obtained from the AI data. Also, the AI up-scaler 234 may perform AI up-scaling on the frames tb+1 through tn by using 'C' DNN setting information obtained from the AI data. In other words, the AI up-scaler 234 may independently obtain DNN setting information for each group including a certain number of frames among the plurality of frames, and perform AI up-scaling on frames included in each group by using the independently obtained DNN setting information.

According to another embodiment, the AI up-scaler 234 may independently obtain DNN setting information for each frame forming the second image 135. In other words, when the second image 135 includes three frames, the AI up-scaler 234 may perform AI up-scaling on a first frame by using DNN setting information obtained in relation to the first frame, perform AI up-scaling on a second frame by using DNN setting information obtained in relation to the second frame, and perform AI up-scaling on a third frame by using DNN setting information obtained in relation to the third frame. DNN setting information may be independently obtained for each frame included in the second image 135, according to a method of obtaining DNN setting information based on information (prediction mode information, motion information, quantization parameter information, or the like) provided from the first decoder 232 and information related to the first image 115 included in the AI data described above. This is because the mode information, the quantization parameter information, or the like may be determined independently for each frame included in the second image 135.

According to another embodiment, the AI data may include information about to which frame DNN setting information obtained based on the AI data is valid. For example, when the AI data includes information indicating that DNN setting information is valid up to the frame ta, the AI up-scaler 234 performs AI up-scaling on the frames t0 through ta by using DNN setting information obtained based on the AI data. Also, when another piece of AI data includes information indicating that DNN setting information is valid up to the frame tn, the AI up-scaler 234 performs AI up-scaling on the frames ta+1 through tn by using DNN setting information obtained based on the other piece of AI data.

Hereinafter, the AI encoding apparatus 600 for performing AI encoding on the original image 105 will be described with reference to FIG. 7.

Figure 7:
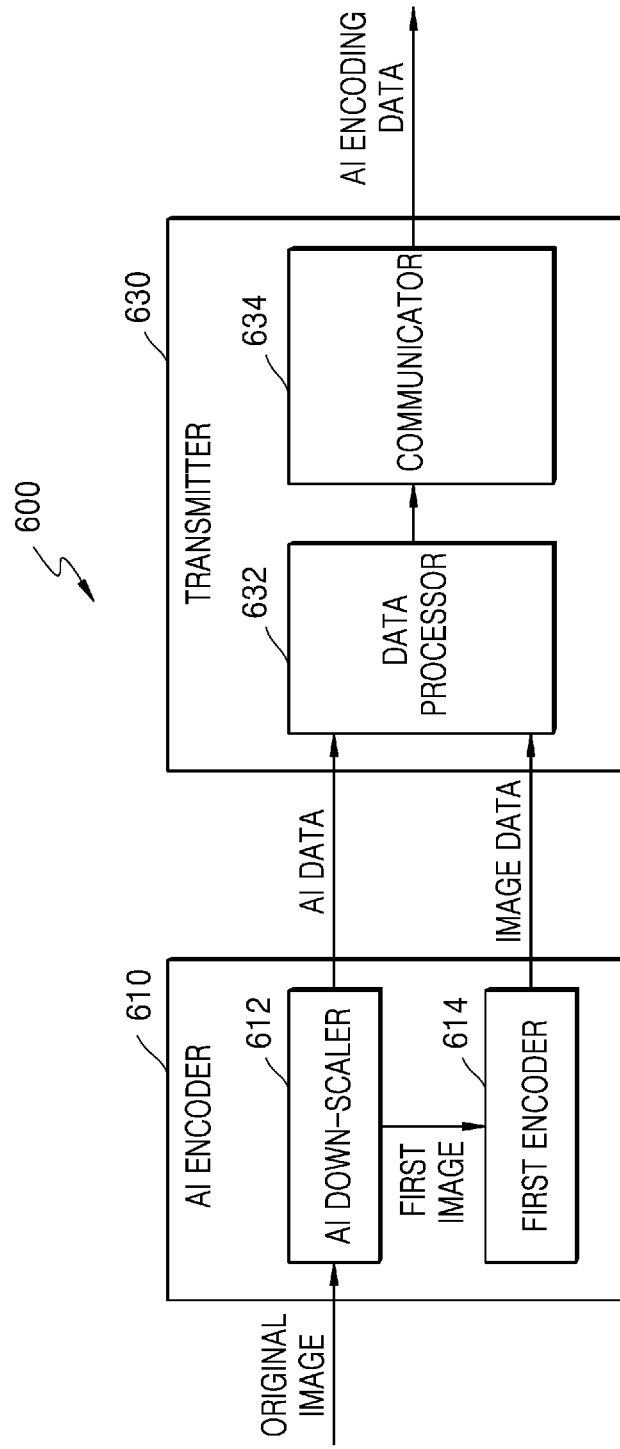
FIG. 7 is a block diagram of a configuration of an AI encoding apparatus according to an embodiment.

FIG. 7 is a block diagram of a configuration of the AI encoding apparatus 600 according to an embodiment.

Referring to FIG. 7, the AI encoding apparatus 600 may include an AI encoder 610 and a transmitter 630. The AI encoder 610 may include an AI down-scaler 612 and a first encoder 614. The transmitter 630 may include a data processor 632 and a communicator 634.

In FIG. 7, the AI encoder 610 and the transmitter 630 are illustrated as separate devices, but the AI encoder 610 and the transmitter 630 may be implemented through one processor. In this case, the AI encoder 610 and the transmitter 630 may be implemented through an dedicated processor or through a combination of software and general-purpose processor such as AP, CPU or graphics processing unit GPU. The dedicated processor may be implemented by including a memory for implementing an embodiment of the disclosure or by including a memory processor for using an external memory.

Also, the AI encoder 610 and the transmitter 630 may be configured by a plurality of processors. In this case, the AI encoder 610 and the transmitter 630 may be implemented through a combination of dedicated processors or through a combination of software and a plurality of general-purpose processors such as AP, CPU or GPU. The AI down-scaler 612 and the first encoder 614 may be implemented through different processors.

The AI encoder 610 performs AI down-scaling on the original image 105 and first encoding on the first image 115, and transmits AI data and image data to the transmitter 630. The transmitter 630 transmits the AI data and the image data to the AI decoding apparatus 200.

The image data includes data obtained as a result of performing the first encoding on the first image 115. The image data may include data obtained based on pixel values in the first image 115, for example, residual data that is a difference between the first image 115 and prediction data of the first image 115. Also, the image data includes information used during a first encoding process of the first image 115. For example, the image data may include prediction mode information, motion information, quantization parameter information used to perform the first encoding on the first image 115, and the like.

The AI data includes information enabling AI up-scaling to be performed on the second image 135 to an up-scaling target corresponding to a down-scaling target of a first DNN. According to an embodiment, the AI data may include difference information between the original image 105 and the first image 115. Also, the AI data may include information related to the first image 115. The information related to the first image 115 may include information about at least one of resolution of the first image 115, a bitrate of the image data obtained as the result of performing the first encoding on the first image 115, or a codec type used during the first encoding of the first image 115.

According to an embodiment, the AI data may include an identifier of mutually agreed DNN setting information such that the AI up-scaling is performed on the second image 135 to the up-scaling target corresponding to the down-scaling target of the first DNN.

Also, according to an embodiment, the AI data may include DNN setting information settable in a second DNN.

The AI down-scaler 612 may obtain the first image 115 obtained by performing the AI down-scaling on the original image 105 through the first DNN. The AI down-scaler 612 may determine the down-scaling target of the original image 105, based on a pre-determined standard.

In order to obtain the first image 115 matching the down-scaling target, the AI down-scaler 612 may store a plurality of pieces of DNN setting information settable in the first DNN. The AI down-scaler 612 obtains DNN setting information corresponding to the down-scaling target from among the plurality of pieces of DNN setting information, and performs the AI down-scaling on the original image 105 through the first DNN set in the obtained DNN setting information.

Each of the plurality of pieces of DNN setting information may be trained to obtain the first image 115 of pre-determined resolution and/or pre-determined quality. For example, any one piece of DNN setting information among the plurality of pieces of DNN setting information may include information for obtaining the first image 115 of resolution half resolution of the original image 105, for example, the first image 115 of 2 K (2048×1080) half 4 K (4096×2160) of the original image 105, and another piece of DNN setting information may include information for obtaining the first image 115 of resolution quarter resolution of the original image 105, for example, the first image 115 of 2 K (2048×1080) quarter 8 K (8192×4320) of the original image 105.

According to an embodiment, when pieces of information (for example, the number of convolution layers, the number of filter kernels for each convolution layer, a parameter of each filter kernel, and the like) constituting the DNN setting information are stored in a form of a lookup table, the AI down-scaler 612 may obtain the DNN setting information by combining some values selected from values in the lookup table, based on the down-scaling target, and perform AI down-scaling on the original image 105 by using the obtained DNN setting information.

According to an embodiment, the AI down-scaler 612 may determine a structure of DNN corresponding to the down-scaling target, and obtain DNN setting information corresponding to the determined structure of DNN, for example, obtain parameters of a filter kernel.

The plurality of pieces of DNN setting information for performing the AI down-scaling on the original image 105 may have an optimized value as the first DNN and the second DNN are jointly trained. Here, each piece of DNN setting information includes at least one of the number of convolution layers included in the first DNN, the number of filter kernels for each convolution layer, or a parameter of each filter kernel.

The AI down-scaler 612 may set the first DNN with the DNN setting information obtained for performing the AI down-scaling on the original image 105 to obtain the first image 115 of certain resolution and/or certain quality through the first DNN. When the DNN setting information for performing the AI down-scaling on the original image 105 is obtained from the plurality of pieces of DNN setting information, each layer in the first DNN may process input data based on information included in the DNN setting information.

Hereinafter, a method, performed by the AI down-scaler 612, of determining the down-scaling target will be described. The down-scaling target may indicate, for example, by how much is resolution decreased from the original image 105 to obtain the first image 115.

According to an embodiment, the AI down-scaler 612 may determine the down-scaling target based on at least one of a compression ratio (for example, a resolution difference between the original image 105 and the first image 115, target bitrate, or the like), compression quality (for example, type of bitrate), compression history information, or a type of the original image 105.

For example, the AI down-scaler 612 may determine the down-scaling target based on the compression ratio, the compression quality, or the like, which is pre-set or input from a user.

As another example, the AI down-scaler 612 may determine the down-scaling target by using the compression history information stored in the AI encoding apparatus 600. For example, according to the compression history information usable by the AI encoding apparatus 600, encoding quality, a compression ratio, or the like preferred by the user may be determined, and the down-scaling target may be determined according to the encoding quality determined based on the compression history information. For example, the resolution, quality, or the like of the first image 115 may be determined according to the encoding quality that has been used most often according to the compression history information.

As another example, the AI down-scaler 612 may determine the down-scaling target based on the encoding quality that has been used more frequently than a certain threshold value (for example, average quality of the encoding quality that has been used more frequently than the certain threshold value), according to the compression history information.

As another example, the AI down-scaler 612 may determine the down-scaling target, based on the resolution, type (for example, a file format), or the like of the original image 105.

According to an embodiment, when the original image 105 includes a plurality of frames, the AI down-scaler 612 may independently determine down-scaling target for a certain number of frames, or may determine down-scaling target for entire frames.

According to an embodiment, the AI down-scaler 612 may divide the frames included in the original image 105 into a certain number of groups, and independently determine the down-scaling target for each group. The same or different down-scaling targets may be determined for each group. The number of frames included in the groups may be the same or different according to the each group.

According to another embodiment, the AI down-scaler 612 may independently determine a down-scaling target for each frame included in the original image 105. The same or different down-scaling targets may be determined for each frame.

Hereinafter, an example of a structure of a first DNN 700 on which AI down-scaling is based will be described.

Figure 8:
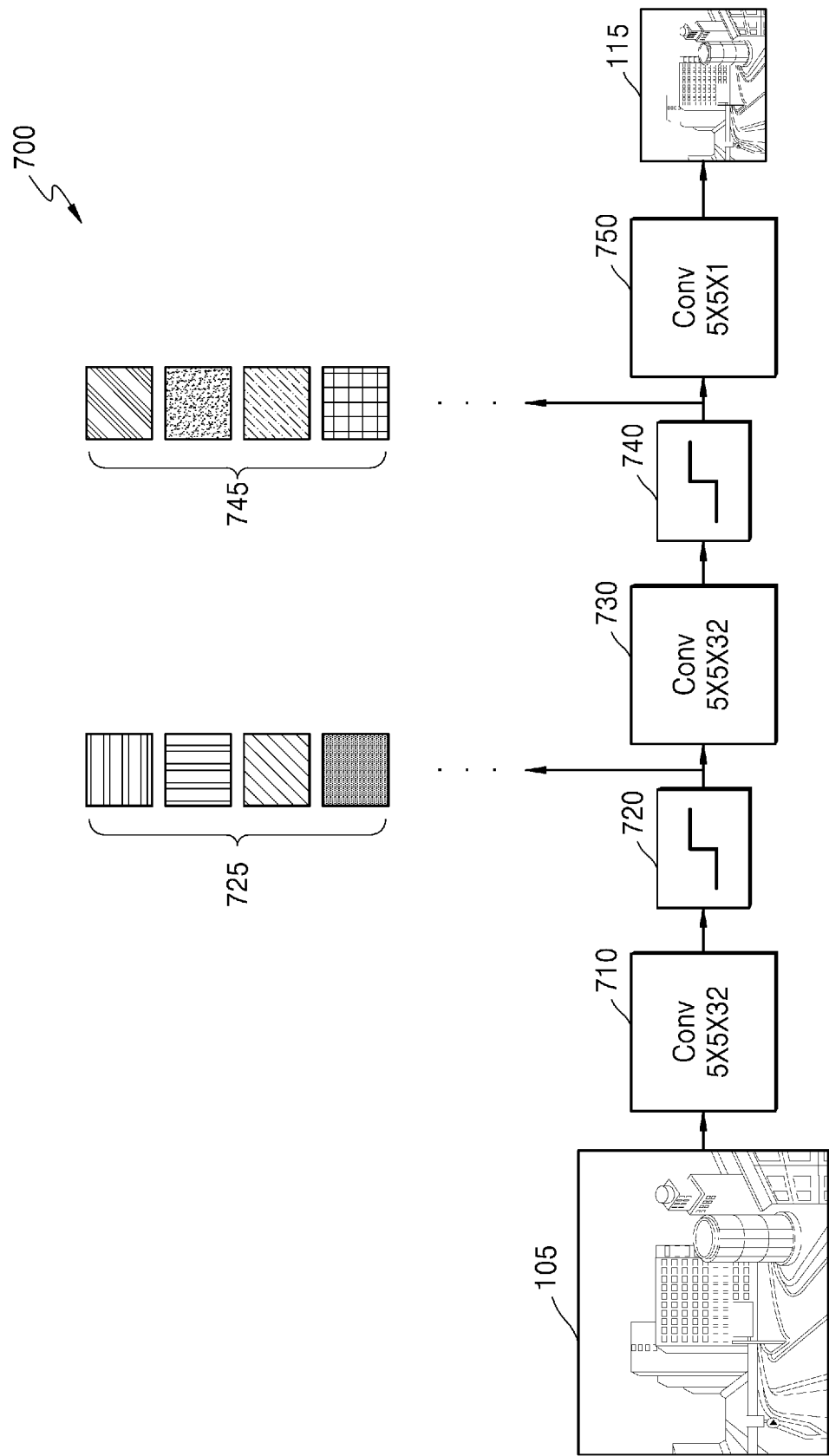
FIG. 8 is a diagram showing a first DNN for performing AI down-scaling on an original image.

FIG. 8 is a diagram showing the first DNN 700 for performing AI down-scaling on the original image 105.

As shown in FIG. 8, the original image 105 is input to a first convolution layer 710. The first convolution layer 710 performs a convolution process on the original image 105 by using 32 filter kernels having a size of 5×5. 32 feature maps generated as a result of the convolution process are input to a first activation layer 720. The first activation layer 720 may assign a non-linear feature to the 32 feature maps.

The first activation layer 720 determines whether to transmit sample values of the feature maps output from the first convolution layer 710 to the second convolution layer 730. For example, some of the sample values of the feature maps are activated by the first activation layer 720 and transmitted to the second convolution layer 730, and some of the sample values are deactivated by the first activation layer 720 and not transmitted to the second convolution layer 730. Information represented by the feature maps output from the first convolution layer 710 is emphasized by the first activation layer 720.

An output 725 of the first activation layer 720 is input to a second convolution layer 730. The second convolution layer 730 performs a convolution process on input data by using 32 filter kernels having a size of 5×5. 32 feature maps output as a result of the convolution process are input to a second activation layer 740, and the second activation layer 740 may assign a non-linear feature to the 32 feature maps.

An output 745 of the second activation layer 740 is input to a third convolution layer 750. The third convolution layer 750 performs a convolution process on input data by using one filter kernel having a size of 5×5. As a result of the convolution process, one image may be output from the third convolution layer 750. The third convolution layer 750 generates one output by using the one filter kernel as a layer for outputting a final image. According to an embodiment of the disclosure, the third convolution layer 750 may output the first image 115 as a result of a convolution operation.

There may be a plurality of pieces of DNN setting information indicating the numbers of filter kernels of the first, second, and third convolution layers 710, 730, and 750 of the first DNN 700, a parameter of each filter kernel of the first, second, and third convolution layers 710, 730, and 750 of the first DNN 700, and the like, and the plurality of pieces of DNN setting information may be connected to a plurality of pieces of DNN setting information of a second DNN. The connection between the plurality of pieces of DNN setting information of the first DNN and the plurality of pieces of DNN setting information of the second DNN may be realized via joint training of the first DNN and the second DNN.

In FIG. 8, the first DNN 700 includes three convolution layers (the first, second, and third convolution layers 710, 730, and 750) and two activation layers (the first and second activation layers 720 and 740), but this is only an example, and the numbers of convolution layers and activation layers may vary according to an embodiment. Also, according to an embodiment, the first DNN 700 may be implemented as an RNN. In this case, a CNN structure of the first DNN 700 according to an embodiment of the disclosure is changed to an RNN structure.

According to an embodiment, the AI down-scaler 612 may include at least one ALU for the convolution operation and the operation of the activation layer described above. The ALU may be implemented as a processor. For the convolution operation, the ALU may include a multiplier that performs multiplication between sample values of the original image 105 or the feature map output from previous layer and sample values of the filter kernel, and an adder that adds result values of the multiplication. Also, for the operation of the activation layer, the ALU may include a multiplier that multiplies an input sample value by a weight used in a pre-determined sigmoid function, a Tan h function, or an ReLU function, and a comparator that compares a multiplication result and a certain value to determine whether to transmit the input sample value to a next layer.

Referring back to FIG. 7, upon receiving the first image 115 from the AI down-scaler 612, the first encoder 614 may reduce an information amount of the first image 115 by performing first encoding on the first image 115. The image data corresponding to the first image 115 may be obtained as a result of performing the first encoding by the first encoder 614.

The data processor 632 processes at least one of the AI data or the image data to be transmitted in a certain form. For example, when the AI data and the image data are to be transmitted in a form of a bitstream, the data processor 632 may process the AI data to be expressed in a form of a bitstream, and transmit the image data and the AI data in a form of one bitstream through the communicator 634. As another example, the data processor 632 may process the AI data to be expressed in a form of bitstream, and transmit each of a bitstream corresponding to the AI data and a bitstream corresponding to the image data through the communicator 634. As another example, the data processor 632 may process the AI data to be expressed in a form of a frame or packet, and transmit the image data in a form of a bitstream and the AI data in a form of a frame or packet through the communicator 634.

The communicator 634 transmits AI encoding data obtained as a result of performing AI encoding, through a network. The AI encoding data obtained as the result of performing AI encoding includes the image data and the AI data. The image data and the AI data may be transmitted through a same type of network or different types of networks.

According to an embodiment, the AI encoding data obtained as a result of processes of the data processor 632 may be stored in a data storage medium including a magnetic medium such as a hard disk, a floppy disk, or a magnetic tape, an optical recording medium such as CD-ROM or DVD, or a magneto-optical medium such as a floptical disk.

Hereinafter, a method of jointly training the first DNN 700 and the second DNN 300 will be described with reference to FIG. 9.

Figure 9:
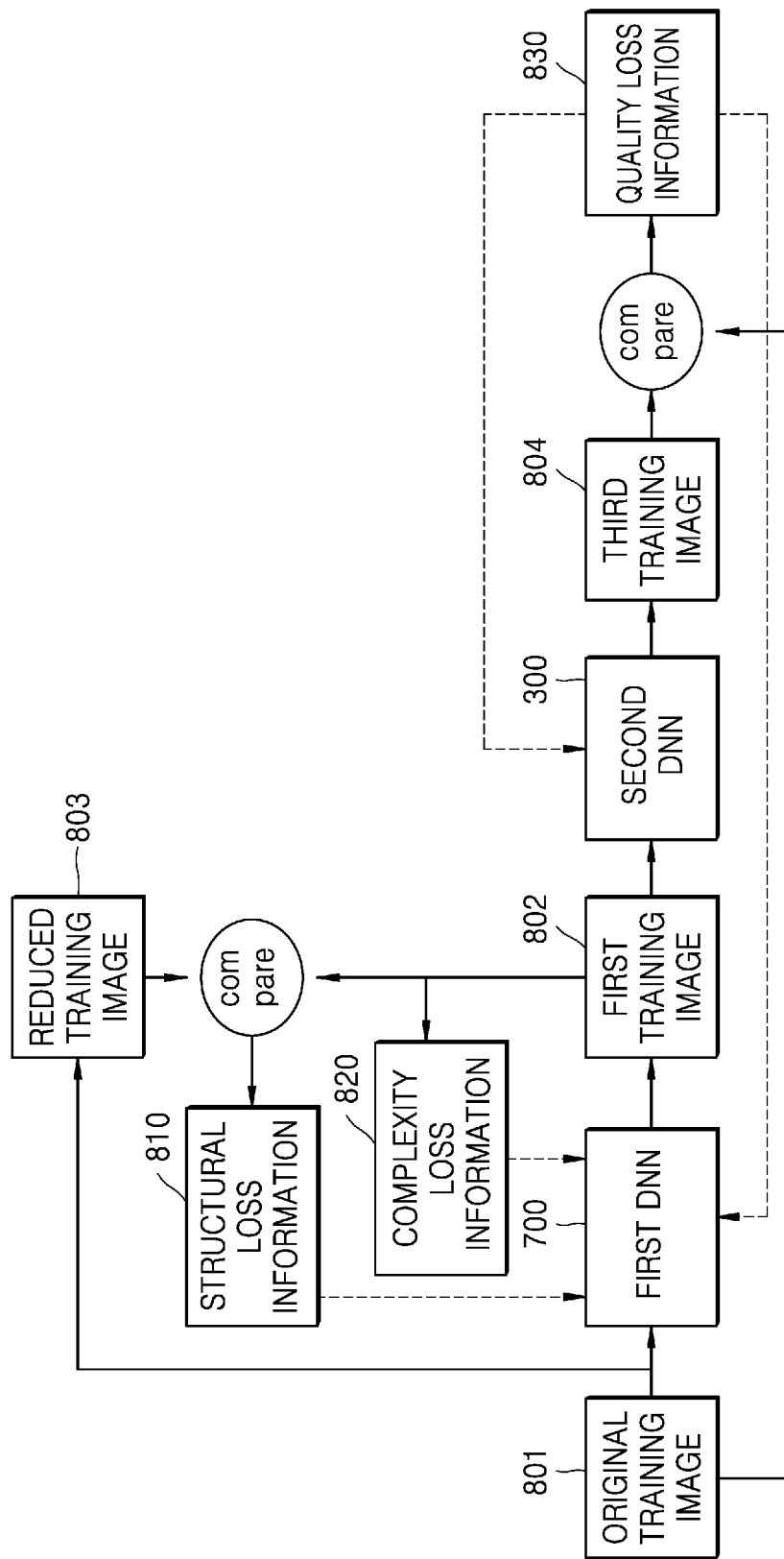
FIG. 9 is a diagram for describing a method of training a first DNN and a second DNN.

FIG. 9 is a diagram for describing a method of training the first DNN 700 and the second DNN 300.

In an embodiment, the original image 105 on which AI encoding is performed through an AI encoding process is reconstructed to the third image 145 via an AI decoding process, and in order to maintain similarity between the original image 105 and the third image 145 obtained as a result of AI decoding, connectivity is between the AI encoding process and the AI decoding process is required. In other words, information lost in the AI encoding process needs to be reconstructed during the AI decoding process, and in this regard, the first DNN 700 and the second DNN 300 need to be jointly trained.

For accurate AI decoding, ultimately, quality loss information 830 corresponding to a result of comparing a third training image 804 and an original training image 801 shown in FIG. 9 needs to be reduced. Accordingly, the quality loss information 830 is used to train both of the first DNN 700 and the second DNN 300.

First, a training process shown in FIG. 9 will be described.

In FIG. 9, the original training image 801 is an image on which AI down-scaling is to be performed and a first training image 802 is an image obtained by performing AI down-scaling on the original training image 801. Also, the third training image 804 is an image obtained by performing AI up-scaling on the first training image 802.

The original training image 801 includes a still image or a moving image including a plurality of frames. According to an embodiment, the original training image 801 may include a luminance image extracted from the still image or the moving image including the plurality of frames. Also, according to an embodiment, the original training image 801 may include a patch image extracted from the still image or the moving image including the plurality of frames. When the original training image 801 includes the plurality of frames, the first training image 802, the second training image, and the third training image 804 also each include a plurality of frames. When the plurality of frames of the original training image 801 are sequentially input to the first DNN 700, the plurality of frames of the first training image 802, the second training image and the third training image 804 may be sequentially obtained through the first DNN 700 and the second DNN 300.

For joint training of the first DNN 700 and the second DNN 300, the original training image 801 is input to the first DNN 700. The original training image 801 input to the first DNN 700 is output as the first training image 802 via the AI down-scaling, and the first training image 802 is input to the second DNN 300. The third training image 804 is output as a result of performing the AI up-scaling on the first training image 802.

Referring to FIG. 9, the first training image 802 is input to the second DNN 300, and according to an embodiment, a second training image obtained as first encoding and first decoding are performed on the first training image 802 may be input to the second DNN 300. In order to input the second training image to the second DNN 300, any one codec among MPEG-2, H.264, MPEG-4, HEVC, VC-1, VP8, VP9, and AV1 may be used. In particular, any one codec among MPEG-2, H.264, MPEG-4, HEVC, VC-1, VP8, VP9, and AV1 may be used to perform first encoding on the first training image 802 and first decoding on image data corresponding to the first training image 802.

Referring to FIG. 9, separate from the first training image 802 being output through the first DNN 700, a reduced training image 803 obtained by performing legacy down-scaling on the original training image 801 is obtained. Here, the legacy down-scaling may include at least one of bilinear scaling, bicubic scaling, lanczos scaling, or stair step scaling.

In order to prevent a structural feature of the first image 115 from deviating greatly from a structural feature of the original image 105, the reduced training image 803 is obtained to preserve the structural feature of the original training image 801.

Before training is performed, the first DNN 700 and the second DNN 300 may be set to pre-determined DNN setting information. When the training is performed, structural loss information 810, complexity loss information 820, and the quality loss information 830 may be determined.

The structural loss information 810 may be determined based on a result of comparing the reduced training image 803 and the first training image 802. For example, the structural loss information 810 may correspond to a difference between structural information of the reduced training image 803 and structural information of the first training image 802. Structural information may include various features extractable from an image, such as luminance, contrast, histogram, or the like of the image. The structural loss information 810 indicates how much structural information of the original training image 801 is maintained in the first training image 802. When the structural loss information 810 is small, the structural information of the first training image 802 is similar to the structural information of the original training image 801.

The complexity loss information 820 may be determined based on spatial complexity of the first training image 802. For example, a total variance value of the first training image 802 may be used as the spatial complexity. The complexity loss information 820 is related to a bitrate of image data obtained by performing first encoding on the first training image 802. It is defined that the bitrate of the image data is low when the complexity loss information 820 is small.

The quality loss information 830 may be determined based on a result of comparing the original training image 801 and the third training image 804. The quality loss information 830 may include at least one of an L1-norm value, an L2-norm value, an Structural Similarity (SSIM) value, a Peak Signal-To-Noise Ratio-Human Vision System (PSNR-HVS) value, an Multiscale SSIM (MS-SSIM) value, a Variance Inflation Factor (VIF) value, or a Video Multimethod Assessment Fusion (VMAF) value regarding the difference between the original training image 801 and the third training image 804. The quality loss information 830 indicates how similar the third training image 804 is to the original training image 801. The third training image 804 is more similar to the original training image 801 when the quality loss information 830 is small.

Referring to FIG. 9, the structural loss information 810, the complexity loss information 820 and the quality loss information 830 are used to train the first DNN 700, and the quality loss information 830 is used to train the second DNN 300. In other words, the quality loss information 830 is used to train both the first and second DNNs 700 and 300.

The first DNN 700 may update a parameter such that final loss information determined based on the first through quality loss information 810 through 830 is reduced or minimized. Also, the second DNN 300 may update a parameter such that the quality loss information 830 is reduced or minimized.

The final loss information for training the first DNN 700 and the second DNN 300 may be determined as Equation 1 below.

$$\text{LossDS}=a\times\text{Structural loss information}+b\times\text{Complexity loss information}+c\times\text{Quality loss information}$$

$$\text{LossUS}=d\times\text{Quality loss information} \quad \text{[Equation 1]}$$

In Equation 1, LossDS indicates final loss information to be reduced or minimized to train the first DNN 700, and LossUS indicates final loss information to be reduced or minimized to train the second DNN 300. Also, a, b, c and d may be pre-determined certain weights.

In other words, the first DNN 700 updates parameters in a direction LossDS of Equation 1 is reduced, and the second DNN 300 updates parameters in a direction LossUS is reduced. When the parameters of the first DNN 700 are updated according to LossDS derived during the training, the first training image 802 obtained based on the updated parameters becomes different from a previous first training image 802 obtained based on not updated parameters, and accordingly, the third training image 804 also becomes different from a previous third training image 804. When the third training image 804 becomes different from the previous third training image 804, the quality loss information 830 is also newly determined, and the second DNN 300 updates the parameters accordingly. When the quality loss information 830 is newly determined, LossDS is also newly determined, and the first DNN 700 updates the parameters according to newly determined LossDS. In other words, updating of the parameters of the first DNN 700 leads to updating of the parameters of the second DNN 300, and updating of the parameters of the second DNN 300 leads to updating of the parameters of the first DNN 700. In other words, because the first DNN 700 and the second DNN 300 are jointly trained by sharing the quality loss information 830, the parameters of the first DNN 700 and the parameters of the second DNN 300 may be jointly optimized.

Referring to Equation 1, it is verified that LossUS is determined according to the quality loss information 830, but this is only an example and LossUS may be determined based on at least one of the structural loss information 810 and the complexity loss information 820, and the quality loss information 830.

Hereinabove, it has been described that the AI up-scaler 234 of the AI decoding apparatus 200 and the AI down-scaler 612 of the AI encoding apparatus 600 store the plurality of pieces of DNN setting information, and methods of training each of the plurality of pieces of DNN setting information stored in the AI up-scaler 234 and the AI down-scaler 612 will now be described.

As described with reference to Equation 1, the first DNN 700 updates the parameters considering the similarity (the structural loss information 810) between the structural information of the first training image 802 and the structural information of the original training image 801, the bitrate (the complexity loss information 820) of the image data obtained as a result of performing first encoding on the first training image 802, and the difference (the quality loss information 830) between the third training image 804 and the original training image 801.

In particular, the parameters of the first DNN 700 may be updated such that the first training image 802 having similar structural information as the original training image 801 is obtained and the image data having a small bitrate is obtained when first encoding is performed on the first training image 802, and at the same time, the second DNN 300 performing AI up-scaling on the first training image 802 obtains the third training image 804 similar to the original training image 801.

A direction in which the parameters of the first DNN 700 are optimized may vary by adjusting the weights a, b, and c of Equation 1. For example, when the weight b is determined to be high, the parameters of the first DNN 700 may be updated by prioritizing a low bitrate over high quality of the third training image 804. Also, when the weight c is determined to be high, the parameters of the first DNN 700 may be updated by prioritizing high quality of the third training image 804 over a high bitrate or maintaining of the structural information of the original training image 801.

Also, the direction in which the parameters of the first DNN 700 are optimized may vary according to a type of codec used to perform first encoding on the first training image 802. This is because the second training image to be input to the second DNN 300 may vary according to the type of codec.

In other words, the parameters of the first DNN 700 and the parameters of the second DNN 300 may be jointly updated based on the weights a, b, and c, and the type of codec for performing first encoding on the first training image 802. Accordingly, when the first DNN 700 and the second DNN 300 are trained after determining the weights a, b, and c each to a certain value and determining the type of codec to a certain type, the parameters of the first DNN 700 and the parameters of the second DNN 300 connected and optimized to each other may be determined.

Also, when the first DNN 700 and the second DNN 300 are trained after changing the weights a, b, and c, and the type of codec, the parameters of the first DNN 700 and the parameters of the second DNN 300 connected and optimized to each other may be determined. In other words, the plurality of pieces of DNN setting information jointly trained with each other may be determined in the first DNN 700 and the second DNN 300 when the first DNN 700 and the second DNN 300 are trained while changing values of the weights a, b, and c, and the type of codec.

As described above with reference to FIG. 5, the plurality of pieces of DNN setting information of the first DNN 700 and the second DNN 300 may be mapped to the information related to the first image. To set such a mapping relationship, first encoding may be performed on the first training image 802 output from the first DNN 700 via a certain codec according to a certain bitrate and the second training image obtained by performing first decoding on a bitstream obtained as a result of performing the first encoding may be input to the second DNN 300. In other words, by training the first DNN 700 and the second DNN 300 after setting an environment such that the first encoding is performed on the first training image 802 of a certain resolution via the certain codec according to the certain bitrate, a DNN setting information pair mapped to the resolution of the first training image 802, a type of the codec used to perform the first encoding on the first training image 802, and the bitrate of the bitstream obtained as a result of performing the first encoding on the first training image 802 may be determined. By variously changing the resolution of the first training image 802, the type of codec used to perform the first encoding on the first training image 802 and the bitrate of the bitstream obtained according to the first encoding of the first training image 802, the mapping relationships between the plurality of DNN setting information of the first DNN 700 and the second DNN 300 and the pieces of information related to the first image may be determined.

Figure 10:
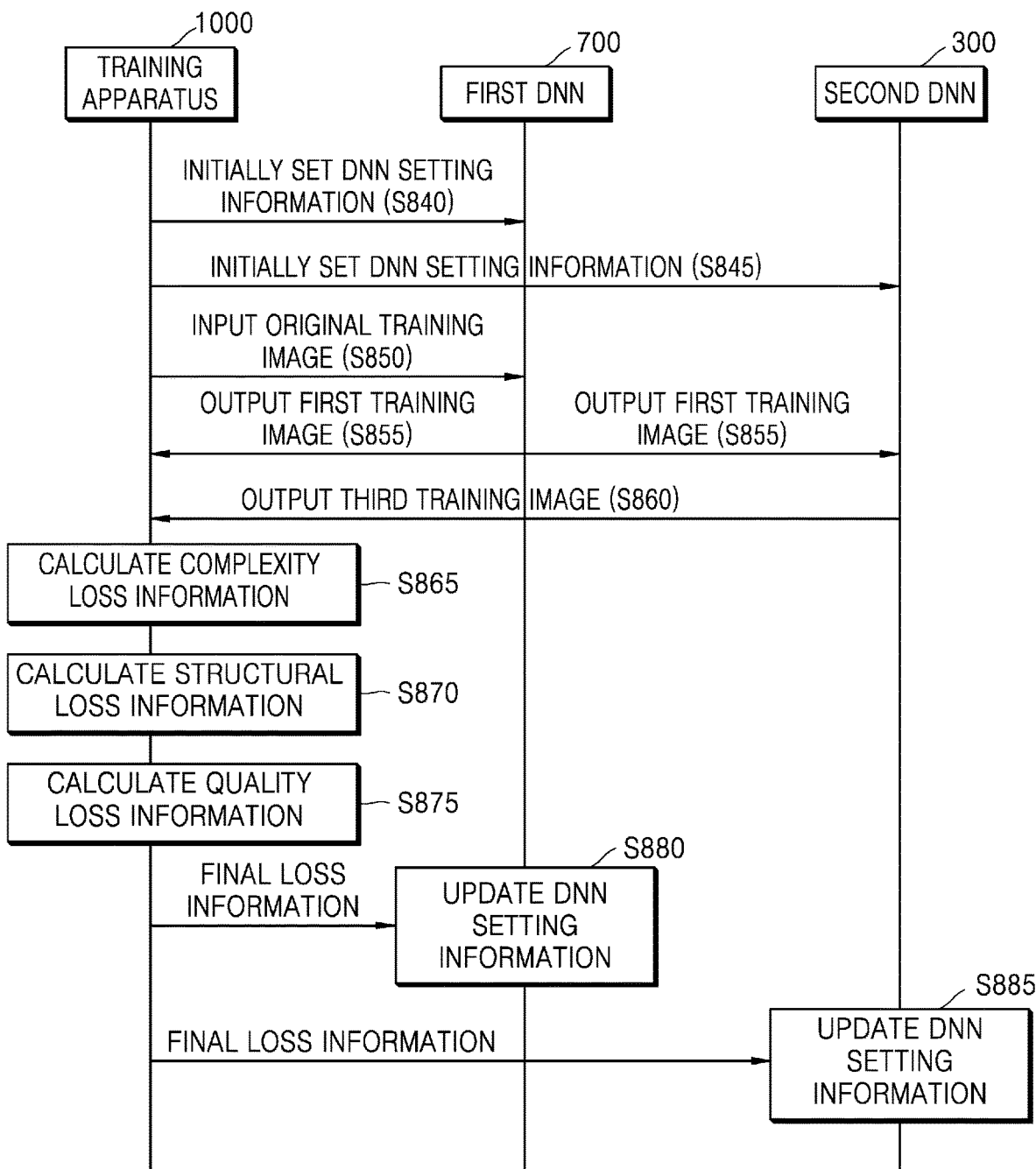
FIG. 10 is a diagram for describing a training process of a first DNN and a second DNN by a training apparatus.

FIG. 10 is a diagram for describing training processes of the first DNN 700 and the second DNN by a training apparatus 1000.

The training of the first DNN 700 and the second DNN 300 described with reference FIG. 9 may be performed by the training apparatus 1000. The training apparatus 1000 includes the first DNN 700 and the second DNN 300. The training apparatus 1000 may be, for example, the AI encoding apparatus 600 or a separate server. The DNN setting information of the second DNN 300 obtained as the training result is stored in the AI decoding apparatus 200.

Referring to FIG. 10, the training apparatus 1000 initially sets the DNN setting information of the first DNN 700 and the second DNN 300, in operations S840 and S845. Accordingly, the first DNN 700 and the second DNN 300 may operate according to pre-determined DNN setting information. The DNN setting information may include information about at least one of the number of convolution layers included in the first DNN 700 and the second DNN 300, the number of filter kernels for each convolution layer, the size of a filter kernel for each convolution layer, or a parameter of each filter kernel.

The training apparatus 1000 inputs the original training image 801 into the first DNN 700, in operation S850. The original training image 801 may include a still image or at least one frame included in a moving image.

The first DNN 700 processes the original training image 801 according to the initially set DNN setting information and outputs the first training image 802 obtained by performing AI down-scaling on the original training image 801, in operation S855. In FIG. 10, the first training image 802 output from the first DNN 700 is directly input to the second DNN 300, but the first training image 802 output from the first DNN 700 may be input to the second DNN 300 by the training apparatus 1000. Also, the training apparatus 1000 may perform first encoding and first decoding on the first training image 802 via a certain codec, and then input the second training image to the second DNN 300.

The second DNN 300 processes the first training image 802 or the second training image according to the initially set DNN setting information and outputs the third training image 804 obtained by performing AI up-scaling on the first training image 802 or the second training image, in operation S860.

The training apparatus 1000 calculates the complexity loss information 820, based on the first training image 802, in operation S865.

The training apparatus 1000 calculates the structural loss information 810 by comparing the reduced training image 803 and the first training image 802, in operation S870.

The training apparatus 1000 calculates the quality loss information 830 by comparing the original training image 801 and the third training image 804, in operation S875.

The initially set DNN setting information is updated in operation S880 via a back propagation process based on the final loss information. The training apparatus 1000 may calculate the final loss information for training the first DNN 700, based on the complexity loss information 820, the structural loss information 810, and the quality loss information 830.

The second DNN 300 updates the initially set DNN setting information in operation S885 via a back propagation process based on the quality loss information 830 or the final loss information. The training apparatus 1000 may calculate the final loss information for training the second DNN 300, based on the quality loss information 830.

Then, the training apparatus 1000, the first DNN 700, and the second DNN 300 may repeat operations S850 through S885 until the final loss information is minimized to update the DNN setting information. At this time, during each repetition, the first DNN 700 and the second DNN 300 operate according to the DNN setting information updated in the previous operation.

Table 1 below shows effects when AI encoding and AI decoding are performed on the original image 105 according to an embodiment of the disclosure and when encoding and decoding are performed on the original image 105 via HEVC.

As shown in Table 1, despite subjective image quality when AI encoding and AI decoding are performed on content including 300 frames of 8 K resolution, according to an embodiment of the disclosure, is higher than subjective image quality when encoding and decoding are performed via HEVC, a bitrate is reduced by at least 50%.

Figure 11:
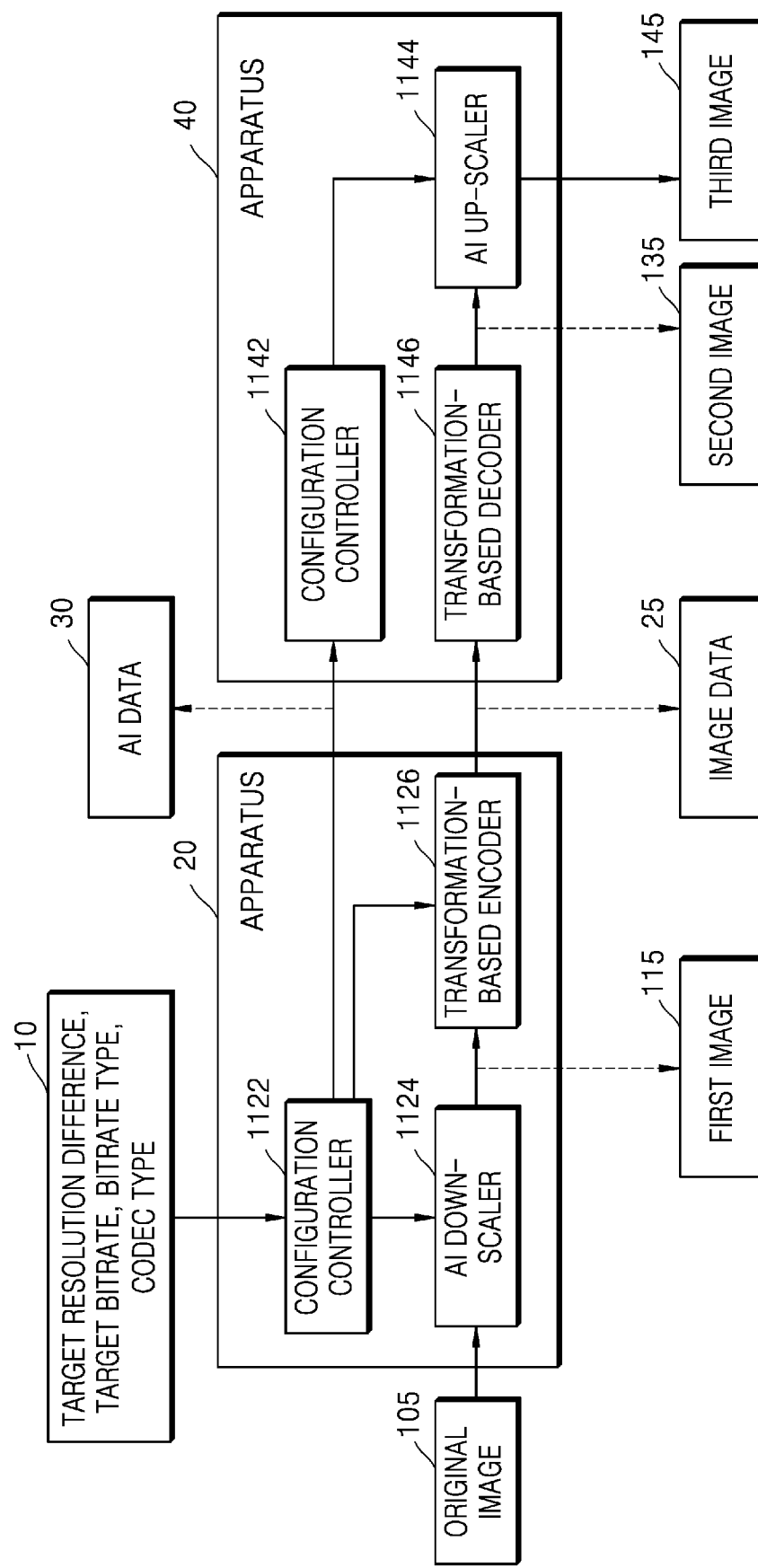
FIG. 11 is a diagram of an apparatus for performing AI down-scaling on an original image and an apparatus for performing AI up-scaling on a second image.

FIG. 11 is a diagram of an apparatus 20 for performing AI down-scaling on the original image 105 and an apparatus 40 for performing AI up-scaling on the second image 135.

The apparatus 20 receives the original image 105 and provides image data 25 and AI data 30 to the apparatus 40 by using an AI down-scaler 1124 and a transformation-based encoder 1126. According to an embodiment, the image data 25 corresponds to the image data of FIG. 1 and the AI data 30 corresponds to the AI data of FIG. 1. Also, according to an embodiment, the transformation-based encoder 1126 corresponds to the first encoder 614 of FIG. 7 and the AI down-scaler 1124 corresponds to the AI down-scaler 612 of FIG. 7.

The apparatus 40 receives the AI data 30 and the image data 25 and obtains the third image 145 by using a transformation-based decoder 1146 and an AI up-scaler 1144. According to an embodiment, the transformation-based decoder 1146 corresponds to the first decoder 232 of FIG. 2 and the AI up-scaler 1144 corresponds to the AI up-scaler 234 of FIG. 2.

According to an embodiment, the apparatus 20 includes a CPU, a memory, and a computer program including instructions. The computer program is stored in the memory. According to an embodiment, the apparatus 20 performs functions to be described with reference to FIG. 11 according to execution of the computer program by the CPU. According to an embodiment, the functions to be described with reference to FIG. 11 are performed by a dedicated hardware chip and/or the CPU.

According to an embodiment, the apparatus 40 includes a CPU, a memory, and a computer program including instructions. The computer program is stored in the memory. According to an embodiment, the apparatus 40 performs functions to be described with reference to FIG. 11 according to execution of the computer program by the CPU. According to an embodiment, the functions to be described with reference to FIG. 11 are performed by a dedicated hardware chip and/or the CPU.

In FIG. 11, a configuration controller 1122 receives at least one input value 10. According to an embodiment, the at least one input value 10 may include at least one of a target resolution difference for the AI down-scaler 1124 and the AI up-scaler 1144, a bitrate of the image data 25, a bitrate type of the image data 25 (for example, a variable bitrate

TABLE 1

| Content | Resolution | Frame Number | Information Amount (Bitrate) (Mbps) | | Subjective Image Quality Score (VMAF) | |
| --- | --- | --- | --- | --- | --- | --- |
| | | | HEVC | AI Encoding/ AI Decoding | HEVC | AI Encoding/ AI Decoding |
| Content_01 | 8K | 300 frames | 46.3 | 21.4 | 94.80 | 93.54 |
| Content_02 | (7680 × 4320) | | 46.3 | 21.6 | 98.05 | 98.98 |
| Content_03 | | | 46.3 | 22.7 | 96.08 | 96.00 |
| Content_04 | | | 46.1 | 22.1 | 86.26 | 92.00 |
| Content_05 | | | 45.4 | 22.7 | 93.42 | 92.98 |
| Content_06 | | | 46.3 | 23.0 | 95.99 | 95.61 |
| | | Average | 46.11 | 22.25 | 94.10 | 94.85 | type, a constant bitrate type, or an average bitrate type), or a codec type for the transformation-based encoder 1126. The at least one input value 10 may include a value pre-stored in the apparatus 20 or a value input from a user.

The configuration controller 1122 controls operations of the AI down-scaler 1124 and the transformation-based encoder 1126, based on the received input value 10. According to an embodiment, the configuration controller 1122 obtains DNN setting information for the AI down-scaler 1124 according to the received input value 10, and sets the AI down-scaler 1124 with the obtained DNN setting information. According to an embodiment, the configuration controller 1122 may transmit the received input value 10 to the AI down-scaler 1124 and the AI down-scaler 1124 may obtain the DNN setting information for performing AI down-scaling on the original image 105, based on the received input value 10. According to an embodiment, the configuration controller 1122 may provide, to the AI down-scaler 1124, additional information, for example, color format (luminance component, chrominance component, red component, green component, or blue component) information to which AI down-scaling is applied and tone mapping information of a high dynamic range (HDR), together with the input value 10, and the AI down-scaler 1124 may obtain the DNN setting information considering the input value 10 and the additional information. According to an embodiment, the configuration controller 1122 transmits at least a part of the received input value 10 to the transformation-based encoder 1126 and the transformation-based encoder 1126 performs first encoding on the first image 115 via a bitrate of a certain value, a bitrate of a certain type, and a certain codec.

The AI down-scaler 1124 receives the original image 105 and performs an operation described with reference to at least one of FIG. 1, 7, 8, 9, or 10 to obtain the first image 115.

According to an embodiment, the AI data 30 is provided to the apparatus 40. The AI data 30 may include at least one of resolution difference information between the original image 105 and the first image 115, or information related to the first image 115. The resolution difference information may be determined based on the target resolution difference of the input value 10, and the information related to the first image 115 may be determined based on at least one of a target bitrate, the bitrate type, or the codec type. According to an embodiment, the AI data 30 may include parameters used during the AI up-scaling. The AI data 30 may be provided from the AI down-scaler 1124 to the apparatus 40.

The image data 25 is obtained as the original image 105 is processed by the transformation-based encoder 1126, and is transmitted to the apparatus 40. The transformation-based encoder 1126 may process the first image 115 according to MPEG-2, H.264 AVC, MPEG-4, HEVC, VC-1, VP8, VP9, or VA1.

A configuration controller 1142 controls an operation of the AI up-scaler 1144, based on the AI data 30. According to an embodiment, the configuration controller 1142 obtains the DNN setting information for the AI up-scaler 1144 according to the received AI data 30, and sets the AI up-scaler 1144 with the obtained DNN setting information. According to an embodiment, the configuration controller 1142 may transmit the received AI data 30 to the AI up-scaler 1144 and the AI up-scaler 1144 may obtain the DNN setting information for performing AI up-scaling on the second image 135, based on the AI data 30. According to an embodiment, the configuration controller 1142 may provide, to the AI up-scaler 1144, additional information, for example, the color format (luminance component, chrominance component, red component, green component, or blue component) information to which AI up-scaling is applied, and the tone mapping information of HDR, together with the AI data 30, and the AI up-scaler 1144 may obtain the DNN setting information considering the AI data 30 and the additional information. According to an embodiment, the AI up-scaler 1144 may receive the AI data 30 from the configuration controller 1142, receive at least one of prediction mode information, motion information, or quantization parameter information from the transformation-based decoder 1146, and obtain the DNN setting information based on the AI data 30 and at least one of the prediction mode information, the motion information, and the quantization parameter information.

The transformation-based decoder 1146 may process the image data 25 to reconstruct the second image 135. The transformation-based decoder 1146 may process the image data 25 according to MPEG-2, H.264 AVC, MPEG-4, HEVC, VC-1, VP8, VP9, or AV1.

The AI up-scaler 1144 may obtain the third image 145 by performing AI up-scaling on the second image 135 provided from the transformation-based decoder 1146, based on the set DNN setting information.

The AI down-scaler 1124 may include a first DNN and the AI up-scaler 1144 may include a second DNN, and according to an embodiment, DNN setting information for the first DNN and second DNN are trained according to the training method described with reference to FIGS. 9 and 10.

Figure 12:
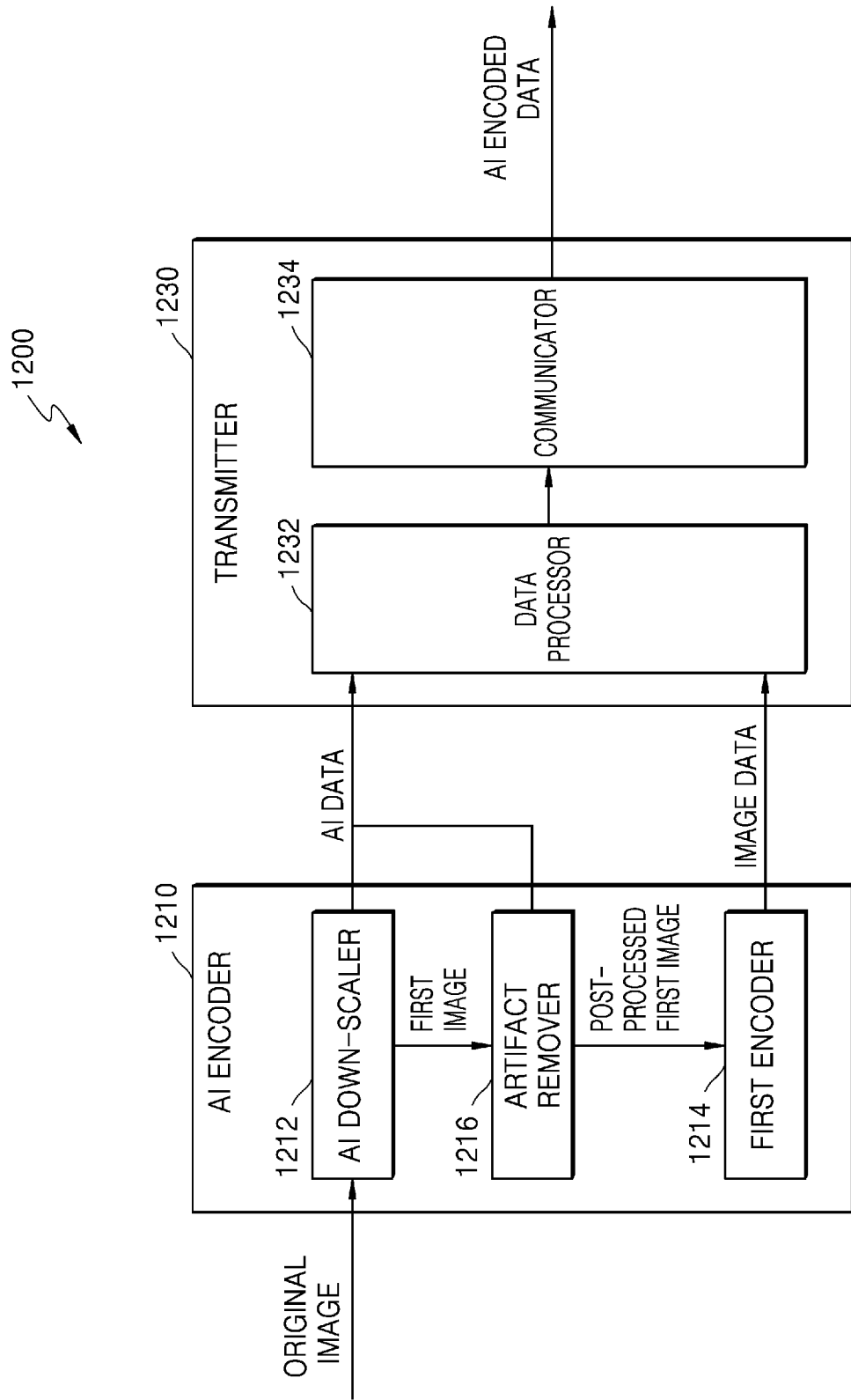
FIG. 12 is a block diagram showing a configuration of an AI encoding apparatus according to another embodiment of the disclosure.

FIG. 12 is a block diagram showing a configuration of an AI encoding apparatus 1200 according to another embodiment of the disclosure. Referring to FIG. 12, the AI encoding apparatus 1200 according to another embodiment of the disclosure may include an AI encoder 1210 and a transmitter 1230. The AI encoder 1210 may include an AI down-scaler 1212, an artifact remover 1216, and a first encoder 1214.

As described above, the AI down-scaler 1212 may obtain a first image 115 AI down-scaled from an original image 105 through a first DNN. The first image 115 may have a resolution that is lower than that of the original image 105. AI down-scaling by the AI down-scaler 1212 has been described above, and therefore, a detailed description thereof will be omitted.

Figure 13:
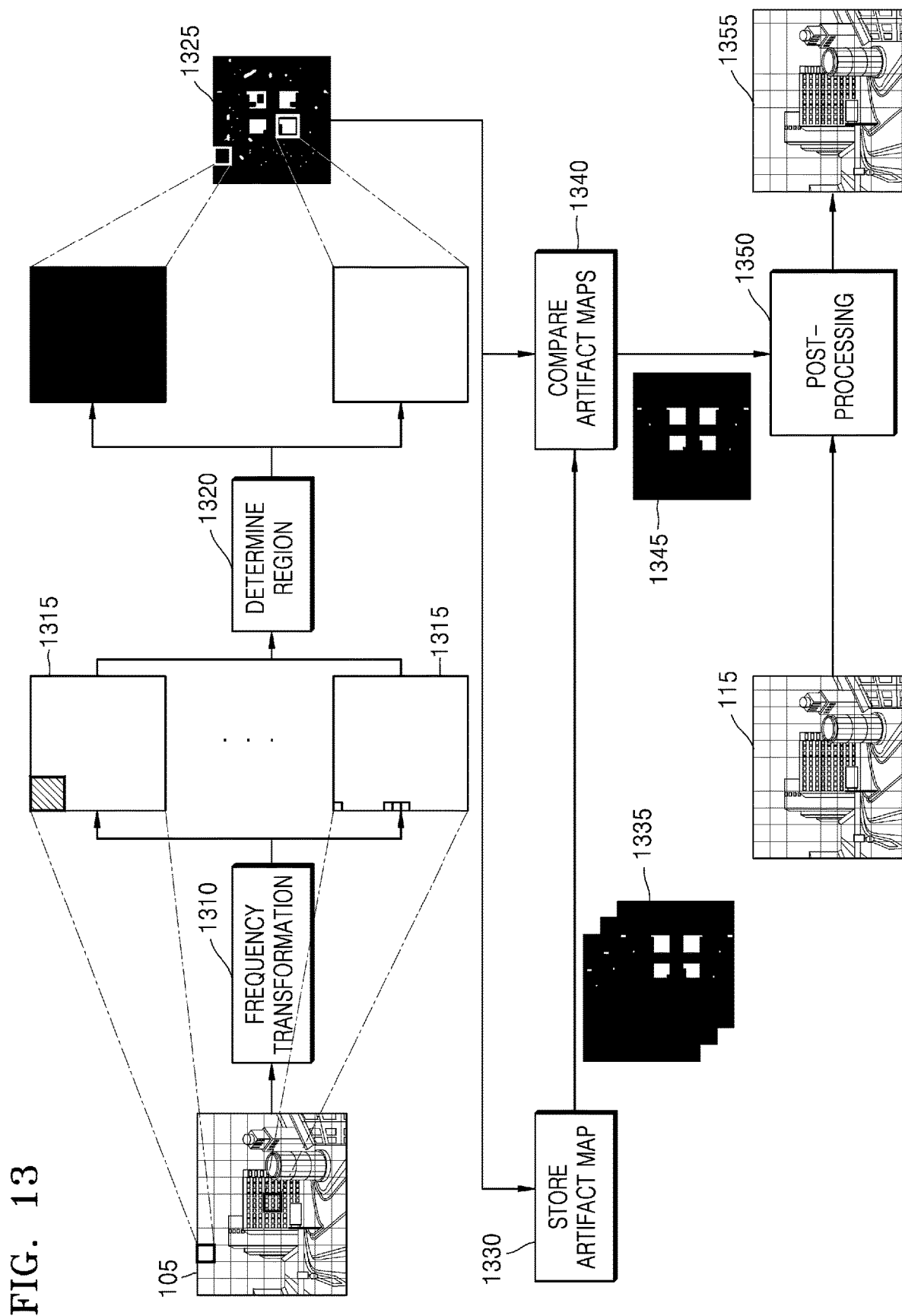
FIG. 13 is a diagram for describing a method performed by an AI encoding apparatus to determine an artifact map based on values of frequency transform coefficients of an original image and post-process a first image based on the artifact map.

FIG. 13 is a diagram for describing a method performed by the AI encoding apparatus 1200 to determine an artifact map based on values of frequency transform coefficients of an original image and post-process the first image 115 based on the artifact map.

The AI encoding apparatus 1200 may perform frequency transformation on each block of the original image 105 in operation 1310 to generate a frequency-transformed image 1315, and determine an artifact region of each block of the frequency-transformed image 1315 based on a distribution of frequency transform coefficients of the block in operation 1320. The AI encoding apparatus 1200 may generate an artifact map 1325 based on the artifact region. At this time, outliers included in the artifact map 1325 may be removed. A method of removing the outliers included in the artifact map 1325 will be described at a later time with reference to FIGS. 17A to 19B.

In operation 1310, the frequency transformation may be one of Fast Fourier Transform (FFT), Discrete Cosine Transform (DCT), and Wavelet Transform, although not limited thereto.

The AI encoding apparatus 1200 may store the artifact map 1325 in a buffer, in operation 1330. The AI encoding apparatus 1200 may compare the artifact map 1325 of a current frame to artifact maps 1335 of previous frames to obtain an artifact map 1345 for post-processing, in operation 1340. However, the AI encoding apparatus 1200 may determine the artifact map 1325 of the current frame as an artifact map for post-processing without comparing the artifact map 1325 to the artifact maps 1335.

Herein, an artifact map may be a map representing an artifact region including an aliasing artifact in unit of a block. The aliasing artifact is noise that is generated when a sampling frequency of an image is not sufficiently greater than twice a maximum frequency of signals in the image or when neighboring signal spectrums overlap each other due to improper filtering of an image.

When the AI down-scaler 1212 performs AI down-scaling on the original image 105 by using the first DNN, a sampling frequency may be reduced compared to that of the original image 105, and when the sampling frequency becomes not sufficiently greater than a maximum frequency of signals in the original image 105, an aliasing artifact may be generated.

The AI encoding apparatus 1200 may perform post-processing on the first image 115 based on the artifact map 1345 to generate a post-processed first image 1355, in operation 1350. Herein, post-processing is processing of changing pixel values in an image, and may be processing using various filters.

For example, the AI encoding apparatus 1200 may filter a region of the first image 115 corresponding to the artifact region. At this time, one of a low-pass filter or a Gaussian filter may be used. The post-processed first image 1355 may be input to the first encoder 1214.

Alternatively, the AI encoding apparatus 1200 may filter a region of the original image 105 corresponding to the artifact region of the artifact map 1345 by performing low-pass filtering and using a typical filter, such as a Bi-cubic filter and a Bi-linear filter, including a down-scale function, or by using a typical filter such as a Lanczos filter including both a low-pass filtering function and a down-scale function, thus generating a down-scaled region from which high-frequency components are removed. The down-scaled region may be down-scaled by the same degree of scale as the first image 115 AI down-scaled through the first DNN.

The AI encoding apparatus 1200 may replace pixel values of the first image 115 corresponding to the artifact region with pixel values of the down-scaled region, although not limited thereto.

However, the AI encoding apparatus 1200 may filter the region of the original image 105 corresponding to the artifact region of the artifact map 1345 by using a typical low-pass filter, and down-scale the filtered region by using a typical down-scale method, thereby generating a down-scaled image. The AI encoding apparatus 1200 may replace the pixel values of the first image 115 corresponding to the artifact region with the pixel values of the down-scaled region.

The AI encoding apparatus 1200 may perform first encoding by using the post-processed first image which is post-processed for the first image 115 to reduce aliasing artifacts that may be recognized by a human's eyes and thereby enhance quality of an encoded image.

Referring again to FIG. 12, the AI encoding apparatus 1200 according to another embodiment of the disclosure may include a central processor (not shown) for controlling the AI encoder 1210 and the transmitter 1230. Or, the AI encoder 1210 and the transmitter 1230 may operate by their own processors (not shown), and the processors (not shown) may operate mutually organically so as to operate the AI encoding apparatus 1200. Or, the AI encoder 1210 and the transmitter 1230 may be controlled by a control of an external processor (not shown).

The AI encoding apparatus 1200 may include one or more data storage devices (not shown) for storing input/output data of the down-scaler 1212, the artifact remover 1216, the first encoder 1214, and the transmitter 1230. The AI encoding apparatus 1200 may include a memory controller (not shown) for controlling data inputs/outputs to/from the data storage devices (not shown).

The AI encoding apparatus 1200 may perform image encoding including prediction by interworking with an internal video encoding processor or an external video encoding processor, to encode images. The internal video encoding processor of the AI encoding apparatus 1200 according to an embodiment of the disclosure may be provided as a separate processor, or a central processing unit or a graphics processing unit may include an image encoding processing module to embody basic image encoding operations.

Operations of the AI down-scaler 1212, the first encoder 1214, the transmitter 1230 of the AI encoding apparatus 1200 shown in FIG. 120 may be the same as those of the AI down-scaler 612, the first encoder 614, and the transmitter 630 described above with reference to FIG. 7.

The first image 115 may be provided to the artifact remover 1216. The artifact remover 1216 may detect an artifact in the first image 115, and remove the detected artifact.

The artifact remover 1216 may perform post-processing for removing the artifact in the first image 115. The first image 115 AI down-scaled through the first DNN may include an artifact, for example, an aliasing artifact. That is, because AI down-scaling reduces a resolution of the original image 105, the first image 115 may include a shape that does not exist in the original image 105 due to a change of resolution.

When encoding and decoding are performed based on the first image 115 including the aliasing artifact not existing in the original image 105, image quality may be reduced. Therefore, the artifact remover 1216 may perform post-processing for removing or reducing the artifact of the first image 115. More specifically, the artifact remover 1216 may perform post-processing for removing or reducing an aliasing artifact that may be detected by a human's eyes from the first image 115, thereby minimizing the aliasing artifact that may be detected by the human's eyes. Accordingly, quality of an encoded image may be enhanced.

An image in which an aliasing artifact that may be detected by a human's eyes is generated may be an image in which patterns appear successively, and when an aliasing artifact is generated in such an image, an image of a pattern that is similar to a moire pattern may be generated.

That is, when an aliasing artifact is generated in successive patterns having small sizes, neighboring patterns overlap so that sample values of a specific region of the corresponding image fail to be arranged smoothly, resulting in twisted pattern directions or irregular patterns.

Hereinafter, various examples in which sample values fail to be arranged smoothly due to an aliasing artifact generated in an image, resulting in twisted pattern directions or irregular patterns, will be described.

Figure 15A:
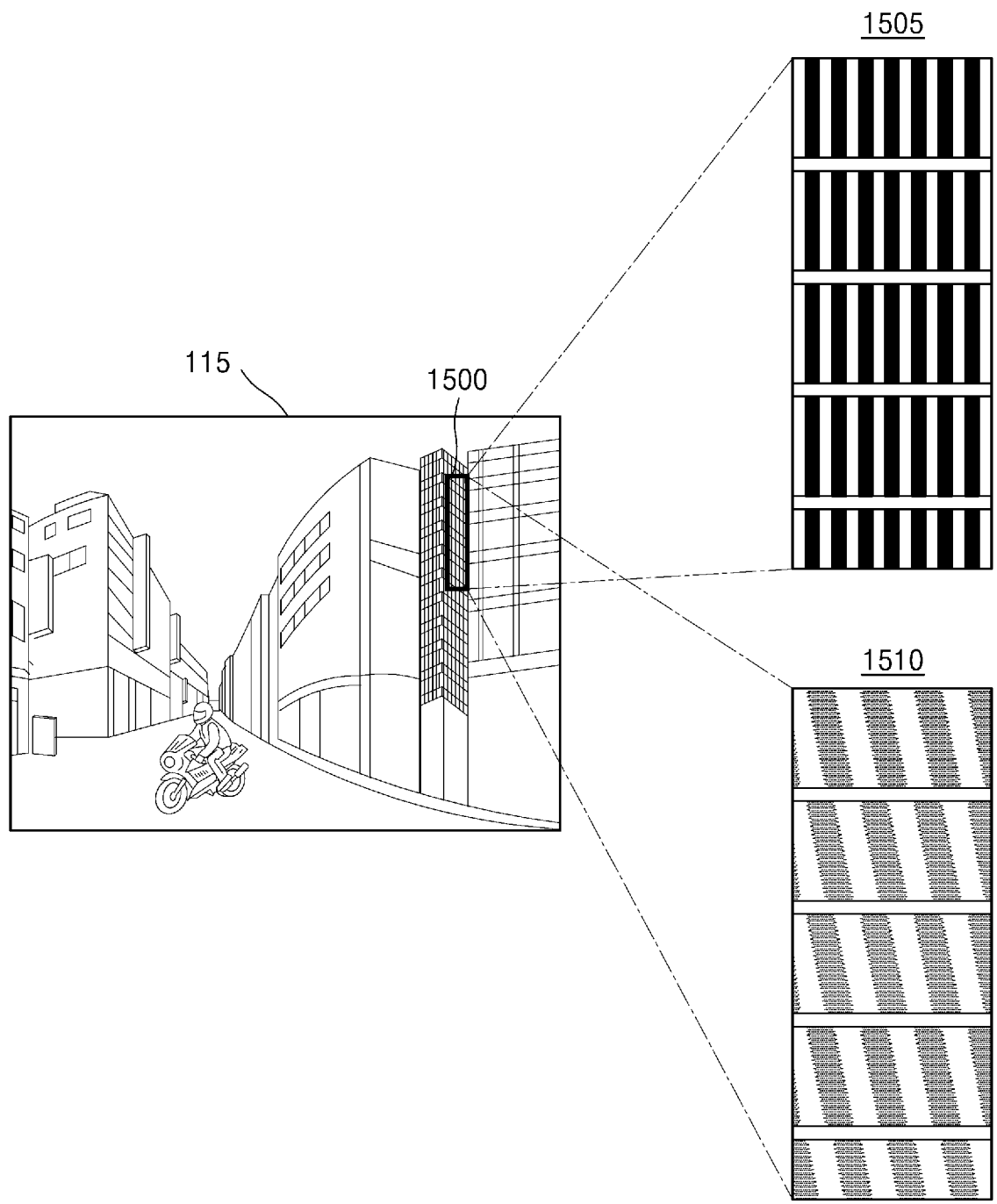
FIG. 15A is an exemplary diagram showing spatial aliasing artifacts appearing in a first image down-scaled from an original image.

FIG. 15A is an exemplary diagram showing spatial aliasing artifacts appearing in a first image down-scaled from an original image.

For example, as shown in FIG. 15A, a region 1500 of a first image 115 output from a first DNN may include an aliasing artifact region 1510 having a characteristic that patterns are twisted in a different direction, unlike smoothly arranged patterns of another region 1505 of an original image 105. That is, a high-frequency component included in the original image 105 may be distorted during down-scaling and expressed as a different frequency component. For this reason, a spatial aliasing artifact may be generated. The artifact remover 1216 may determine a region in which a spatial aliasing artifact is generated, based on values of frequency transform coefficients of the original image 105, and perform post-processing for removing or reducing the spatial aliasing artifact from the region in the first image 110, thereby removing or reducing the spatial aliasing artifact.

Figure 15B:
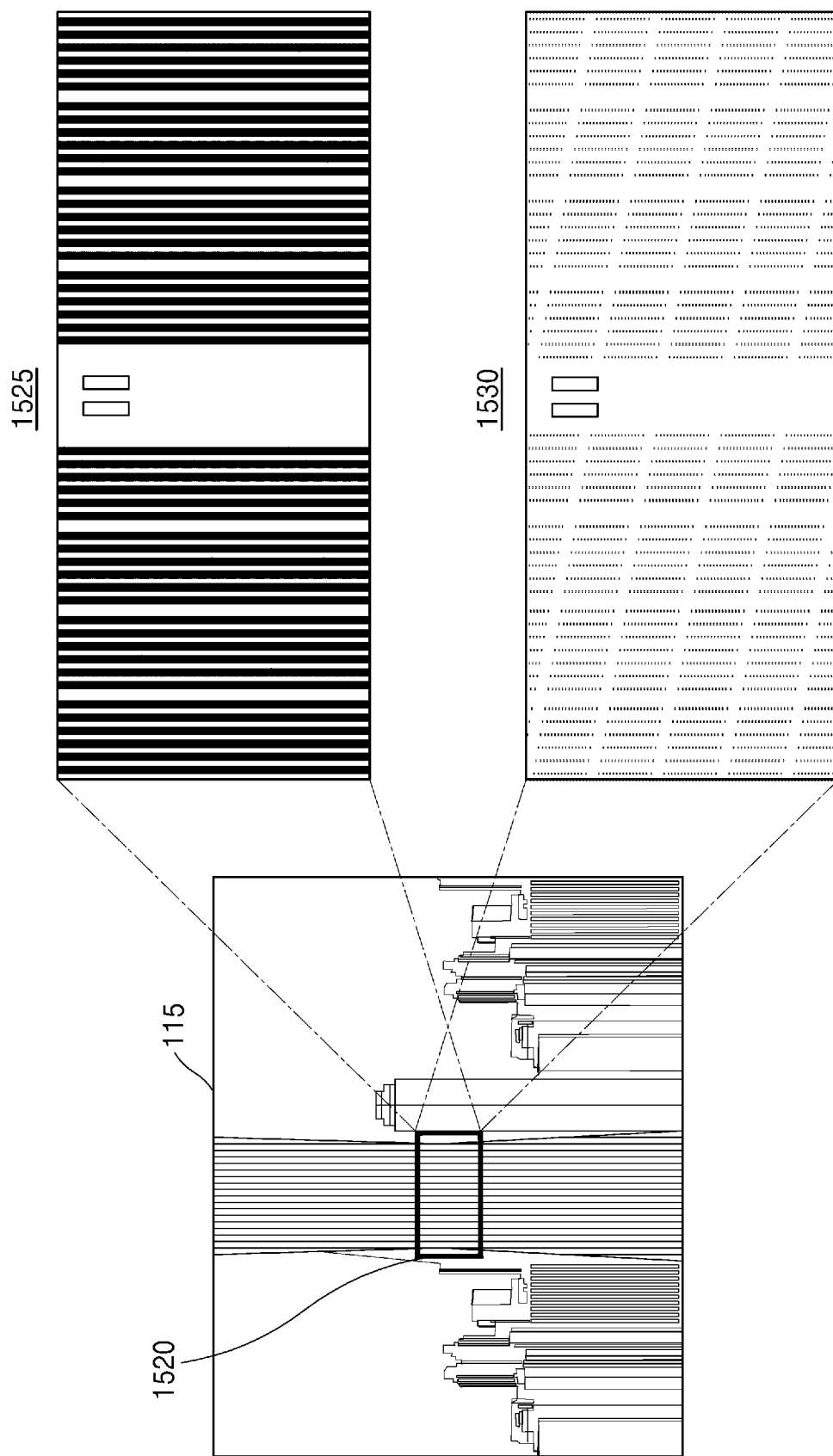
FIG. 15B is an exemplary diagram showing spatio-temporal aliasing artifacts appearing in a first image down-scaled from an original image.

FIG. 15B is an exemplary diagram showing spatio-temporal aliasing artifacts appearing in a first image down-scaled from an original image.

As shown in FIG. 15B, some patterns fail to be arranged smoothly and directions are twisted by distortion, unlike another region 1525 of an original image 105, and as a result, successive images have temporally different pixel values from those of the previous images even at a region where there is little motion so that distortion occurs. Thereby, an aliasing artifact region 1530 may exist in a region 1520 of a first image 115 output from a first DNN.

In this case, an aliasing artifact included in the aliasing artifact region 1530 may be a spatio-temporal aliasing artifact. A reason for which a spatio-temporal aliasing artifact is generated will be briefly described with reference to FIG. 15C.

Figure 15C:
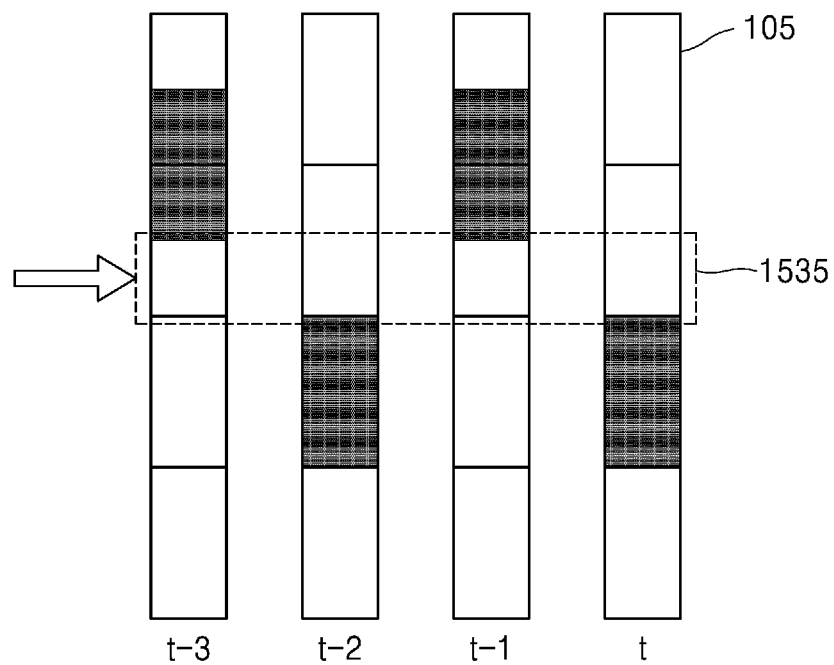
FIG. 15C is a diagram for describing a spatio-temporal aliasing artifact that is recognized by a human's eyes among spatio-temporal aliasing artifacts appearing in a first image down-scaled from an original image.
Figure 15C:
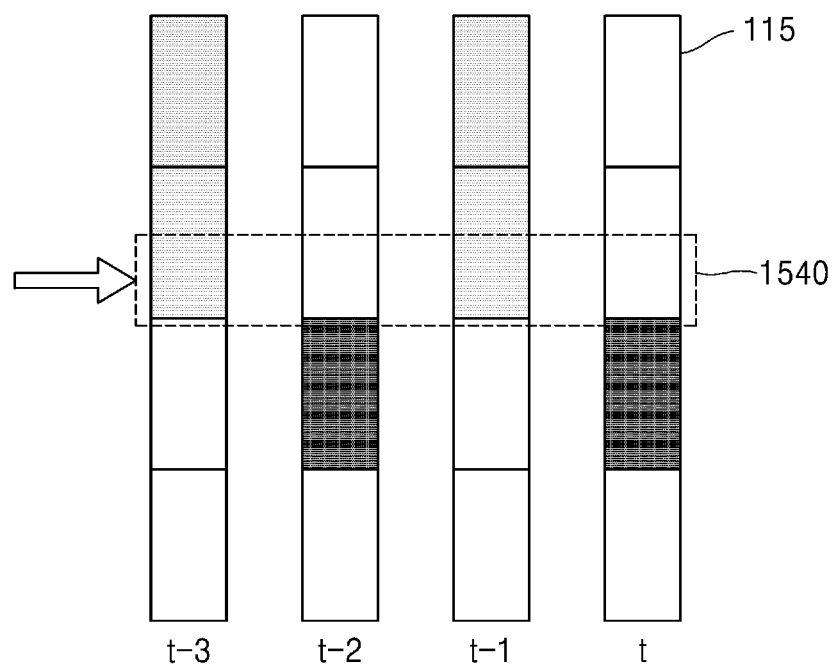

FIG. 15C is a diagram for describing a spatio-temporal aliasing artifact that is recognized by a human's eyes among spatio-temporal aliasing artifacts appearing in a first image down-scaled from an original image.

Referring to FIG. 15C, when an original image 105 is down-scaled, a resolution of the original image 105 may be reduced and the original image 105 may have spatially different pixel values (a spatial aliasing artifact is generated). Because the same values exist successively in spatial regions 1535 of original images 105 that are temporally successive, no flickering occurs in the original images 105. However, in spatial regions 1540 of first images 115 that are temporally successive, a spatial aliasing artifact may be generated due to down-scaling to change pixel values, so that different values are temporally successive. As a result, a region that has not flickered may flicker so that a human's eyes may recognize such a flickering.

The spatio-temporal aliasing artifact may be an aliasing artifact that is generated when a little motion is generated in the original images 105 being temporally successive. Accordingly, by detecting regions that are approximately stationary for a long time without any great motion in the original images 105, a spatio-temporal aliasing artifact may be removed or reduced by performing post-processing for removing or reducing a spatial aliasing artifact from regions of the first images 115 corresponding to the detected regions of the original images 105.

Figure 15D:
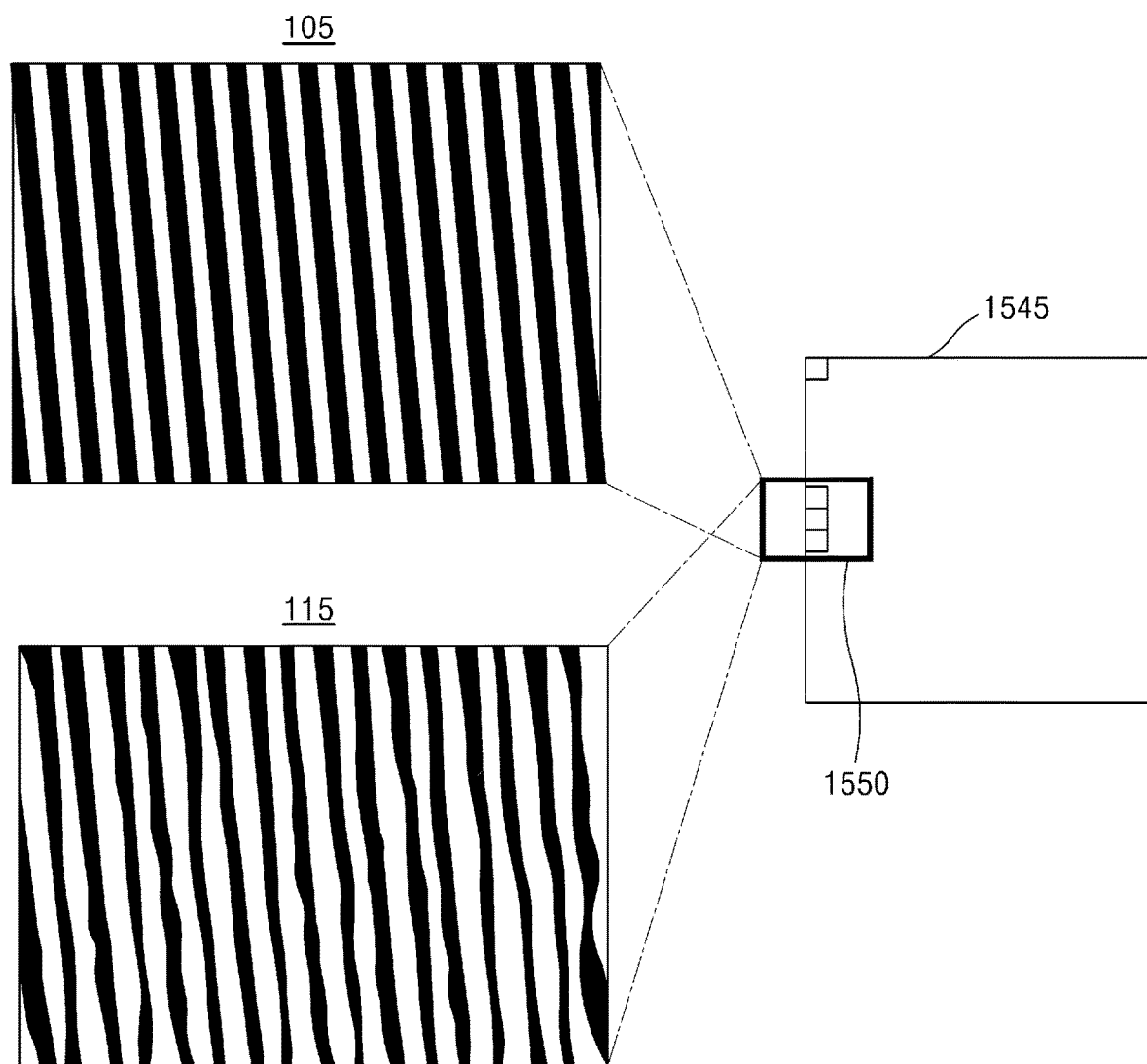
FIG. 15D is a diagram for describing a spatial aliasing artifact that is recognized by a human's eyes among spatial aliasing artifacts appearing in a first image down-scaled from an original image.

FIG. 15D is a diagram for describing a spatial aliasing artifact that is recognized by human's eyes among spatial aliasing artifacts appearing in a first image down-scaled from an original image.

Referring to FIG. 15D, a first image 115 output from the first DNN may include a spatial aliasing artifact region in which directions of patterns included in an original image 105 are twisted to different pattern directions or irregular patterns appear, and the spatial aliasing artifact may be easily detected by a human's eyes. When the first image 115 includes an artifact that may be easily detected by a human's eyes, high-frequency transform coefficient components in a frequency domain block 1545 are collected at transform coefficient components 1550 of a few high-frequency components without being scattered in a high-frequency region, when the original image 105 is transformed to a frequency domain. There may be little frequency transform coefficient components in the frequency domain block 1545, except for DC components. Accordingly, a region including an aliasing artifact that may be easily recognized by a human's eyes may be determined on the basis of a distribution of frequency transform coefficients. In general, the frequency transform coefficients of 1545 may be represented algebraically with a variable label such as Xvr. The dummy variable "v" may index in a horizontal direction in frequency and the dummy variable "r" may index in a vertical direction in frequency. In general, a pair (v,r) may be referred to herein as a position, a location, an index pair, or a position index. For example, in FIG. 15D, the frequency transform coefficients inside the box labelled 1550 may be at locations (v=0, r=30), (v=0, r=31), (v=0, r=32) for an N×N transform block size of 64×64, as a non-limiting example. The corresponding frequency transform coefficients, in this non-limiting example of FIG. 15D item 1550, are X(0,30), X(0,31), and X(0,32). The energy of each coefficient may be written as a magnitude square such as $|X(0,30)|^2$, $|X(0,31)|^2$, and $|X(0,32)|^2$. That is, by determining whether most of energy is collected at a few frequency components of a high-frequency region, a region including an artifact may be determined.

According to an embodiment of the disclosure, the artifact remover 1216 may generate artifact information representing a region including an artifact in the first image 115. The artifact information may represent a location of the region including the artifact in the first image 115. The artifact information may include a Two Dimensional (2D) artifact map having a horizontal size and a vertical size. A resolution of the artifact map may be the same as that of the first image 115. Alternatively, the resolution of the artifact map may be the same as that of the original image 105. The artifact information may be One Dimensional (1D) data representing a location of the region including the artifact in the first image 115.

The artifact remover 1216 may generate artifact information representing the region including the artifact in the first image 115 based on values of frequency transform coefficients of the original image 105.

Pixels in the artifact map may have a first pixel value or a second pixel value. Pixels or a block in the first image 115 corresponding to pixels or a block having the first pixel value may be determined to include an artifact.

Also, pixels or a block in the first image 115 corresponding to pixels or a block having the second pixel value may be determined to include no artifact. For example, the first pixel value may be an integer value of 1 or more, and the second pixel value may be 0. Thus, the first pixel value is an indicator in some embodiments. A value of 0 indicates no artifact. A value greater than 0 indicates an artifact. The magnitude of the first pixel value greater than 0 indicates a degree of the artifact. However, the first and second pixel values are not limited to the above-mentioned values, and may be set to various other specific values.

More specifically, the first pixel value or the second pixel value may have different values depending on degrees of aliasing artifacts. When degrees of aliasing artifacts are 0 to 100, the first pixel value may be an integer value between 1 and 100, and the second pixel value may be 0. A degree of an aliasing artifact may be determined based on a MHN/HF ratio or a location of a maximum frequency.

According to an embodiment of the disclosure, the artifact remover 1216 may perform frequency transformation on each block of the original image 105 to generate frequency transform coefficients for each block, to generate an artifact map. The artifact remover 1216 may determine whether a preset criterion is satisfied based on a distribution of frequency transform coefficients for each block of the original image 105, and generate an artifact map having a preset value for each block according to the determined result.

Herein, the preset criterion may be based on a first comparison result obtained by comparing a sum of transform coefficients of a low-frequency region for each block of the original image 105 to a sum of transform coefficients of a high-frequency region of the original image 105. Also, the preset criterion may be based on a second comparison result obtained by comparing a first sum of a maximum value of transform coefficients of a high-frequency region for each block and values of transform coefficients located around a first transform coefficient having the maximum value to a second sum of a maximum value of transform coefficients of a low-frequency region and values of transform coefficients located around a second transform coefficient having the maximum value. Also, the preset criterion may be based on a third comparison result obtained by comparing a sum of transform coefficients of a high-frequency region to a first sum for a first transform coefficient in the high-frequency region. Also, the preset criterion may be based on a fourth comparison result obtained by comparing a preset value to the number of transform coefficients having values that are greater than a preset value. The preset criterion may be based on at least one of the first comparison result, the second comparison result, the third comparison result, or the fourth comparison result.

For example, the artifact remover 1216 may generate an artifact map having a preset value for each block based on a first condition described below. Generally, conditions described below refer to summations of energies over domains. The domain is indicated in a formula with a symbol label such as HF, LF, MHN or LHN and may correspond to a range of indices (also called position index). The argument of the summation may be a signed frequency transform coefficient, an absolute value frequency transform coefficient, or an energy such as a magnitude squared of frequency transform coefficient. In some instances, the argument is not energy but simply a count of events. These situations are indicated with the notation "number" in the formula.

if($\Sigma HF > \alpha \Sigma LF$) and ($\Sigma HF > thd1$) and ($\Sigma LF > thd2$))  [First Condition]

Figure 14:
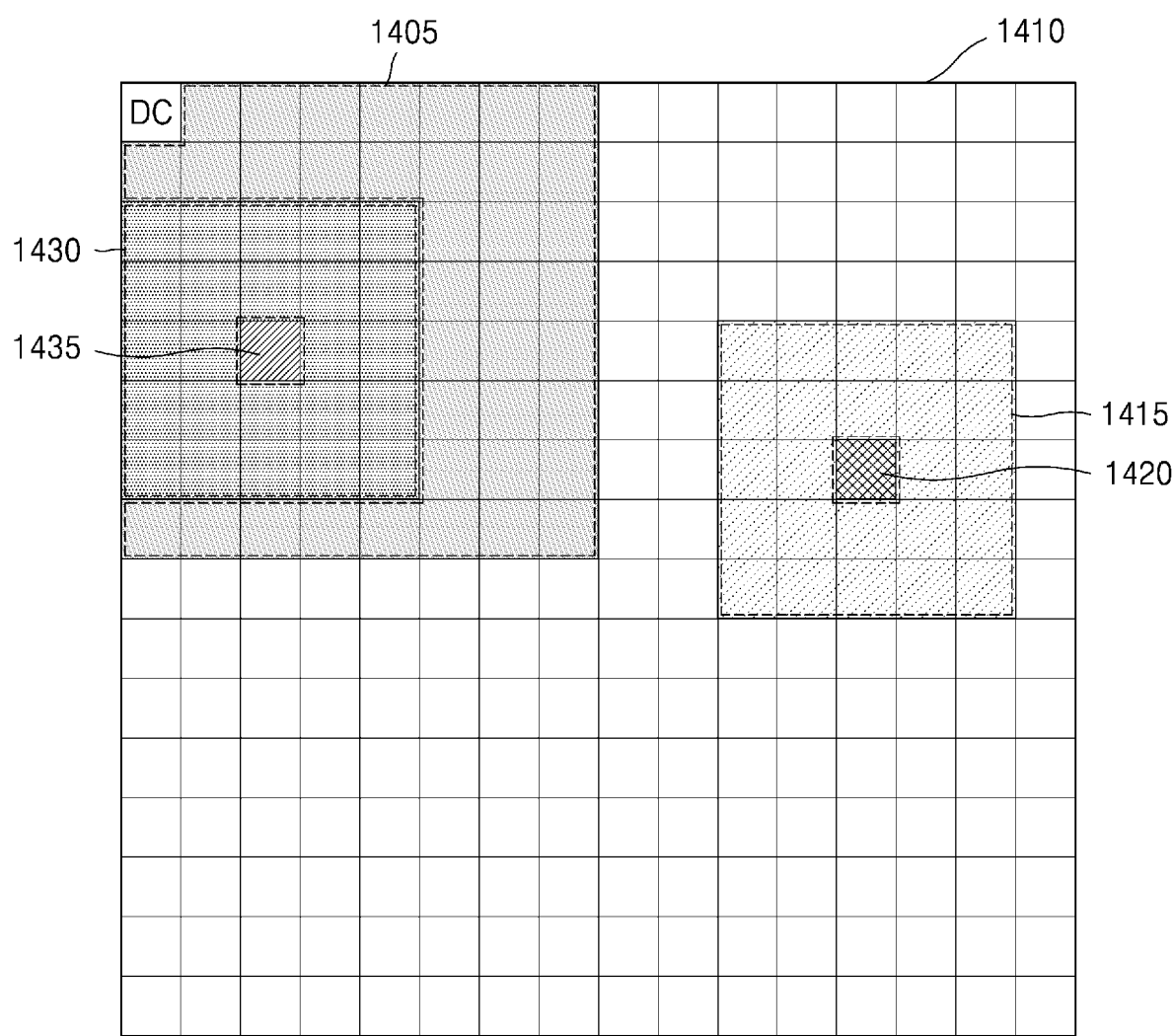
FIG. 14 is a diagram for describing a method of determining an artifact region based on a distribution of transform coefficients in a block included in an original image.

In some embodiments, the first condition uses a value of 0 for thd1 and thd2 so that the first condition only depends on the sum over the high frequency region (for example, HF 1410 of FIG. 14 which does not include "DC" and does not include the low frequency region LF 1405) compared to the scaled sum over the low frequency region (for example, 1405 of FIG. 14). In some embodiments, the argument of the sum refers to energy of the frequency transform coefficients, such as $|X(v,r)|^2$.

FIG. 14 is a diagram for describing a method of determining an artifact region based on a distribution of transform coefficients in a block included in an original image.

Referring to FIG. 14, HF represents a high-frequency region 1410, LF represents a low-frequency region 1405, thd1 and thd2 represent specific threshold values, and $\alpha$ represents a preset coefficient. For example, thd1 may be 64, thd2 may be 1024, and $\alpha$ may be 1.2, although not limited thereto. The high-frequency region 1410 may mean a region in which at least one of a horizontal frequency or a vertical frequency in a block is greater than or equal to a preset value, and the low-frequency region 1405 may mean a region in which a horizontal frequency and a vertical frequency in a block are smaller than or equal to the preset value, although not limited thereto. The low-frequency region 1405 may include no coefficient of a DC frequency.

When the first condition is satisfied, the artifact remover 1216 may determine an artifact map in which each block has the first pixel value representing that there is an artifact.

For example, the artifact remover 1216 may generate an artifact map in which each block has a preset value based on a second condition that is described below.

if(($\Sigma MHN > \beta \Sigma MLN$) and ($\Sigma MHN \geq thd3$))  [Second Condition]

Here, MHN 1415 represents a region including a frequency transform coefficient 1420 having a maximum value in the high-frequency region 1410 and transform coefficients located around the frequency transform coefficient 1420, and MLN 1430 represents a region including a frequency transform coefficient 1435 having a maximum value in the low-frequency region 1405 and transform coefficients located around the frequency transform coefficient 1435. The expression "located around" indicates identification of a cluster. There are a number of ways to identify a cluster known in the art of signal processing. For example, a cluster may be identified as being within a pre-set distance of a maximum value (magnitude or energy maximum). The preset distance may be an integer L. For example, if a maximum |X| occurs at r=R and v=V, the frequency transform coefficients around the maximum are located within a square defined by (v=V+/−L, r=R+/−L).

For example, in FIG. 14 a maximum in the LF region occurs at v=2, r=4 (see item 1435 in FIG. 14, an example of a coefficient at a position index of (2,4)). Note that the DC coefficient is at v=0, r=0 and zero-based counting occurs from top to bottom for r and left to right for v. For an example of L=2, a square is defined with size 4×4 as being around item 1435 (see the area 1430 of FIG. 14). The frequency transform coefficients around the maximum are not limited to locations within a square. The frequency transform coefficients around the maximum could be located within a rectangle or a circle or various geometric shapes etc.

Also, thd3 represents a specific threshold value, and $\beta$ represents a preset coefficient. For example, thd3 may be 1024 and $\beta$ may be 1.2, although not limited thereto. In some embodiments, thd3 is zero, and the second condition only depends for satisfaction the comparison between MHN and MLN.

When the second condition is satisfied, the artifact remover 1216 may determine an artifact map in which each block has the first pixel value representing that there is an artifact.

For example, the artifact remover 1216 may generate an artifact map in which each block has a preset value based on a third condition that is described below.

if($\Sigma MHN > \gamma \Sigma HF$)  [Third Condition]

Here, HF represents the high-frequency region 1410, and MHN 1415 represents the region including the frequency transform coefficient 1420 having the maximum value in the high-frequency region 1410 and the transform coefficients located around the frequency transform coefficient 1420. $\gamma$ may be a preset coefficient that is smaller than 1. For example, $\gamma$ may be 0.6, although not limited thereto.

When the third condition is satisfied, the artifact remover 1216 may determine an artifact map in which each block has the first pixel value representing that there is an artifact.

For example, the artifact remover 1216 may generate an artifact map in which each block has a preset value, based on a fourth condition that is described below.

$$if((number\Sigma(HF(i)>thd4)+number\Sigma(LF(i)>thd4))$$
$$<thd5) \quad \text{[Fourth Condition]}$$

Here, number represents the number of frequency components satisfying a specific condition, HF(i) represents an i-th frequency transform coefficient in the high-frequency region 1410, and LF(i) represents an i-th frequency transform coefficient in the low-frequency region 1405. thd4 and thd5 represent specific threshold values. For example, thd4 may be 10 and thd5 may be a value that is greater than or equal to 48, although not limited thereto.

In some embodiments, the fourth condition is satisfied based on only the number of those frequency transform coefficients in the high frequency region 1410 exceeding thd4; that is, in some embodiments, the fourth condition does not require that a number of frequency transform coefficients in the low frequency region be greater than thd4.

In the first, second, third, and fourth conditions above, the sums may be energy sums.

When the fourth condition is satisfied, the artifact remover 1216 may determine an artifact map in which each block has the first pixel value representing that there is an artifact.

When at least one of the first to fourth conditions is satisfied, the artifact remover 1216 may determine an artifact map in which each block has the first pixel value representing that there is an artifact. For example, when all of the first to fourth conditions are satisfied, the artifact remover 1216 may determine an artifact map in which each block has the first pixel value representing that there is an artifact.

Figure 16:
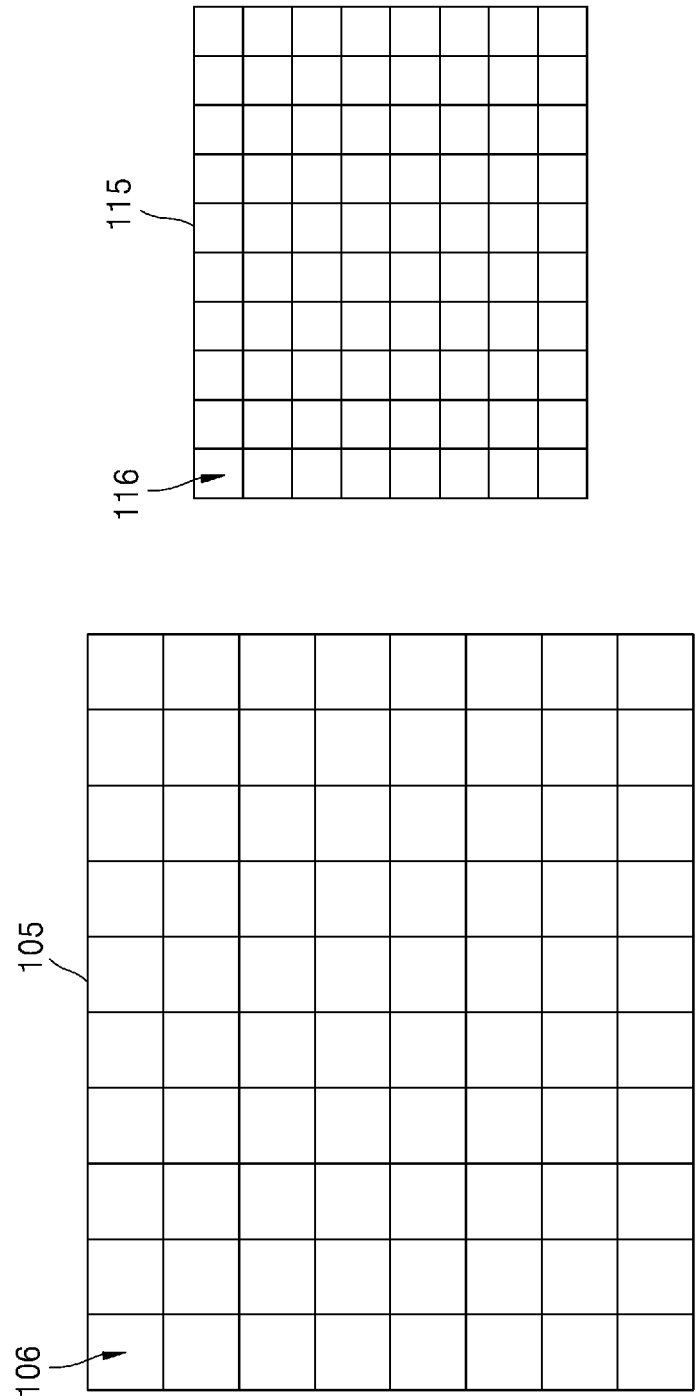
FIG. 16 shows examples of an original image and a first image partitioned in units of blocks.

FIG. 16 is a diagram for showing an original image 105 and a first image 115 partitioned in units of blocks 106 and 116.

Referring to FIG. 16, the original image 105 and the first image 115 may be partitioned into the same number of blocks 106 and 116. The blocks 106 and 116 may have preset sizes. However, because a resolution of the original image 105 is greater than that of the first image 115, sizes of the blocks 106 partitioning the original image 105 may be greater than those of the blocks 116 partitioning the first image 115.

According to an embodiment of the disclosure, the original image 105 may be partitioned in units of blocks 106 having the same size or in units of blocks 106 having different sizes. According to an embodiment of the disclosure, the first image 115 may be partitioned in units of blocks 116 having the same size or in units of blocks 116 having different sizes.

Frequency transformation may be performed on each block 106 of the original image 105, and an artifact map may be generated based on the frequency-transformed blocks 106.

Hereinafter, a process performed by the AI encoding apparatus 1200 to remove outliers of an artifact map will be described with reference to FIGS. 17A to 19B.

Figure 17A:
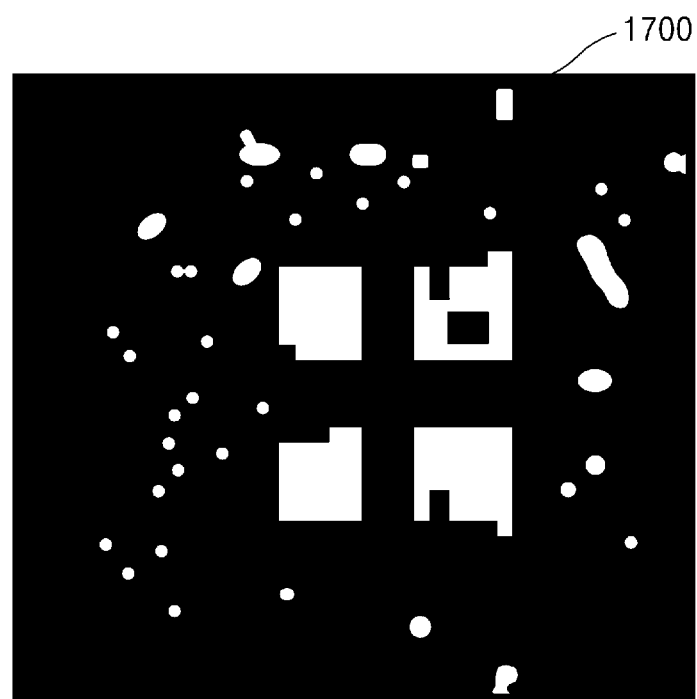
FIGS. 17A and 17B are diagrams for showing artifact maps before outliers are removed and after outliers are removed.
Figure 17B:
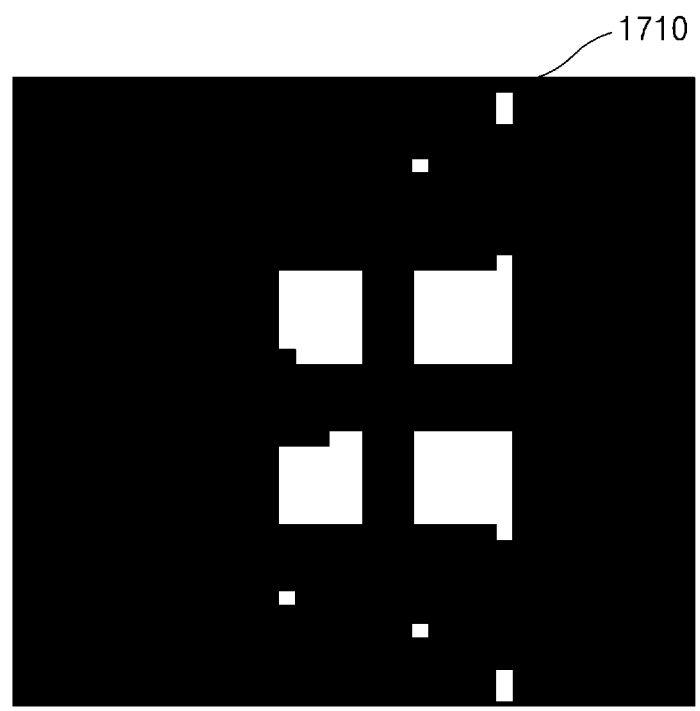

FIGS. 17A and 17B are diagrams for showing artifact maps before outliers are removed and after outliers are removed.

Referring to FIGS. 17A and 17B, the artifact remover 1216 may perform processing such as morphology processing on an artifact map 1700 generated based on a distribution of frequency transform coefficients for each block of an original image 105 to generate an artifact map 1710 from which outliers have been removed. The processing will be described at a later time in detail with reference to FIGS. 18A to 19B.

A region of interest (ROI) may be set, and in the remaining region except for the ROI, a first pixel value may change to a second pixel value. The ROI may be a region having a preset size, ranging from a center of an artifact map.

FIGS. 18A and 18B are diagrams for describing a process of removing outliers by the AI encoding apparatus 1200 according to an embodiment of the disclosure.

An artifact map 1800 generated based on a distribution of frequency transform coefficients for each block of an original image 105 is shown. In FIG. 18A, a1, b1, etc. are indices for distinguishing blocks from one another.

Referring to FIG. 18A, a block a1, a block b1, etc. may have the first pixel value, and a block c1, a block d1, etc. may have the second pixel value.

Blocks having the first pixel value may represent regions in which an artifact exists in the first image 115, and blocks having the second pixel value may represent regions in which no artifact exists in the first image 115.

According to an embodiment of the disclosure, the artifact remover 1216 may perform morphology processing on the artifact map 1800 generated based on the distribution of the frequency transform coefficients for each block of the original image 105.

Morphology processing may be processing of changing pixel values of holes in an image based on pixel values of adjacent pixels or changing pixel values of islands in an image based on pixel values of adjacent pixels. For example, in FIG. 18A, a block i5 has a pixel value that is different from pixel values of adjacent blocks h4, i4, j4, h5, j5, h6, i6, and j6, and therefore, the block i5 corresponds to a hole. Also, a block f7 has a pixel value that is different from pixel values of adjacent blocks e6, f6, g6, e7, g7, e8, f8, and g8, and therefore, the block f7 corresponds to an island.

FIG. 18B shows an artifact map 1850 subject to morphology processing. As shown in FIG. 18B, the pixel value of the block i5 may change to the first pixel value from the second pixel value, and the pixel value of the block f7 may change to the second pixel value from the first pixel value.

The morphology processing may include erosion processing and dilation processing. The morphology processing may include opening processing of performing erosion processing and dilation processing successively. By performing opening processing, noise may be removed through erosion processing, and a region of which the size has been reduced may be restored through dilation processing.

However, an operation of removing outliers, as described above with reference to FIGS. 18A and 18B, may accompany complex computation, like morphology processing. Hereinafter, a process of removing outliers through simple computation by the AI encoding apparatus 1200 will be described with reference to FIGS. 19A and 19B.

Figure 19A:
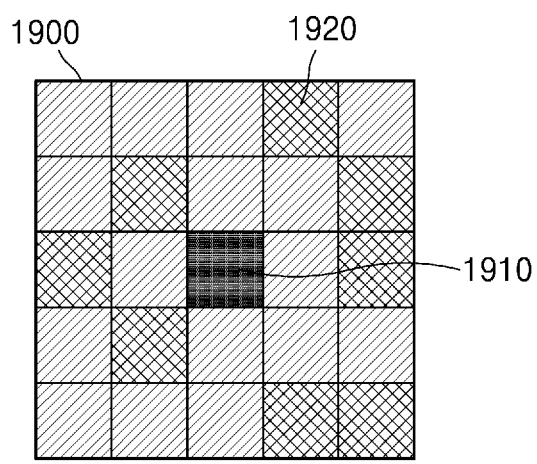
FIGS. 19A and 19B are diagrams for describing a process of removing outliers by an AI encoding apparatus according to another embodiment of the disclosure.
Figure 19B:
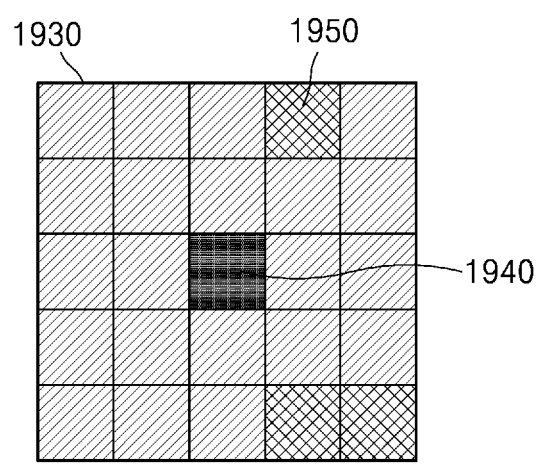
Figure 20A:
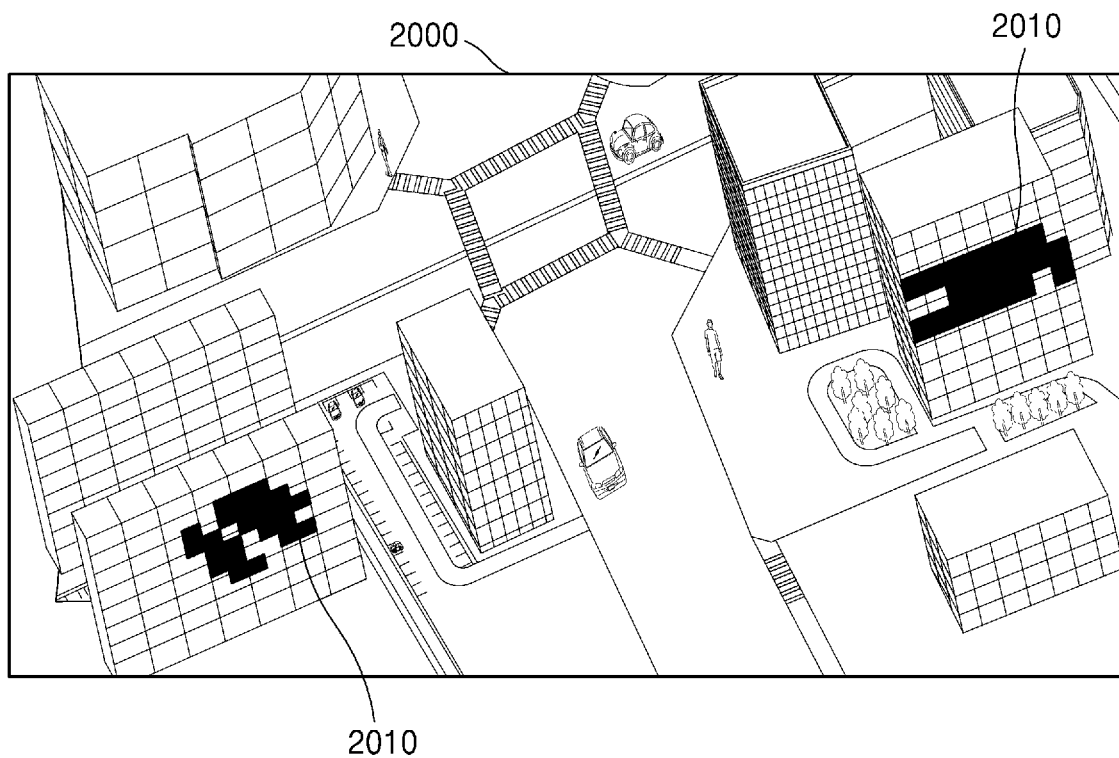
FIGS. 20A to 20F are diagrams for describing a method of correcting an artifact map by performing smoothing processing and seamless processing on a post-processing applying region of the artifact map, according to an embodiment of the disclosure.
Figure 20B:
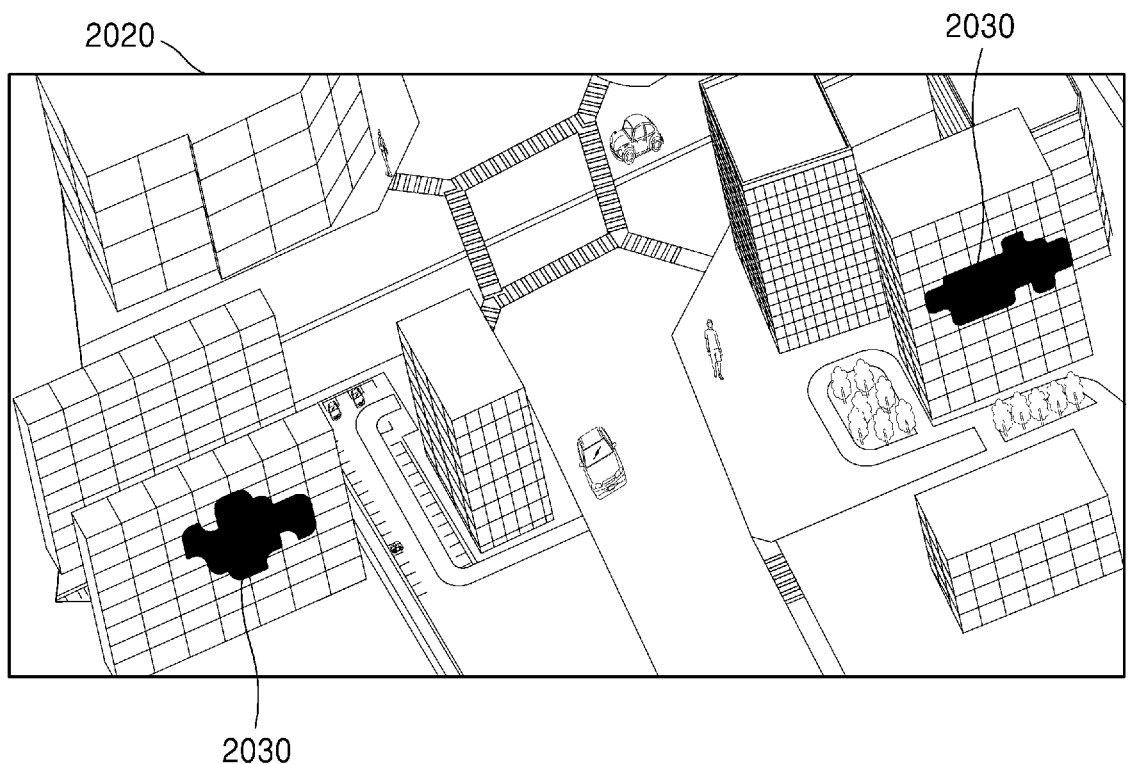
Figure 20C:
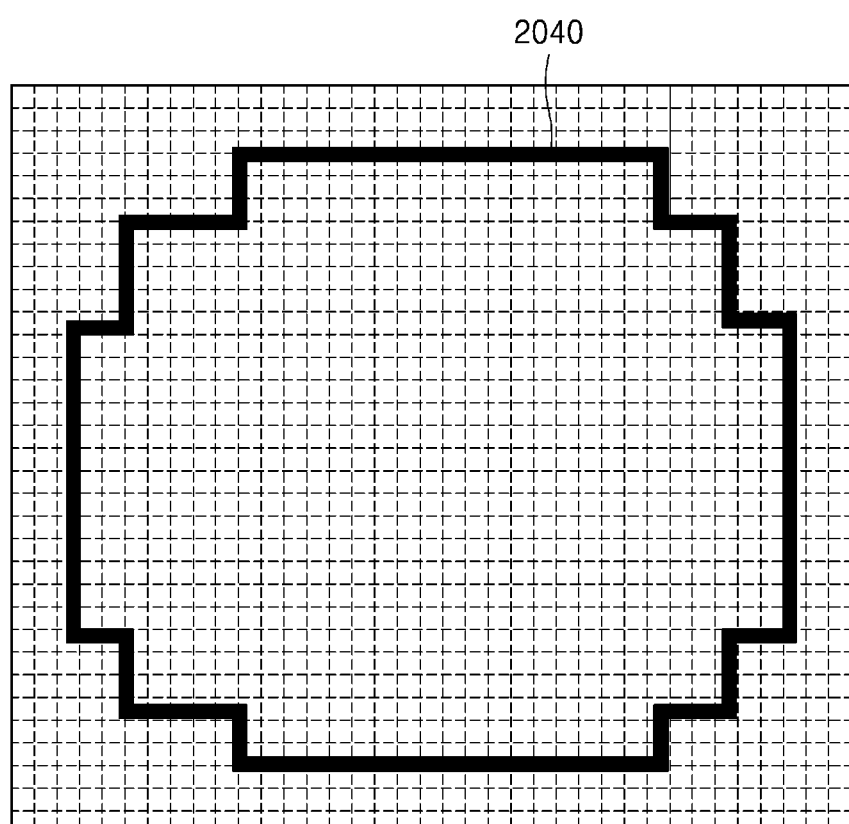
Figure 20D:
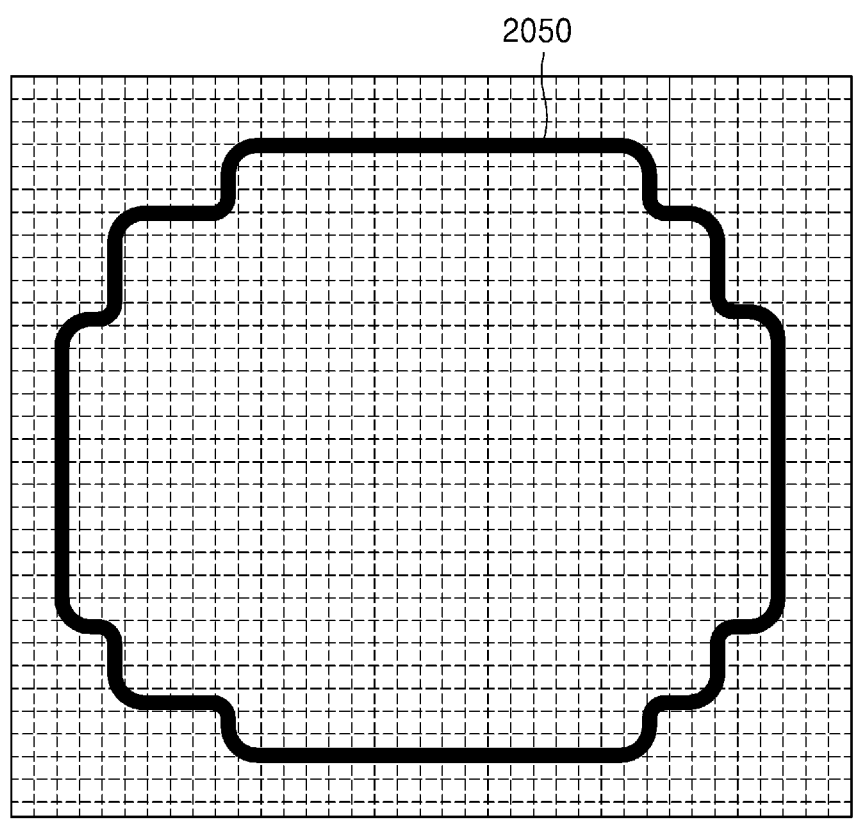
Figure 20E:
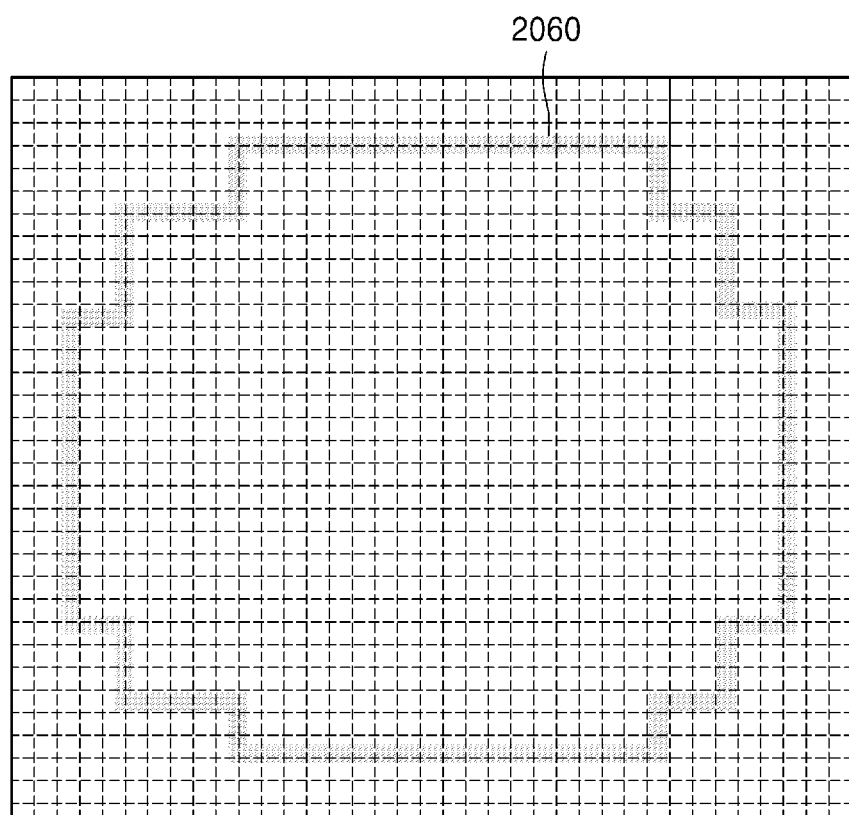
Figure 20F:
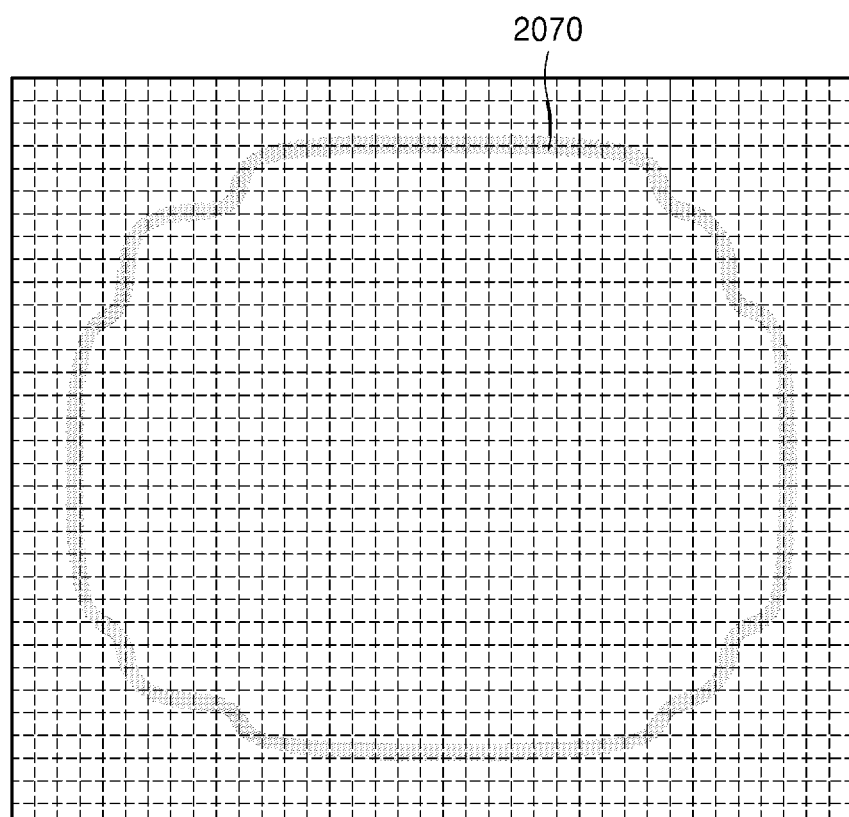

FIGS. 19A and 19B are diagrams for describing a process of removing outliers by the AI encoding apparatus according to an embodiment of the disclosure.

Referring to FIG. 19A, according to an embodiment of the disclosure, the artifact remover 1216 may perform processing for removing outliers on an artifact map generated based on a distribution of frequency transform coefficients for each block of an original image 105.

When a current block 1910 included in an artifact map has the first pixel value and the number of blocks having the first pixel value among blocks 1920 included in a preset region 1900 ranging from the current block 1910 is greater than a specific threshold value (for example, 5), the artifact remover 1216 may determine to not change the first pixel value of the current block 1910. Referring to FIG. 19B, according to an embodiment of the disclosure, when a current block 1940 included in an artifact map has the first pixel value and the number of blocks having the first pixel value among blocks 1950 included in a preset region 1930 ranging from the current block 1740 is smaller than or equal to the specific threshold value (for example, 5), the artifact remover 1216 may change the first pixel value of the current block 1940 to the second pixel value.

According to an embodiment of the disclosure, when the first image 115 is configured with a plurality of frames, the artifact remover 1216 may generate artifact maps corresponding to the respective frames. According to an embodiment of the disclosure, the artifact remover 1216 may generate artifact maps corresponding to some frames of the plurality of frames of the first image 115, to prevent a bitrate from increasing. For example, the artifact remover 1216 may generate an artifact map corresponding to a frame in which a scene change occurs and/or an I frame, among the plurality of frames.

According to an embodiment of the disclosure, the artifact remover 1216 may compare an artifact map of the original image 105 to at least one artifact map of the previous images, and perform post-processing of changing pixel values of pixels in the first image 115 based on the determined result.

Meanwhile, processing of changing pixel values, based on smoothing processing and/or seamless processing, may be performed on the artifact map. The smoothing processing may be based on various kinds of filtering methods for smoothing, and include morphology processing.

FIGS. 20A to 20F are diagrams for describing a method of correcting an artifact map by performing smoothing processing and seamless processing on a post-processing applying region of the artifact map, according to an embodiment of the disclosure.

Referring to FIGS. 20A to 20F, the AI encoding apparatus 1200 may perform smoothing processing and/or seamless processing on an artifact region 2010 included in an artifact map 2000 to generate an artifact map 2030 having an artifact region 2020. When a basic unit of a block map is a block (for example, N×N where N is an integer), the smoothing processing and seamless processing may be performed in unit of a pixel that is smaller than a block or in unit of a block that is smaller than N×N.

The smoothing processing is processing for smoothing boundaries of regions. For example, by performing smoothing processing on a region 2040, a region 2050 may be generated. The smoothing processing may include morphology processing, for example, opening processing.

The seamless processing is processing for making boundaries of regions ambiguous. For example, the seamless processing may include Poisson Blending processing. For example, by performing seamless processing on the region 2040, a region 2060 may be generated.

For example, by performing both seamless processing and smoothing processing on the region 2040, an region of which the boundaries are ambiguous and smooth may be generated, like a region 2070.

By performing processing of changing pixel values, based on smoothing processing and/or seamless processing, on an artifact map and performing post-processing on a region of a first image 115 corresponding to the artifact map, a more natural image with smooth boundaries may be generated.

Figure 21:
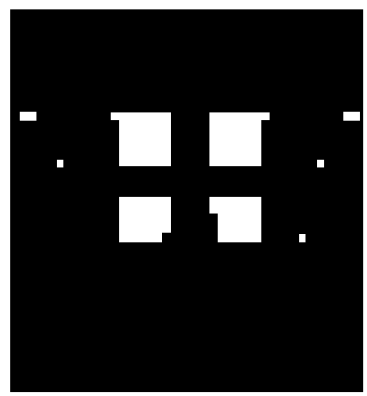
FIG. 21 is a diagram for describing a method of correcting an artifact region by comparing a block in an artifact map of a current frame to co-located blocks in artifact maps of immediately previous frames.
Figure 21:
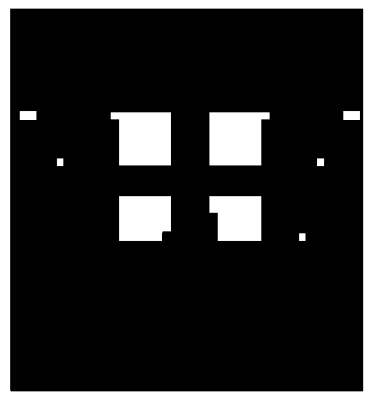
Figure 21:
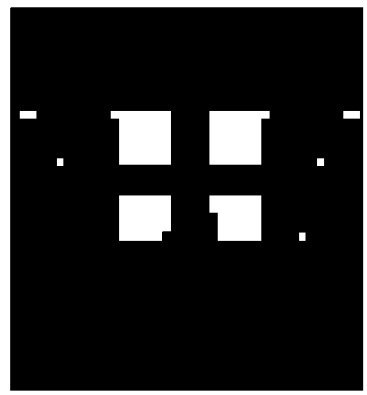
Figure 21:
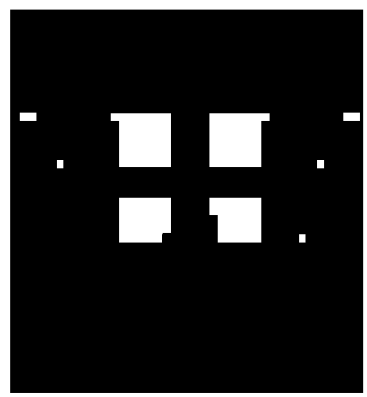

FIG. 21 is a diagram for describing a method of correcting an artifact region by comparing a block in an artifact map of a current frame to co-located blocks in artifact maps of immediately previous frames.

Referring to FIG. 21, the artifact remover 1216 may determine whether the number of blocks having a first pixel value among N second blocks in artifact maps 2100 of N (N is an integer) previous images (for example, frames), corresponding to a first block having the first pixel value in an artifact map of an original image, is greater than or equal to K (K is an integer), and perform post-processing of changing pixel values of pixels in the first block based on the determined result. At this time, the second blocks of the previous images, corresponding to the first block, may be blocks co-located with the first block.

Also, the artifact remover 1216 may perform post-processing of changing pixel values of pixels in a first image based on at least one of a motion vector or an optical flow of the original image. For example, when the artifact remover 1216 determines whether the number of the blocks having the first pixel value among the N second blocks in the artifact maps of the N (N is an integer) previous images (for example, frames), corresponding to the first block having the first pixel value in the artifact map 2100 of the original image, is greater than or equal to K (K is an integer), the artifact remover 1216 may determine the second blocks of the previous images corresponding to the first block based on at least one of a motion vector or an optical flow of the original image. In this case, when a motion magnitude based on a magnitude of a motion vector and an optical flow is greater than a preset magnitude, a second block in an artifact map of the corresponding previous image may be not counted when it is determined whether the number of blocks is greater than or equal to K.

The artifact remover 1216 may calculate a Sum of Absolute Difference (SAD) between a transform coefficient of the first block of the original image and a transform coefficient of a second block of at least one previous original image, the second block co-located with the first block. In some embodiments, the SAD is based on a sum of at least one of the absolute value of the difference of the real parts or the absolute value of the difference of the imaginary parts of frequency transform coefficients X specified over some domain (range of images and indices). The artifact remover 1216 may determine whether the calculated SAD is within a preset range. That is, the artifact remover 1216 may determine whether the calculated SAD is within the preset range, according to Equation 1 below.

$$Thd1 < SAD < Thd2 \quad \text{[Equation 1]}$$

Here, Thd1 and Thd2 may be threshold values having preset values.

The artifact remover 1216 may perform post-processing of changing pixel values of pixels in the first image based on the determined result. That is, when the artifact remover 1216 determines that the calculated SAD is within the preset range, the artifact remover 1216 may determine post-processing of changing the pixel values of the pixels in the first image. The first block may be a block determined based on artifact information, and may be a block having the first pixel value in an artifact map.

The artifact remover 1216 may perform post-processing of changing the pixel values of the pixels in the first image based on the artifact maps 1700, 1710, 1800, and 1850 shown in FIGS. 17A and 17B and FIGS. 18A and 18B.

According to an embodiment of the disclosure, the artifact remover 1216 may apply a preset filter to a region including an artifact in the first image 115 based on an artifact map to perform post-processing of changing the pixel values of the pixels in the first image 115. The preset filter may include at least one of a Gaussian filter or a low-pass filter.

For example, the artifact remover 1216 may apply a Gaussian filter to a region including an artifact in a first image 115 of a spatial domain based on an artifact map. The artifact remover 1216 may apply a low-pass filter to a region including an artifact in a first image 115 of a frequency domain based on an artifact map. At this time, a cut-off frequency of the low-pass filter may be determined based on a maximum value of transform coefficients located in a high-frequency region among frequency transform coefficients of a region in an original image corresponding to the region including the artifact in the first image 115. For example, the cut-off frequency of the low-pass filter may be determined as ½ of a frequency of a transform coefficient having a maximum value in a high-frequency region. Alternatively, the cut-off frequency of the low-pass filter may be determined by Equation 2 below.

$$\text{Cutoff-freq} = (\text{pos\_max\_val\_high} - \text{pos\_dc})/2 \quad \text{[Equation 2]}$$

Here, pos_max_val_high represents a frequency of a transform coefficient having a maximum value in a high-frequency region, and pos_dc represents a frequency of a DC coefficient in a low-frequency region. The cut-off frequency may be determined for each of a horizontal direction and a horizontal direction.

According to an embodiment of the disclosure, the artifact remover 1216 may filter a region in an original image corresponding to a region including an artifact in a first image 115 based on an artifact map by performing low-pass filtering and filtering using a typical filter, such as a Bi-cubic filter and a Bi-linear filter, including a down-scale function, or performing filtering by using a typical filter such as a Lanczos filter including both a low-pass filtering function and a down-scale function, thereby generating a down-scaled region from which a high-frequency component has been removed. The down-scaled region may be down-scaled by the same degree of scale as the first image 115 AI down-scaled through the first DNN.

Pixel values of pixels in the region including the artifact in the first image 115 may change to pixel values of pixels in the down-scaled region. The artifact remover 1216 may expand the corresponding region in the original image 105, apply a filter to the expanded region to generate a down-scaled region, reduce the down-scaled region to correspond to the region including the artifact in the first image 115, and change the pixel values of the pixels included in the region including the artifact in the first image 115 to pixel values of pixels in the reduced region. Meanwhile, according to an embodiment of the disclosure, the artifact remover 1216 may use an artifact detection network to generate an artifact map. The artifact detection network may be a kind of DNN, and include at least one convolution layer. The artifact detection network may be trained based on an input image and a ground truth (GT) image with a confirmed artifact. The artifact remover 1216 may input the first image 115 to the artifact detection network, and obtain an artifact map output from the artifact detection network.

The first encoder 1214 may encode the first image 115 post-processed by the artifact remover 1216. As described above, encoding may include a process of predicting a post-processed first image to generate prediction data, a process of generating residual data corresponding to a difference between the post-processed first image and the prediction data, a process of transforming the residual data that is a spatial domain component to a frequency domain component, a process of quantizing the residual data transformed to the frequency domain component, and a process of entropy-encoding the quantized residual data.

The data processor 1232 may process at least one of AI data or image data such that the at least one of AI data or image data is transmitted in a preset form. For example, when AI data and image data need to be transmitted in a form of a bitstream, the data processor 1232 may process the AI data to be expressed in the form of a bitstream, and transmit the AI data and image data in the form of a bitstream through a communicator 1234. According to another embodiment of the disclosure, the data processor 1232 may process AI data to be expressed in a form of a bitstream and transmit a bitstream corresponding to the AI data and a bitstream corresponding to image data through the communicator 1234. According to another example, the data processor 1232 may process AI data to be expressed in a form of a frame or a packet, and transmit image data in a form of a bitstream and the AI data in a form of a frame or a packet through the communicator 1234.

The communicator 1234 may transmit AI encoded data generated as a result of AI encoding through a network. The AI encoded data generated as the result of AI encoding may include image data and AI data.

The image data and AI data may be transmitted through the same kind of network or different kinds of networks.

The image data may include data generated as a result of first encoding of the post-processed first image. The image data may include data generated based on pixel values in the post-processed first image, for example, residual data that is a difference between the post-processed first image and the prediction data. Also, the image data may include information used in a process of performing first encoding on the post-processed first image. For example, the image data may include information about a mode used to perform first encoding on the post-processed first image, and information related to a quantization parameter used to perform first encoding on the post-processed first image.

The AI data may include information for enabling an AI decoding apparatus to AI up-scale a second image 135 as an up-scaling target corresponding to a down-scaling target of a first DNN. According to an example, the AI data may include information about a difference between the original image 105 and the first image 115 (or the post-processed first image). Also, the AI data may include information related to the first image 115 (or the post-processed first image). The information related to the first image 115 (or the post-processed first image) may include information about at least one of a resolution of the first image 115 (or the post-processed first image), a bitrate of image data generated as a result of first encoding of the post-processed first image, or a codec type used to perform first encoding on the post-processed first image. Also, the AI data may include artifact information generated by the artifact remover 1216. For example, the AI data may include data of an artifact map.

According to an embodiment of the disclosure, the artifact map may also be subject to first encoding by the first encoder 1214 and then transmitted as image data.

Figure 22A:
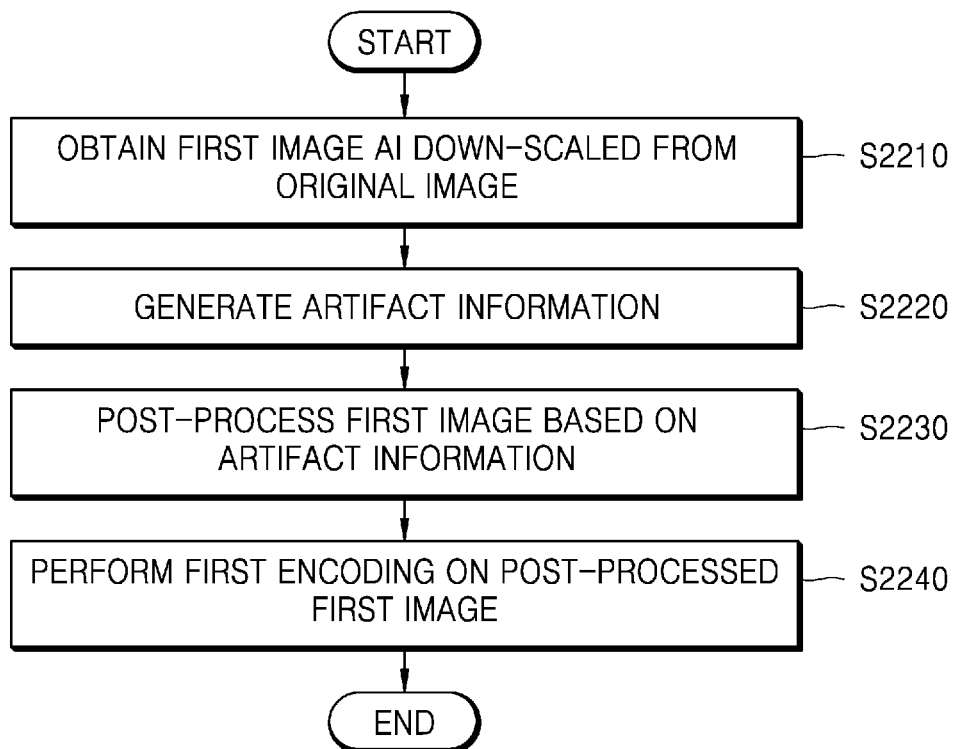
FIG. 22A is a flowchart for describing an AI encoding method according to another embodiment of the disclosure.

FIG. 22A is a flowchart for describing an AI encoding method according to another embodiment of the disclosure.

In operation S2210, the AI encoding apparatus 1200 may obtain a first image 115 AI down-scaled from an original image 105 by using a first DNN.

In operation S2220, the AI encoding apparatus 1200 may generate artifact information representing a region including an artifact in the first image 115. The artifact may include at least one of a spatial aliasing artifact or a spatio-temporal aliasing artifact. The artifact information may include an artifact map having a preset size. For example, when a resolution of the original image 105 is 3840×2160, an artifact map having a size of 240×135 may be generated. In this case, a basic unit of a block map may correspond to a block having a size of 16×16 of the original image 105. When a resolution of a down-scaled image is 1920×1080, a basic unit of a block map may correspond to a block having a size of 8×8 of the down-scaled image, although not limited thereto. However, the basic unit of the block map may correspond to a block having a size of M×M (M is an integer) of the original image 105. When the basic unit of the block map corresponds to a pixel of the original image 105, the block map may have a size of 3840×2160. The artifact may mean at least one of a spatial aliasing artifact or a spatio-temporal aliasing artifact.

The AI encoding apparatus 1200 may generate the artifact map based on values of frequency transform coefficients of the original image 105. The AI encoding apparatus 1200 may generate the artifact map based on a distribution of frequency transform coefficients for each block of the original image 105. According to another example, the AI encoding apparatus 1200 may generate the artifact map by using an artifact detection network.

In operation S2230, the AI encoding apparatus 1200 may perform post-processing of changing pixel values of pixels in the first image 115 based on the artifact information. For example, the AI encoding apparatus 1200 may apply a preset filter to a region including an artifact in the first image 115 based on the artifact information to thereby change the pixel values of the pixels in the first image 115. In this case, the preset filter may include at least one of a Gaussian filter or a low-pass filter.

Alternatively, the AI encoding apparatus 1200 may apply a filter to a region of the original image 105 corresponding to the region including the artifact in the first image 115 based on the artifact information to generate a down-scaled region, and change pixel values of pixels in the region including the artifact in the first image 115 to pixel values of pixels in the down-scaled region. In this case, the filter may be a typical filter. For example, the filter may include a Bi-cubic filter, a Bi-linear filter, and a Lanczos filter.

In operation S2240, the AI encoding apparatus 1200 may perform first encoding on the post-processed first image. The AI encoding apparatus 1200 may transmit AI data and image data generated as a result of encoding of the post-processed first image to the AI decoding apparatus. The AI data may include artifact information.

Figure 22B:
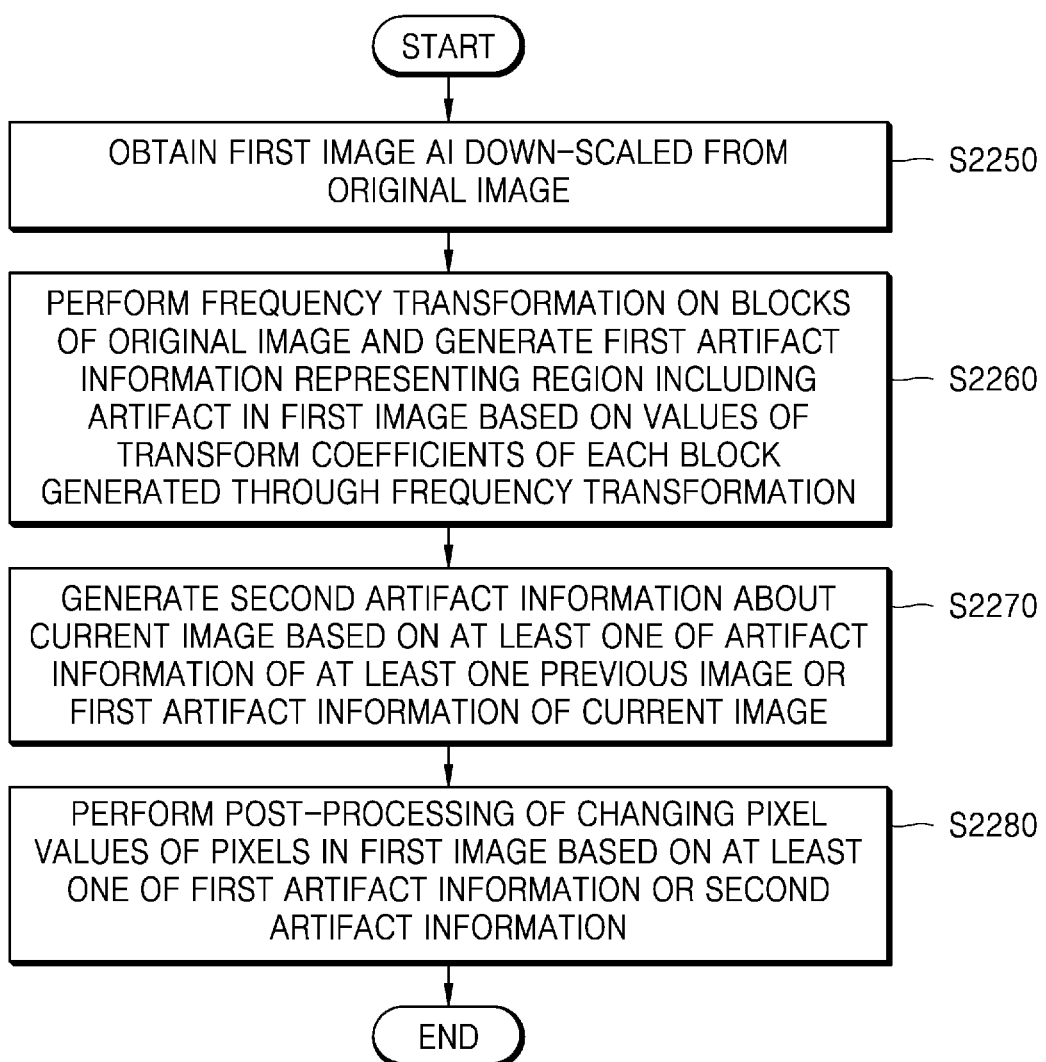
FIG. 22B is a diagram for describing an AI encoding method according to another embodiment of the disclosure.

FIG. 22B is a diagram for describing an AI encoding method according to another embodiment of the disclosure. In operation S2250, the AI encoding apparatus 1200 may obtain a first image 115 AI down-scaled from an original image 105 by using a first DNN.

In operation S2260, the AI encoding apparatus 1200 may perform frequency transformation on blocks of the original image 105, and generate first artifact information representing a region including an artifact in the first image 115 based on values of transform coefficients of each block generated through the frequency transformation. The first artifact information may include an artifact map. As described above, outliers of the artifact map may be removed.

In operation S2270, the AI encoding apparatus 1200 may generate second artifact information about a current image based on at least one of artifact information of at least one previous image or the first artifact information of the current image. The artifact information of the previous image may include an artifact map, and outliers of the artifact map may be removed.

In operation S2280, the AI encoding apparatus 1200 may perform post-processing of changing pixel values of pixels in the first image 115 based on at least one of the first artifact information or the second artifact information. When the AI encoding apparatus 1200 performs post-processing of changing the pixel values of the pixels in the first image 115 based on the first artifact information, operation S2270 of generating the second artifact information may be omitted.

Figure 23:
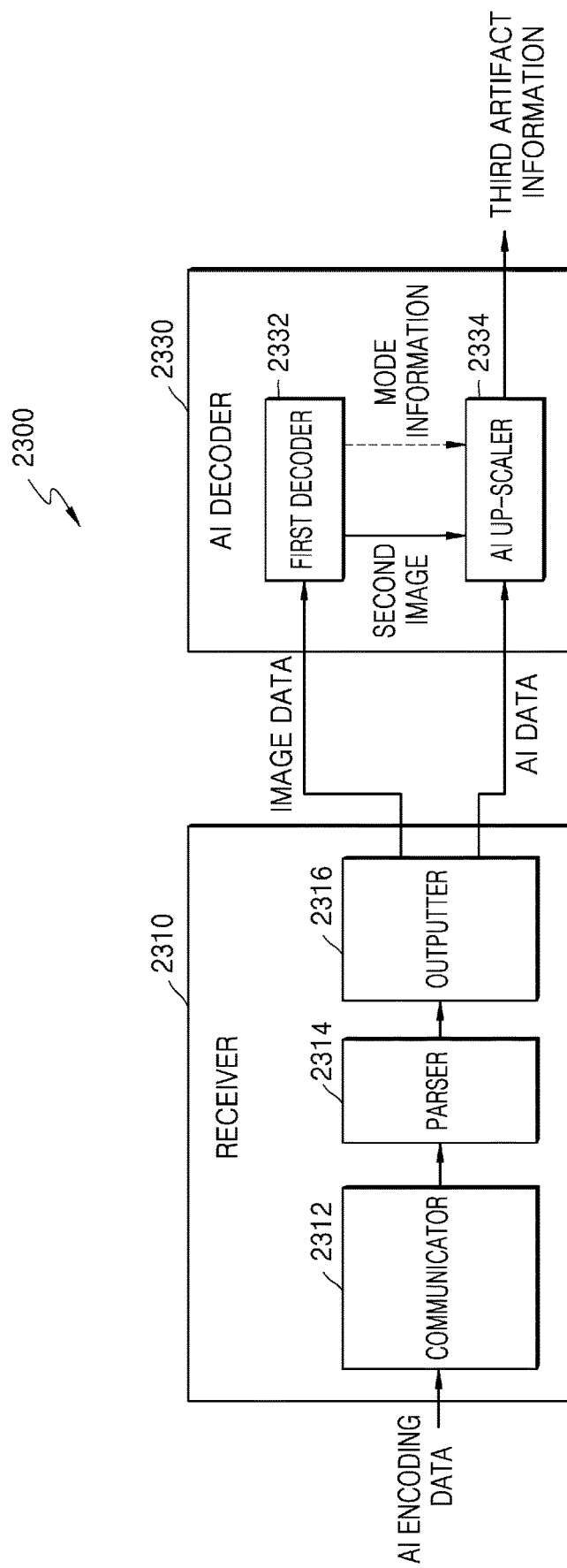
FIG. 23 is a block diagram showing a configuration of an AI decoding apparatus according to another embodiment of the disclosure.

FIG. 23 is a block diagram showing a configuration of an AI decoding apparatus 2300 according to another embodiment of the disclosure.

Referring to FIG. 23, the AI decoding apparatus 2300 may include a receiver 2310 and an AI decoder 2330. The receiver 2310 may include a communicator 2312, a parser 2314, and an outputter 2316, and the AI decoder 2330 may include a first decoder 2332 and an AI up-scaler 2334. The communicator 2312 may receive AI encoding data including image data and AI data through a network. The image data may include information generated as a result of first encoding of a post-processed first image, and the AI data may include artifact information.

The parser 2314 may separate the AI encoding data received through the communicator 2312 into the image data and the AI data, and transfer the image data to the first decoder 2332 and the AI data to the AI up-scaler 2334 through the outputter 2316.

Operations of the communicator 212, the parser 214, and the outputter 216 of the AI decoding apparatus 200 as described above with reference to FIG. 2 are the same as those of the communicator 2312, the parser 2314, and the outputter 2316 of the AI decoding apparatus 2300 of FIG. 23, and therefore, detailed descriptions thereof will be omitted.

The AI decoding apparatus 2300 according to an embodiment of the disclosure may include the receiver 2310 and the AI decoder 2330. The AI decoding apparatus 2300 may include a central processor (not shown) for controlling the receiver 2310 and the AI decoder 2330. Or, the receiver 2310 and the AI decoder 2330 may operate by their own processors (not shown), and processors (not shown) may operate mutually organically so as to operate the AI decoding apparatus 2300. Or, the receiver 2310 and the AI decoder 2330 may be controlled by a control of an external processor (not shown) of the AI decoding apparatus 2300.

The AI decoding apparatus 2300 may include one or more data storage devices (not shown) for storing input/output data of the communicator 2312, the parser 2314, the outputter 2316, the first decoder 2332, and the AI up-scaler 2334. The AI decoding apparatus 2300 may include a memory controller (not shown) for controlling data inputs/outputs of the data storage devices (not shown).

The AI decoding apparatus 2300 may perform image decoding including prediction by interworking with an internal video decoding processor or an external video decoding processor, to decode images. The internal video decoding processor of the AI decoding apparatus 2300 according to an embodiment of the disclosure may be provided as a separate processor, or a central processing unit or a graphics processing unit may include an image decoding processing module to embody basic image decoding operations.

The first decoder 2332 may perform first decoding on the image data to generate a second image 135 corresponding to the post-processed first image. According to an embodiment of the disclosure, when artifact information is subject to first encoding and then transmitted to the communicator 2312, the first decoder 2332 may perform first decoding on image data corresponding to the artifact information to generate artifact information.

The AI up-scaler 2334 may receive the second image 135 from the first decoder 2332, and up-scale the second image 135 to a third image 145 based on a second DNN. AI up-scaling based on the second DNN has been described in detail with reference to FIG. 2, and therefore, a description thereof will be omitted.

The AI up-scaler 2334 may output the third image 145 and the artifact information. According to an embodiment of the disclosure, the AI up-scaler 2334 may up-scale the artifact map before outputting the artifact map. As described above, because the artifact map may have the same resolution as that of a first image 115, the AI up-scaler 2334 may also up-scale the artifact map such that a resolution of the artifact map is the same as that of the third image 145. At this time, the AI up-scaler 2334 may perform legacy up-scaling on the artifact map.

According to an embodiment of the disclosure, the AI up-scaler 2334 may output the artifact information and the third image 145 to an image quality engine. The image quality engine may perform image quality enhancement processing on images before a display apparatus such as a TV displays the images. The image quality engine may include a plurality of filters to process images. For example, the image quality engine may apply at least one processing of image signal analysis, noise removal, detail enhancement, or up-scaling to an image to enhance image quality.

According to an embodiment of the disclosure, when the AI decoding apparatus 2300 is included in a display apparatus, the AI up-scaler 2334 may output the artifact information and the third image 145 to a storage device (for example, a main storage device or an auxiliary storage device) in the display apparatus to store the artifact information and the third image 145 in the storage device so that image quality enhancement of the third image 145 is performed by the image quality engine. The image quality engine may load the third image 145 and the artifact information from the storage device and perform image quality enhancement on the third image 145. Alternatively, the AI up-scaler 2334 may transmit the artifact information and the third image 145 directly to the image quality engine in the display apparatus so that image quality enhancement of the third image 145 is performed by the image quality engine.

According to an embodiment of the disclosure, the AI decoding apparatus 2300 may output or transmit the third image 145 and the artifact information to the display apparatus through a wired and/or wireless network.

The image quality engine may perform post-processing for changing pixel values of pixels in the third image 145 based on the artifact information.

Figure 24A:
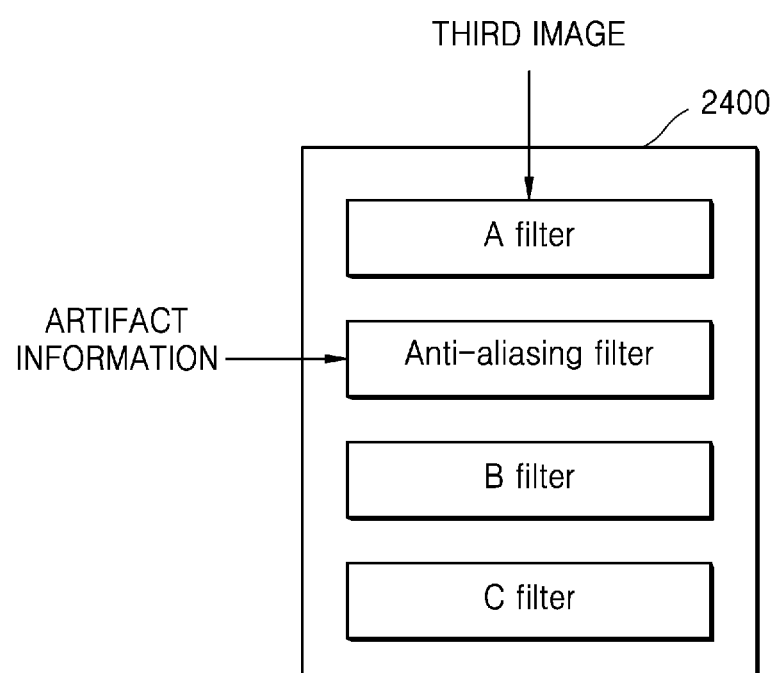
FIG. 24A is a diagram for showing an image quality engine.

FIG. 24A is a diagram shows an image quality engine 2400.

The image quality engine 2400 may include a plurality of filters, and an artifact map may be input to a filter of post-processing the third image 145 based on an artifact map, that is, an anti-aliasing filter of FIG. 24A. The anti-aliasing filter may include a low-pass filter or a Gaussian filter. The low-pass filter may be a filter of a spatial domain, formed in a shape of a mask having a preset size, or a filter of a frequency domain.

According to an embodiment of the disclosure, the image quality engine 2400 may change a weight of a low-pass filter such that an aliasing artifact existing in the third image 145 may be more effectively removed. For example, the image quality engine 2400 may change a preset weight of the low-pass filter. For example, the image quality engine 2400 may increase or decrease the preset weight of the low-pass filter.

According to an embodiment of the disclosure, the image quality engine 2400 may apply a low-pass filter to a region including an artifact in the third image 145 based on an artifact map.

More specifically, the image quality engine 2400 may apply a low-pass filter to a region in the third image 145 corresponding to a region having a first pixel value in the artifact map.

For example, information about a cut-off frequency transmitted from the AI encoding apparatus 1200 may be received by the AI decoding apparatus 2300, and the image quality engine 2400 may apply a low-pass filter of a frequency domain to a region in the third image 145 based on the information about the cut-off frequency output from the AI decoding apparatus 2300.

According to another example, the image quality engine 2400 may apply a low-pass filter formed in a shape of a mask having a preset size to the region including the artifact in the third image 145 based on the artifact map. Strength of the low-pass filter that is applied to the third image 145 may be determined according to a pixel unit of the third image 145 or values of the artifact map.

An example of adjusting strength of a low-pass filter formed in a shape of a mask having a preset size according to values of an artifact map will be described with reference to FIG. 24B.

The image quality engine 2400 may determine a strength range of a low-pass filter according to a preset criterion. For example, the image quality engine 2400 may determine strength of a filter based on at least one of a kind, resolution, size, and image quality of an original image 105, a kind of a subject included in the original image 105, or artifact information. The third image 145 passed through the plurality of filters of the image quality engine 2400 may be displayed through the display apparatus.

As described above, when the second image 135 is determined to be not up-scaled, the second image 135 passed through the plurality of filters of the image quality engine 2400 may be displayed through the display apparatus.

Figure 24B:
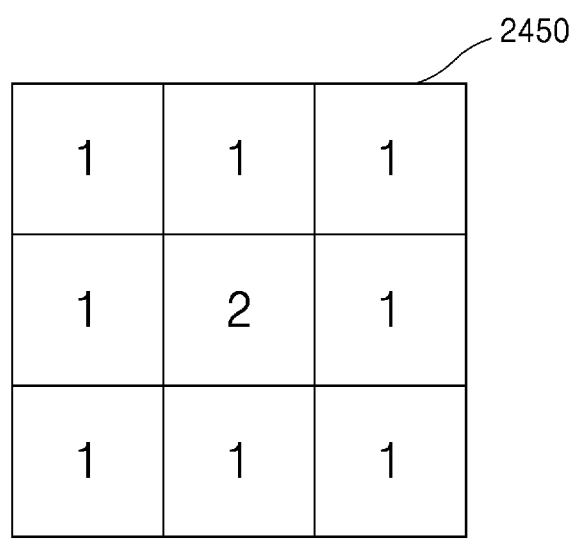
FIG. 24B is a diagram for describing a method performed by an AI decoding apparatus to adjust strength of a low-pass filter based on artifact information and perform filtering.

FIG. 24B is a diagram for describing a method performed by the AI decoding apparatus 2300 to adjust strength of a low-pass filter based on artifact information and perform filtering.

Referring to FIG. 24B, the low-pass filter may be a filter formed in a shape of a 3×3 mask 2450. The AI decoding apparatus 2300 may adjust strength of the low-pass filter by a method of adjusting values of coefficients in the 3×3 mask 2450. For example, the AI decoding apparatus 2300 may change a coefficient located at a center of the 3×3 mask 2450 among the coefficients in the 3×3 mask 2450 from 2 to 5, based on an artifact map. In this case, a degree of blurring of an image may be weakened through filtering. Alternatively, the AI decoding apparatus 2300 may change the remaining coefficients except for the coefficient located at the center among the coefficients in the 3×3 mask 2450 from 1 to 2, based on the artifact map.

At this time, ratios and values of the coefficients may be determined based on various methods.

For example, when the coefficients are based on the Gaussian filter, the coefficients may be determined based on Equation 2 below.

$$g(x, y) = \frac{1}{2\pi\sigma^2} \cdot e^{-\frac{x^2+y^2}{2\sigma^2}}$$ [Equation 2]

The AI decoding apparatus 2300 may determine values of the individual coefficients by adjusting G based on an artifact map.

Meanwhile, the AI decoding apparatus 2300 may determine the strength of the low-pass filter based on a first pixel value of the artifact map. For example, when the first pixel value is smaller than a preset value, the AI decoding apparatus 2300 may determine the strength of the low-pass filter as a first strength, and, when the first pixel value is greater than or equal to the preset value, the AI decoding apparatus 2300 may determine the strength of the low-pass filter as a second strength.

Figure 25:
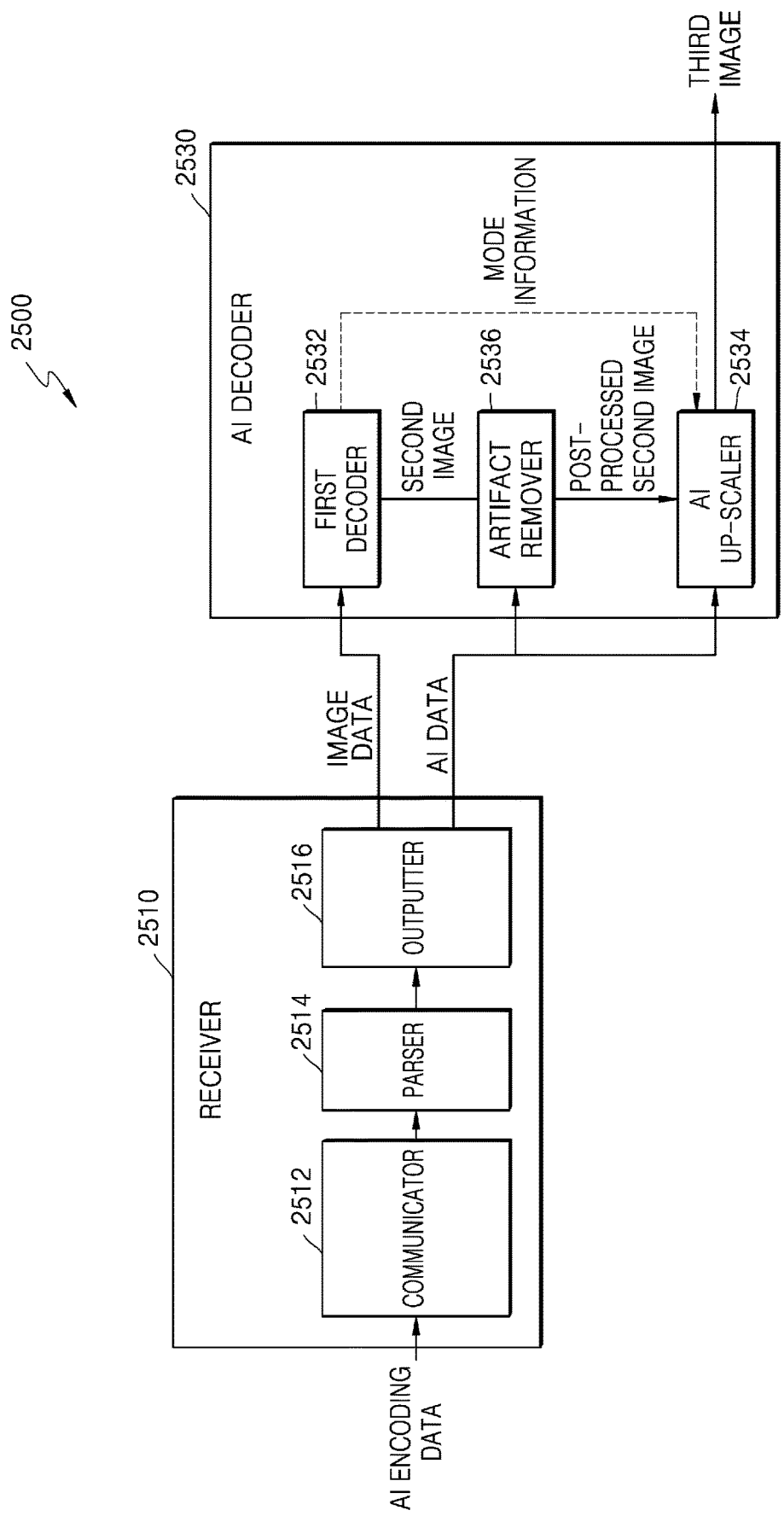
FIG. 25 is a block diagram showing a configuration of an AI decoding apparatus according to another embodiment of the disclosure.

FIG. 25 is a block diagram showing a configuration of an AI decoding apparatus 2500 according to another embodiment of the disclosure.

Referring to FIG. 25, the AI decoding apparatus 2500 may include a receiver 2510 and an AI decoder 2530. The receiver 2510 may include a communicator 2512, a parser 2514, and an outputter 2516, and the AI decoder 2530 may include a first decoder 2532, an AI up-scaler 2534, and an artifact remover 2536.

The communicator 2512 may receive AI encoding data including image data and AI data through a network. The image data may include information generated as a result of first encoding of a post-processed first image, and the AI data may include artifact information.

The parser 2514 may separate the AI encoding data received through the communicator 2512 into the image data and the AI data, and transfer the image data to the first decoder 2532 and the AI data to the AI up-scaler 2534 through the outputter 2516.

Operations of the communicator 212, the parser 214, and the outputter 216 of the AI decoding apparatus 200 described above with reference to FIG. 2 are the same as those of the communicator 2512, the parser 2514, and the ouptutter 2516 of the AI decoding apparatus 2500 of FIG. 25, and therefore, detailed descriptions thereof will be omitted.

The AI decoder 2532 may perform first decoding on the image data to generate a second image 135 corresponding to the post-processed first image. According to an embodiment of the disclosure, when the artifact information is subject to first encoding and then transmitted to the communicator 2512, the first decoder 2532 may perform first decoding on image data corresponding to the artifact information to generate artifact information. In this case, the artifact information may be provided from the first decoder 2532 to the artifact remover 2536.

The artifact remover 2536 may receive the artifact information included in the AI data from the outputter 2516. Alternatively, the artifact remover 2536 may receive the artifact information restored as a result of the first decoding of the image data from the first decoder 2532. Alternatively, the artifact remover 2536 may receive the artifact information included in the AI data from the AI up-scaler 2534.

The artifact remover 2536 may perform post-processing on a region including an artifact in the second image 135.

The artifact remover 2536 may receive the second image generated by the first decoder 2532, and perform post-processing of changing pixel values of pixels of the second image 135 based on the artifact information. More specifically, the artifact remover 2536 may apply a low-pass filter to the region including the artifact in the second image 135.

The post-processed second image output from the artifact remover 2536 may be transferred to the AI up-scaler 2534, and the AI up-scaler 2534 may output a third image 145 AI up-scaled through a second DNN. The third image 145 may be post-processed as necessary and then displayed through a display apparatus.

Meanwhile, according to an embodiment of the disclosure, the artifact remover 2536 may perform post-processing on the third image 145, instead of the second image 135. In this case, the AI up-scaler 2534 may provide the third image 145 AI up-scaled from the second image 135 generated by the first decoder 2532 to the artifact remover 2536. For post-processing of the third image 145, the AI up-scaler 2534 may up-scale an artifact map having a low resolution to generate an artifact map having a high resolution, and provide the artifact map having the high resolution to the artifact remover 2536.

The artifact remover 2536 may apply a low-pass filter to a region including an artifact in the third image 145.

A post-processed third image may be output from the artifact remover 2536 to be displayed.

Figure 26:
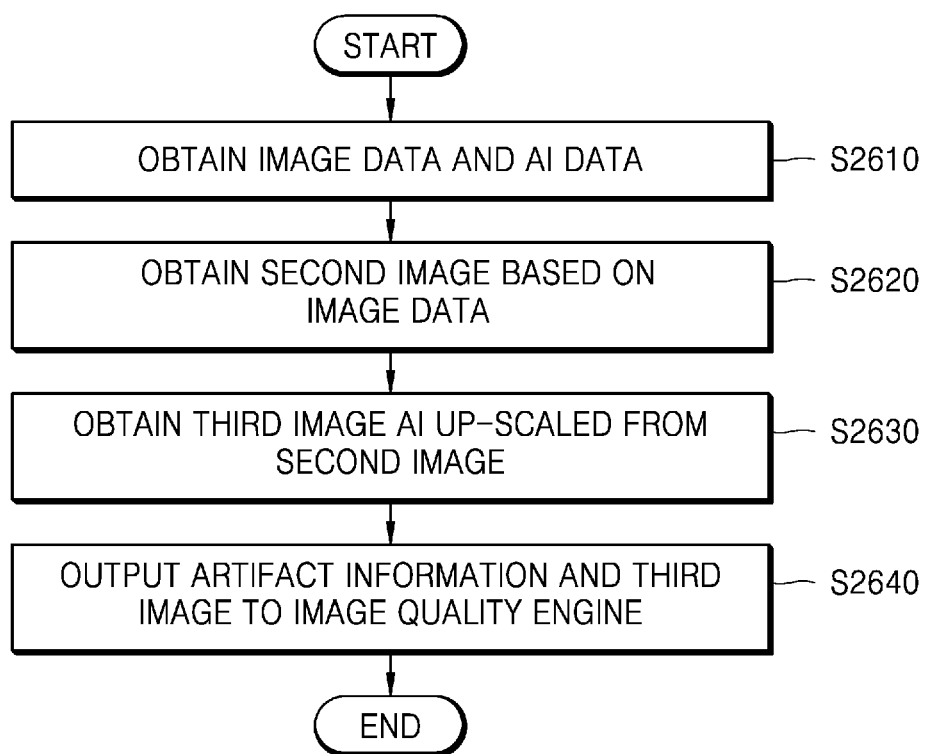
FIG. 26 is a flowchart for describing an AI decoding method according to another embodiment of the disclosure.

FIG. 26 is a flowchart for describing an AI decoding method according to another embodiment of the disclosure.

In operation S2610, an AI decoding apparatus 2500 may obtain image data generated as a result of first encoding of a post-processed first image, and AI data related to AI down-scaling.

The image data may be received in a form of a bitstream. The image data may include data generated based on pixel values in the post-processed first image, for example, residual data that is a difference between the post-processed first image and predicted data. Also, the image data may include information used in a first encoding process of the post-processed first image. For example, the image data may include information about a mode used to perform first encoding on the post-processed first image, and information related to a quantization parameter used to perform first encoding on the post-processed first image.

The AI data may include information for enabling a second DNN to AI up-scale a second image 135 as an up-scaling target corresponding to a down-scaling target of a first DNN. Also, the AI data may include artifact information (for example, an artifact map) representing a region including an artifact in a first image 115.

In operation S2620, the AI decoding apparatus 2500 may obtain the second image 135 based on the image data. More specifically, the AI decoding apparatus 2500 may generate the second image 135 corresponding to the post-processed first image by performing first decoding on the image data based on an image restoration method using frequency transformation.

In operation S2630, the AI decoding apparatus 2500 may obtain a third image 145 AI up-scaled from the second image 135 by using the second DNN.

In operation S2640, the AI decoding apparatus 2500 may output the artifact information and the third image 145 to an image quality engine. The AI decoding apparatus 2500 may request a change of a weight of a filter of processing the third image 145 using the artifact information among a plurality of filters of the image quality engine.

The third image 145 subject to image quality enhancement by the image quality engine may be displayed by a display apparatus.

Meanwhile, a process of training the first DNN 700 and the second DNN 300 has been described above with reference to FIG. 9. According to an embodiment of the disclosure, the first training image 802 of FIG. 9 may be replaced with a first training image post-processed based on artifact information so that the first DNN 700 and the second DNN 300 may be trained. Also, as an input of the second DNN 300, a second training image generated by performing first encoding and first decoding on the first training image 802 may be used. Also, the third training image 804 may be replaced with a third training image post-processed based on artifact information so that the first DNN 700 and the second DNN 300 may be trained.

Meanwhile, the embodiments of the disclosure described above may be written as computer-executable programs or instructions that may be stored in a medium.

The medium may continuously store the computer-executable programs or instructions, or temporarily store the computer-executable programs or instructions for execution or downloading. Also, the medium may be any one of various recording media or storage media in which a single piece or plurality of pieces of hardware are combined, and the medium is not limited to a medium directly connected to a computer system, but may be distributed on a network. Examples of the medium include magnetic media, such as a hard disk, a floppy disk, and a magnetic tape, optical recording media, such as CD-ROM and DVD, magneto-optical media such as a floptical disk, and ROM, RAM, and a flash memory, which are configured to store program instructions. Other examples of the medium include recording media and storage media managed by application stores distributing applications or by websites, servers, and the like supplying or distributing other various types of software.

Meanwhile, a model related to the DNN described above may be implemented via a software module. When the DNN model is implemented via a software module (for example, a program module including instructions), the DNN model may be stored in a computer-readable recording medium.

Also, the DNN model may be a part of the AI decoding apparatus 200 or AI encoding apparatus 600 described above by being integrated in a form of a hardware chip. For example, the DNN model may be manufactured in a form of an dedicated hardware chip for AI, or may be manufactured as a part of an existing general-purpose processor (for example, CPU or application processor) or a graphic-dedicated processor (for example GPU).

Also, the DNN model may be provided in a form of downloadable software. A computer program product may include a product (for example, a downloadable application) in a form of a software program electronically distributed through a manufacturer or an electronic market. For electronic distribution, at least a part of the software program may be stored in a storage medium or may be temporarily generated. In this case, the storage medium may be a server of the manufacturer or electronic market, or a storage medium of a relay server.

The method and apparatus for AI encoding and AI decoding, according to an embodiment, may process images at a low bitrate through AI-based image encoding and decoding.

Also, the method and apparatus for AI encoding and AI decoding, according to an embodiment of the disclosure, may remove artifacts in an image to enhance quality of the image.

It should be noted that effects of the method and apparatus for AI encoding and decoding according to an embodiment of the disclosure are not limited to those described above and other effects of the disclosure will be apparent to those of skill in the art from the following descriptions.

While one or more embodiments of the disclosure have been described with reference to the figures, it will be understood by those of ordinary skill in the art that various changes in form and details may be made therein without departing from the spirit and scope as defined by the following claims.

What is claimed is:

1. A server for providing an image by using an artificial intelligence (AI), the server comprising:
one or more processor, when executing one or more instructions stored in the server, configured to:
select neural network (NN) setting information from a plurality of NN setting information that is pre-stored in the server,
AI down-scale, using a Neural Network (NN) for down-scaling, an original image to obtain a first image, wherein the NN for down scaling is set by the selected NN setting information, and the original image comprises a plurality of blocks,
obtain, based on a plurality of frequency transform coefficients of the original image, artifact information including an artifact map of the first image which represents a first region including an artifact in the first image,
change, based on the artifact information, a pixel value of a pixel in the first image,
encode the first image of which the pixel value is changed to obtain image data, and
transmit, to an electronic device, the image data and AI data related to the AI down-scaling, the AI data comprising the artifact information and being used to select NN setting information from the plurality of NN setting information that is pre-stored in the server.

2. The server of claim 1, wherein the artifact map is of a preset size.

3. The server of claim 1,
wherein a presence of the artifact is indicated in the artifact map by a first pixel value and an absence of the artifact is indicated in the artifact map by a second pixel value, wherein the one or more processor is further configured to execute the one or more instructions to:
perform frequency transformation on a first block of the plurality of blocks to obtain a second plurality of frequency transform coefficients corresponding to the first block, wherein the plurality of frequency transform coefficients comprises the second plurality of frequency transform coefficients,
determine whether a criterion is satisfied based on a distribution of the second plurality of frequency transform coefficients, and
obtain, when the criterion is satisfied, the artifact map, wherein the first pixel value in the artifact map represents a degree value for the second plurality of frequency transform coefficients.

4. The server of claim 3, wherein, when the criterion is not satisfied, the artifact map includes the degree value for the second plurality of frequency transform coefficients which is the second pixel value.

5. The server of claim 3, wherein the original image is a current image of a plurality of original images in a video sequence, and the one or more processor is further configured to execute the one or more instructions to change the pixel value of the pixel in the first image based on comparing the artifact map to at least one second artifact map of a previous original image of the plurality of original images of the video sequence.

6. The server of claim 5, wherein the one or more processor is further configured to execute the one or more instructions to change the pixel value of the pixel in the first image by:
- determining whether K or more previous artifact maps of N previous artifact maps disagree at a first position index of the second plurality of frequency transform coefficients with the artifact map at the first position index, and
- changing first pixel values of the first block when the K or more previous artifact maps disagree at the first position index with the artifact map, wherein a first previous artifact map disagrees with the artifact map when the artifact map first pixel value of the first position index is different than a first pixel value of each of K or more previous artifact maps at the first position index.

7. The server of claim 3, wherein the criterion is satisfied when one or more of a first condition, a second condition, a third condition or a fourth condition is satisfied,
- the first block includes a DC frequency transform coefficient, a low frequency region and a high frequency region,
- the first condition is satisfied when a first sum of first energy values of the second plurality of frequency transform coefficients over the high-frequency region exceeds a second sum of second energy values of the second plurality of frequency transform coefficients over the low-frequency region, wherein a scaling of the second sum is a first predetermined scaling,
- the second condition is satisfied when a third sum including a first maximum energy value at a third position index of a second frequency transform coefficient of the second plurality of frequency transform coefficients over the high-frequency region and energy values of frequency transform coefficients located at fourth position indices around the third position index exceeds a fourth sum including a second maximum energy value at a fourth position index of a third frequency transform coefficient of the second plurality of frequency transform coefficients over the low-frequency region and energy values of frequency transform coefficients located around the fourth position index, wherein a scaling of the fourth sum is a second predetermined scaling,
- the third condition is satisfied when the third sum of the high-frequency region exceeds a scaled version of the first sum, wherein the scaling of the first sum is a third predetermined scaling, or
- the fourth condition is satisfied when a number of times that frequency transform coefficients have energy exceeding a preset value is less than a threshold number.

8. The server of claim 7, wherein the fourth position indices are around the third position index when the fourth position indices fit within a square region of the first block, and the square region is of a predetermined width.

9. The server of claim 1, wherein the one or more processor is further configured to execute the one or more instructions to perform morphology processing, smoothing processing, or seamless processing on the first image based on the artifact map.

10. The server of claim 1, wherein the one or more processor is further configured to execute the one or more instructions to:
- perform frequency transformation on a first block of the plurality of blocks to obtain a second plurality of frequency transform coefficients corresponding to the first block, wherein the plurality of frequency transform coefficients comprises the second plurality of frequency transform coefficients,
- calculate a Sum of Absolute Difference (SAD) between a first frequency transform coefficient at a second position index of the second plurality of frequency transform coefficients and a second frequency transform coefficient at the second position index of a third plurality of frequency transform coefficients associated with a second block of at least one previous original image, the second block co-located with the first block,
- determine whether the calculated SAD is within a preset range, and
- change first pixel values of the first block, when the calculated SAD is within the preset range.

11. The server of claim 1, wherein the one or more processor is further configured to execute the one or more instructions to change the pixel value of the pixel in the first image based on the artifact map and based on at least one of a motion vector of the original image or an optical flow of the original image.

12. The server of claim 1, wherein the one or more processor is further configured to execute the one or more instructions to change the pixel value of the pixel in the first image by applying a filter to the first region based on the artifact information.

13. The server of claim 12, wherein the filter comprises at least one of a Gaussian filter or a low-pass filter, and the one or more processor is further configured to execute the one or more instructions to:
- perform frequency transformation on a first block of the plurality of blocks to obtain a second plurality of frequency transform coefficients corresponding to the first block, wherein the plurality of frequency transform coefficients comprises the second plurality of frequency transform coefficients, and
- determine a cut-off frequency of the low-pass filter based on a maximum value of transform coefficients located in a high-frequency region among the second plurality of frequency transform coefficients.

14. The server of claim 1, wherein the one or more processor is further configured to execute the one or more instructions to:
- apply a filter to a second region of the original image corresponding to the first region in the first image to obtain a down-scaled region including second pixel values, based on the artifact information; and
- change third pixel values in the first region including the artifact in the first image to the second pixel values of the down-scaled region.

15. The server of claim 14, wherein the filter comprises at least one of a Bi-cubic filter, a Bi-linear filter, or a Lanczos filter.

16. A method for providing an image by a server configured to use an artificial intelligence (AI), the method comprising:
- selecting neural network (NN) setting information from a plurality of NN setting information that is pre-stored in the server;
- AI down-scaling, using a Neural Network (NN) for down-scaling, an original image to obtain a first image, wherein the NN for down scaling is set by the selected NN setting information, and the original image comprises a plurality of blocks;
- obtaining, based on a plurality of frequency transform coefficients of the original image, artifact information including an artifact map of the first image which represents a first region including an artifact in the first image;

changing, based on the artifact information, a pixel value of a pixel in the first image;

encoding the first image of which the pixel value is changed to obtain image data; and transmitting, to an electronic device, the image data and AI data related to the AI down-scaling, the AI data comprising the artifact information and being used to select NN setting information from the plurality of NN setting information that is pre-stored in the server.

17. A non-transitory computer-readable recording medium having recorded thereon a program which, when executed by a processor of a server, performs the method of claim 16.

* * * * *